US011187904B2

(12) United States Patent
Chi et al.

(10) Patent No.: US 11,187,904 B2
(45) Date of Patent: Nov. 30, 2021

(54) MULTIPLE PROJECTOR FIELD-OF-VIEW STITCHED WAVEGUIDE DISPLAY

(71) Applicant: Facebook Technologies, LLC, Menlo Park, CA (US)

(72) Inventors: Wanli Chi, Sammamish, WA (US); Dominic Meiser, Issaquah, WA (US); Yang Yang, Redmond, WA (US); Wai Sze Tiffany Lam, Redmond, WA (US); Pasi Saarikko, Kirkland, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/812,084

(22) Filed: Mar. 6, 2020

(65) Prior Publication Data

US 2021/0055552 A1 Feb. 25, 2021

Related U.S. Application Data

(60) Provisional application No. 62/891,167, filed on Aug. 23, 2019.

(51) Int. Cl.
*G02B 27/01* (2006.01)
*G02B 27/44* (2006.01)
(Continued)

(52) U.S. Cl.
CPC ............ *G02B 27/0172* (2013.01); *G02B 1/11* (2013.01); *G02B 6/005* (2013.01); *G02B 6/0016* (2013.01);
(Continued)

(58) Field of Classification Search
CPC .............. G02B 1/11; G02B 2027/0112; G02B 2027/0118; G02B 2027/012;
(Continued)

(56) References Cited

U.S. PATENT DOCUMENTS

| 4,687,720 A | 8/1987 | Wreede et al. |
| 8,508,848 B2 | 8/2013 | Saarikko |

(Continued)

FOREIGN PATENT DOCUMENTS

| CN | 104035157 A | 9/2014 |
| CN | 113302431 A | 8/2021 |

(Continued)

OTHER PUBLICATIONS

PCT/US2020/012666, "International Search Report and Written Opinion", dated Apr. 2, 2020, 14 pages.
(Continued)

*Primary Examiner* — Afroza Chowdhury
(74) *Attorney, Agent, or Firm* — Weaver Austin Villeneuve & Sampson LLP

(57) ABSTRACT

In a waveguide display, a first projector is configured to generate display light for a first field of view (FOV) of a display image. A first input coupler is configured to couple the display light for the first FOV into a visibly transparent substrate. A first set of gratings is configured to couple the display light for the first FOV out of the substrate at a first two-dimensional array of locations of the substrate. A second projector is configured to generate display light for a second FOV of the display image different from the first FOV. A second input coupler is configured to couple the display light for the second FOV into the substrate. A second set of gratings is configured to couple the display light for the second FOV out of the substrate at a second two-dimensional array of locations of the substrate.

18 Claims, 28 Drawing Sheets

(51) Int. Cl.
*H04N 9/31* (2006.01)
*F21V 8/00* (2006.01)
*G02B 27/00* (2006.01)
*G02B 1/11* (2015.01)
*G02B 27/42* (2006.01)

(52) U.S. Cl.
CPC ......... *G02B 6/0026* (2013.01); *G02B 6/0038* (2013.01); *G02B 27/0081* (2013.01); *G02B 27/4205* (2013.01); *G02B 27/44* (2013.01); *H04N 9/3152* (2013.01); *G02B 2027/012* (2013.01); *G02B 2027/0112* (2013.01); *G02B 2027/0118* (2013.01); *G02B 2027/0123* (2013.01); *G02B 2027/0138* (2013.01); *G02B 2027/0174* (2013.01); *G02B 2027/0178* (2013.01); *G02B 2027/0187* (2013.01)

(58) Field of Classification Search
CPC .... G02B 2027/0123; G02B 2027/0138; G02B 2027/0174; G02B 2027/0178; G02B 2027/0187; G02B 27/0081; G02B 27/0172; G02B 27/4205; G02B 27/44; G02B 6/0016; G02B 6/0026; G02B 6/0038; G02B 6/005; H04N 9/3152
See application file for complete search history.

(56) References Cited

U.S. PATENT DOCUMENTS

| | | | |
|---|---|---|---|
| 8,649,099 B2 | 2/2014 | Schultz et al. | |
| 9,939,647 B2 | 4/2018 | Vallius et al. | |
| 10,859,768 B2 | 12/2020 | Popovich et al. | |
| 11,067,811 B2 | 7/2021 | Chi et al. | |
| 2003/0165017 A1 | 9/2003 | Amitai | |
| 2006/0228073 A1 | 10/2006 | Mukawa et al. | |
| 2010/0321409 A1 | 12/2010 | Komori et al. | |
| 2010/0321781 A1 | 12/2010 | Levola et al. | |
| 2011/0211239 A1 | 9/2011 | Mukawa et al. | |
| 2015/0098243 A1 | 4/2015 | Li et al. | |
| 2015/0277375 A1 | 10/2015 | Large et al. | |
| 2015/0289762 A1 | 10/2015 | Popovich et al. | |
| 2015/0346490 A1 | 12/2015 | Tekolste et al. | |
| 2016/0077338 A1 | 3/2016 | Robbins et al. | |
| 2017/0235142 A1 | 8/2017 | Wall et al. | |
| 2017/0363871 A1* | 12/2017 | Vallius ................ | G02B 6/0016 |
| 2018/0052276 A1 | 2/2018 | Klienman et al. | |
| 2018/0188542 A1 | 7/2018 | Waldern et al. | |
| 2018/0322845 A1 | 11/2018 | Machida | |
| 2018/0373115 A1 | 12/2018 | Brown et al. | |
| 2019/0004321 A1 | 1/2019 | Grey et al. | |
| 2019/0011708 A1 | 1/2019 | Schultz et al. | |
| 2019/0041642 A1 | 2/2019 | Haddick et al. | |
| 2019/0101866 A1 | 4/2019 | Georgiou et al. | |
| 2019/0187474 A1 | 6/2019 | Bhargava et al. | |
| 2020/0103650 A1 | 4/2020 | Woods | |
| 2020/0225479 A1 | 7/2020 | Chi et al. | |
| 2020/0348518 A1* | 11/2020 | Georgiou ........... | G02B 17/0856 |
| 2021/0055551 A1 | 2/2021 | Chi et al. | |
| 2021/0055553 A1 | 2/2021 | Chi et al. | |
| 2021/0055554 A1 | 2/2021 | Chi et al. | |
| 2021/0055555 A1 | 2/2021 | Chi et al. | |

FOREIGN PATENT DOCUMENTS

| | | |
|---|---|---|
| JP | 2007011057 A | 1/2007 |
| WO | 2018224802 A1 | 12/2018 |
| WO | 2020146451 A1 | 7/2020 |
| WO | 2021040979 A1 | 3/2021 |
| WO | 2021040980 A1 | 3/2021 |
| WO | 2021040990 A1 | 3/2021 |
| WO | 2021041314 A1 | 3/2021 |
| WO | 2021041333 A1 | 3/2021 |

OTHER PUBLICATIONS

U.S. Non-Final Office Action dated Dec. 2, 2020 in U.S. Appl. No. 16/726,667.
U.S. Non-Final Office Action dated Jan. 22, 2021 in U.S. Appl. No. 16/840,116.
U.S. Restriction Requirement dated Jan. 22, 2021 in U.S. Appl. No. 16/840,118.
International Application No. PCT/US2020/045077, International Search Report and Written Opinion dated Apr. 11, 2020, 11 pages.
International Application No. PCT/US2020/045081, International Search Report and Written Opinion dated Apr. 11, 2020, 9 pages.
International Application No. PCT/US2020/045144, International Search Report and Written Opinion dated Apr. 11, 2020, 12 pages.
International Application No. PCT/US2020/047671, International Search Report and Written Opinion dated Apr. 11, 2020, 9 pages.
International Application No. PCT/US2020/047636, International Search Report and Written Opinion dated Apr. 11, 2020, 12 pages.
U.S. Notice of Allowance dated May 26, 2021 in U.S. Appl. No. 16/726,667.
U.S. Notice of Allowance dated Jun. 17, 2021 in U.S. Appl. No. 16/726,667.
U.S. Final Office Action dated May 5, 2021 in U.S. Appl. No. 16/840,116.
U.S. Notice of Allowance dated Jul. 12, 2021 in U.S. Appl. No. 16/840,118.
U.S. Non-Final Office Action dated Jul. 22, 2021 in U.S. Appl. No. 16/681,530.
U.S. Notice of Allowance dated Aug. 25, 2021 in U.S. Appl. No. 16/840,116.

* cited by examiner

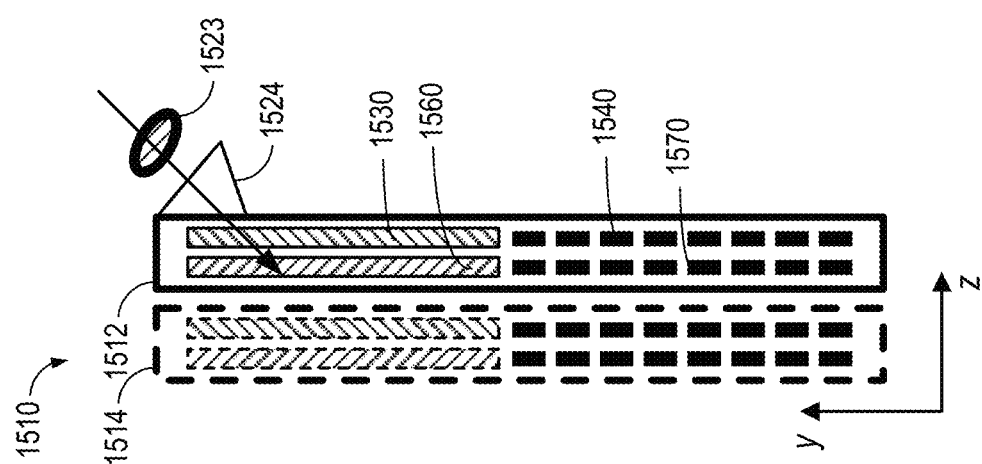
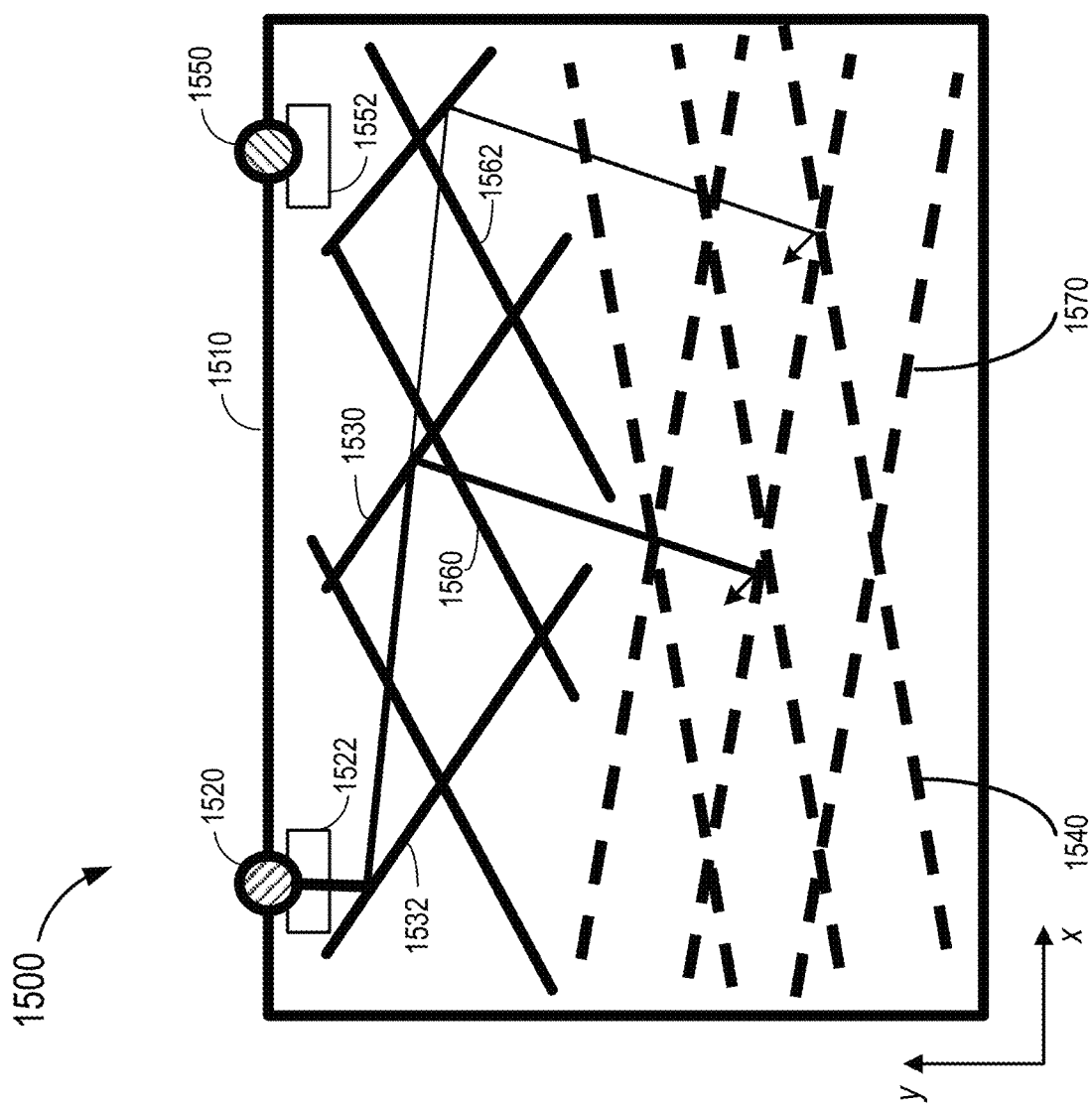
FIG. 15B
FIG. 15A

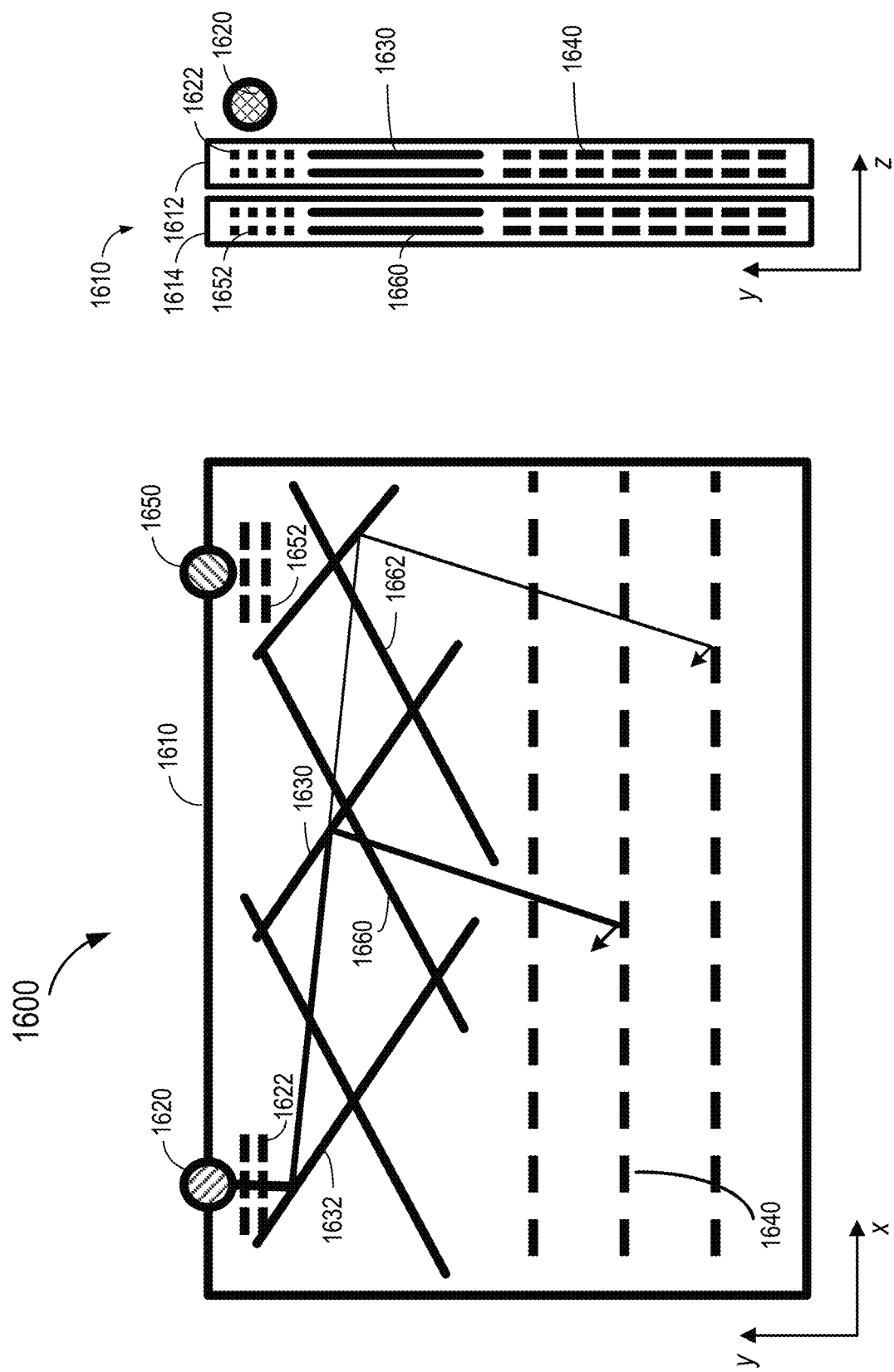

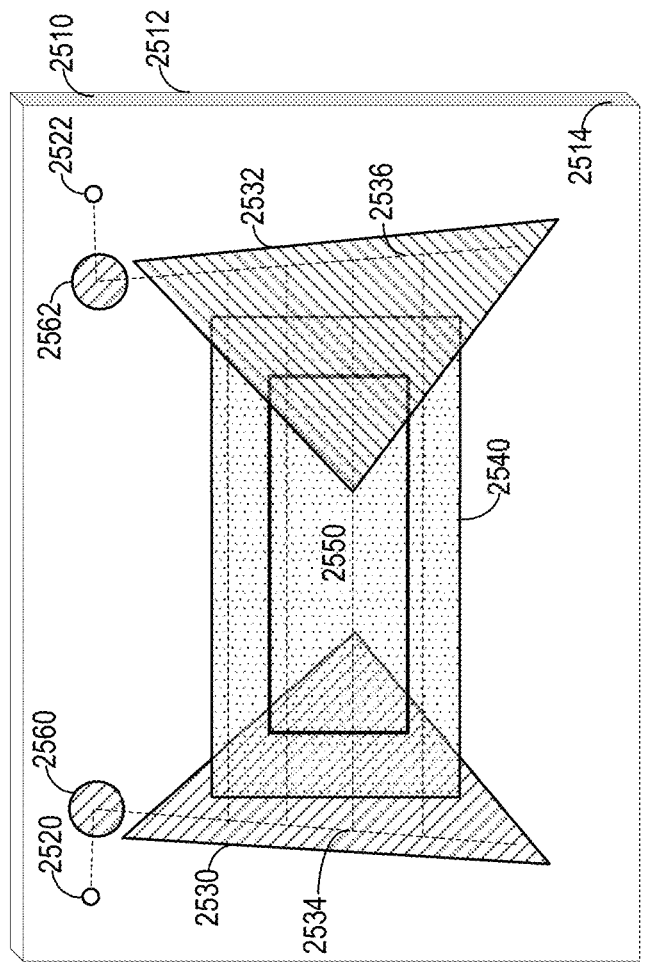
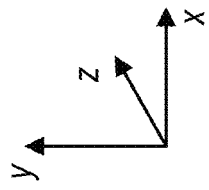
FIG. 25

MULTIPLE PROJECTOR FIELD-OF-VIEW STITCHED WAVEGUIDE DISPLAY

CROSS-REFERENCE TO RELATED APPLICATION

This patent application claims benefit of and priority to U.S. Provisional Patent Application Ser. No. 62/891,167, filed Aug. 23, 2019, entitled "Volume Bragg Grating-Based Waveguide Display," the disclosure of which is hereby incorporated by reference in its entirety for all purposes.

BACKGROUND

An artificial reality system, such as a head-mounted display (HMD) or heads-up display (HUD) system, generally includes a near-eye display (e.g., in the form of a headset or a pair of glasses) configured to present content to a user via an electronic or optic display within, for example, about 10-20 mm in front of the user's eyes. The near-eye display may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through).

One example of an optical see-through AR system may use a waveguide-based optical display, where light of projected images may be coupled into a waveguide (e.g., a transparent substrate), propagate within the waveguide, and be coupled out of the waveguide at different locations. In some implementations, the light of the projected images may be coupled into or out of the waveguide using a diffractive optical element, such as a grating. Light from the surrounding environment may pass through a see-through region of the waveguide and reach the user's eyes as well.

SUMMARY

This disclosure relates generally to volume Bragg grating-based waveguide displays for near-eye display. More specifically, disclosed herein are techniques for expanding the eyebox, reducing display haze, reducing physical size, improving optical efficiency, reducing optical artifacts, and increasing field of view of optical see-through near-eye display systems using volume Bragg grating (VBG) couplers. Various inventive embodiments are described herein, including devices, systems, methods, and the like.

According to certain embodiments, a waveguide display may include a substrate transparent to visible light, a first projector configured to generate display light from a first field of view (FOV) of a display image, a first input coupler configured to couple the display light from the first FOV into the substrate, a first set of gratings configured to couple the display light from the first FOV out of the substrate at a first two-dimensional array of locations of the substrate, a second projector configured to generate display light from a second FOV of the display image different from the first FOV, a second input coupler configured to couple the display light from the second FOV into the substrate, and a second set of gratings configured to couple the display light from the second FOV out of the substrate at a second two-dimensional array of locations of the substrate.

In some embodiments of the waveguide display, the first FOV and the second FOV in combination include a full field of view of the display image. In some embodiments, the first FOV and the second FOV include an overlapped FOV. In some embodiments, the overlapped FOV is greater than about 4°. In some embodiments, the first set of gratings has a first diffraction efficiency for display light in the overlapped FOV lower than a second diffraction efficiency for display light in other portions of the first FOV. In some embodiments, the first FOV includes a left FOV of the display image and the second FOV includes a right FOV of the display image. In some embodiments, the first FOV includes a top FOV of the display image and the second FOV includes a bottom FOV of the display image.

In some embodiments, the first set of gratings includes a first grating configured to diffract the display light from the first FOV at two or more regions of the first grating along a first direction to a second direction, and a second grating configured to couple the display light from each of the two or more regions of the first grating out of the substrate at two or more regions of the second grating along the second direction. In some embodiments, the first grating is further configured to diffract, at a first region of the first grating, the display light from the first FOV to the first direction toward the two or more regions of the first grating.

In some embodiments of the waveguide display, the first input coupler includes a first input grating coupler, and the first input grating coupler and the second grating have a same grating vector in a plane perpendicular to a surface normal direction of the substrate. In some embodiments, at least one of the first input grating coupler, the first grating, or the second grating includes a multiplexed volume Bragg grating. In some embodiments, the first grating and the second grating each include a reflective diffraction grating or a transmissive diffraction grating.

In some embodiments, the second set of gratings includes a third grating configured to diffract the display light from the second FOV at two or more regions of the third grating along a third direction to a fourth direction, and a fourth grating configured to couple the display light from each of the two or more regions of the third grating out of the substrate at two or more regions of the fourth grating along the fourth direction.

In some embodiments, the second grating and the fourth grating at least partially overlap. In some embodiments, the second grating and the fourth grating are a same grating. In some embodiments, the first grating and the third grating are spaced apart in at least one of the first direction or the second direction.

In some embodiments, at least one of the first grating, the second grating, the third grating, or the fourth grating includes VBGs recorded in two or more holographic material layers. In some embodiments, the two or more holographic material layers are on two or more surfaces of one or more substrates or on two or more substrates. In some embodiments, the first grating and the third grating are in different holographic material layers. In some embodiments, a thickness of each of the first grating, the second grating, the third grating, and the fourth grating is between 20 μm and 100 μm.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 15A is a front view of an example of a volume Bragg grating-based waveguide display with exit pupil expansion and including two image projectors according to certain embodiments. FIG. 15B is a side view of the example of volume Bragg grating-based waveguide display with exit pupil expansion and including two image projectors according to certain embodiments.

FIG. 16A is a front view of an example of a volume Bragg grating-based waveguide display including two image projectors according to certain embodiments. FIG. 16B is a side view of the example of volume Bragg grating-based waveguide display including two image projectors according to certain embodiments.

FIG. 25 illustrates another example of a volume Bragg grating-based waveguide display with exit pupil expansion, field of view stitching, and form-factor reduction according to certain embodiments.

DETAILED DESCRIPTION

Figure 1:
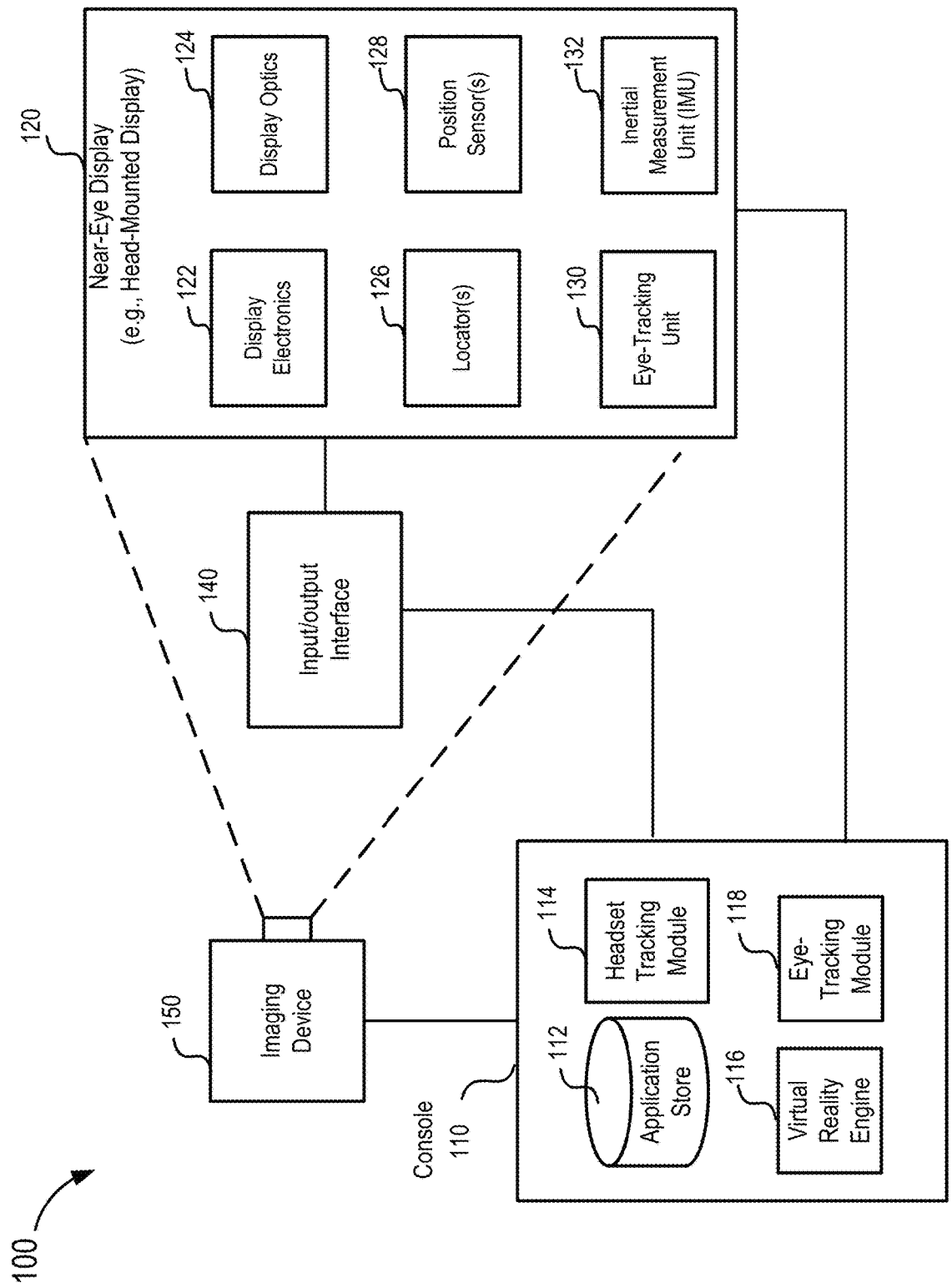
FIG. 1 is a simplified block diagram of an example of an artificial reality system environment including a near-eye display system according to certain embodiments.

This disclosure relates generally to volume Bragg grating (VBG)-based waveguide display for near-eye display systems. In a near-eye display system, it is generally desirable to expand the eyebox, reduce display haze, improve image quality (e.g., resolution and contrast), reduce physical size, increase power efficiency, and increase the field of view. In a waveguide-based near-eye display system, light of projected images may be coupled into a waveguide (e.g., a transparent substrate), propagate within the waveguide, and be coupled out of the waveguide at different locations to replicate exit pupils and expand the eyebox. Two or more gratings may be used to expand the exit pupil in two dimensions. In a waveguide-based near-eye display system for augmented reality applications, light from the surrounding environment may pass through at least a see-through region of the waveguide display (e.g., the transparent substrate) and reach the user's eyes. In some implementations, the light of the projected images may be coupled into or out of the waveguide using diffractive optical elements, such as gratings.

Couplers implemented using diffractive optical elements may be limited to a field of view within an angular range due to the angular dependence of grating efficiency. Therefore, light incident on couplers from multiple incident angles (e.g., from different fields of view) may not be diffracted at equivalent efficiency. In addition, couplers implemented using diffractive optical elements may cause dispersion between light of different colors and different diffraction angles for light of different colors. Therefore, different color components in a color image may not overlap. Thus, the quality of the displayed image (e.g., color reproduction neutrality) may be reduced. Furthermore, the fields of view for different colors may be reduced or partially clipped due to the light dispersion and the limited range of wave vectors of light that can be guided by the waveguide display. To reduce the dispersion and improve field of view (FOV) range and diffraction efficiency, thick transmissive and/or reflective VBG gratings that include many multiplexed gratings to cover different fields of view for different color components may be used, which may be impractical in many cases and/or may cause significant display haze due to the thickness of the gratings and the large number of exposures to record the multiplexed VBG gratings. For example, in some cases, transmissive VBG gratings with a thickness of greater than 1 mm may be used to reduce the dispersion and achieve a desired FOV range and diffraction efficiency. Reflective VBG gratings with a relatively lower thickness may be used to achieve the desired performance. However, with reflection gratings, the gratings for two-dimensional pupil expansion may not overlap and thus the physical size of the waveguide display may be large and the display haze may still be significant.

According to certain embodiments, a single FOV range of a waveguide display may be divided into two or more FOV ranges to be covered by two or more light sources (e.g., projectors), each light source emitting light that is coupled into the transparent substrate by a respective input coupler. The two or more FOV ranges may be stitched together to provide the full field of view. For each FOV range, a set of gratings may be used to expand the exit pupil in two dimensions to fill an eye-box. For example, a top gratings may be used to expand the exit pupil in one direction (e.g., horizontal or vertical) and a bottom gratings may be used to expand the exit pupil in another direction (e.g., vertical or horizontal). In some embodiments, to reduce certain optical artifacts, the two or more sets of gratings and projectors may be configured such that the two or more FOV ranges of the full field of view may partially overlap. As such, even if there is a misalignment of the two or more FOV ranges of the full FOV caused by some manufacture errors, the full FOV can still be supported.

In some cases, ghost effects may be caused by undesired diffraction of display light for a first field of view by a grating for a second field of view. For example, ghost images may exist if the display light for the left half of the FOV is diffracted by the top grating for the right half of the FOV or if the display light for the right half of the FOV is diffracted by the top grating for the left half of the FOV. In some embodiments, to reduce the ghost effects, the two or more top gratings may be offset from each other and may not overlap. In some embodiments, the bottom gratings for the different FOVs may be a single grating. In some embodiments, the two or more top gratings may be designed such that the undesired diffraction of display light by a grating may not reach the eyebox and thus may not be observed by the user.

In some embodiments, two VBG gratings (or two portions of a same grating) with matching grating vectors (e.g., having the same grating vector in a plane perpendicular to a surface normal direction of the transparent substrate) may be used to diffract display light and expand the exit pupil in one dimension. The two VBG gratings may compensate for the dispersion of display light caused by each other to reduce the overall dispersion, due to the opposite Bragg conditions (e.g., +1 order and −1 order diffractions) at the two VBG gratings. Therefore, thin VBG gratings may be used to achieve the desired resolution. Because of the dispersion compensation, thin transmissive VBG gratings may be used to achieve the desired resolution, and the gratings for the two-dimensional pupil expansion may at least partially overlap to reduce the physical size of the waveguide display.

In some embodiments, a first pair of VBG gratings (or two portions of a grating) may be used to expand the exit pupil in one dimension and compensate for the dispersion caused by each other, and a second pair of VBG gratings (or two portions of a grating) may be used to expand the exit pupil in another dimension and may compensate for the dispersion caused by each other. Thus, the exit pupil may be replicated in two dimensions and the resolution of the displayed images may be high in both dimensions.

In the following description, various inventive embodiments are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140, each of which may be coupled to an optional console 110. While FIG. 1 shows an example of artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audio, or any combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form-factor, including a pair of glasses. Some embodiments of near-eye display 120 are further described below with respect to FIGS. 2 and 3. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of eye-tracking unit 130, locators 126, position sensors 128, and IMU 132, or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (µLED) display, an active-matrix OLED display (AMOLED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (e.g., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display 120.

Display optics 124 may also be designed to correct one or more types of optical errors, such as two-dimensional optical errors, three-dimensional optical errors, or any combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be an LED, a corner cube reflector, a reflective marker, a type of light source that contrasts with an environment in which near-eye display 120 operates, or any combination thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may include one or more cameras, one or more video cameras, any other device capable of capturing images including one or more of locators 126, or any combination thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or any combination thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or any combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or any combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, external imaging device 150 may be used to track input/output interface 140, such as tracking the location or position of a controller (which may include, for example, an IR light source) or a hand of the user to determine the motion of the user. In some embodiments, near-eye display 120 may include one or more imaging devices to track input/output interface 140, such as tracking the location or position of a controller or a hand of the user to determine the motion of the user.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, an artificial reality engine 116, and an eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or any combination thereof, to predict a future location of near-eye display 120. Headset tracking module 114 may provide the estimated or predicted future position of near-eye display 120 to artificial reality engine 116.

Artificial reality engine 116 may execute applications within artificial reality system environment 100 and receive position information of near-eye display 120, acceleration information of near-eye display 120, velocity information of near-eye display 120, predicted future positions of near-eye display 120, or any combination thereof from headset tracking module 114. Virtual reality engine 116 may also receive estimated eye position and orientation information from eye-tracking module 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to more accurately determine the eye's orientation.

Figure 2:
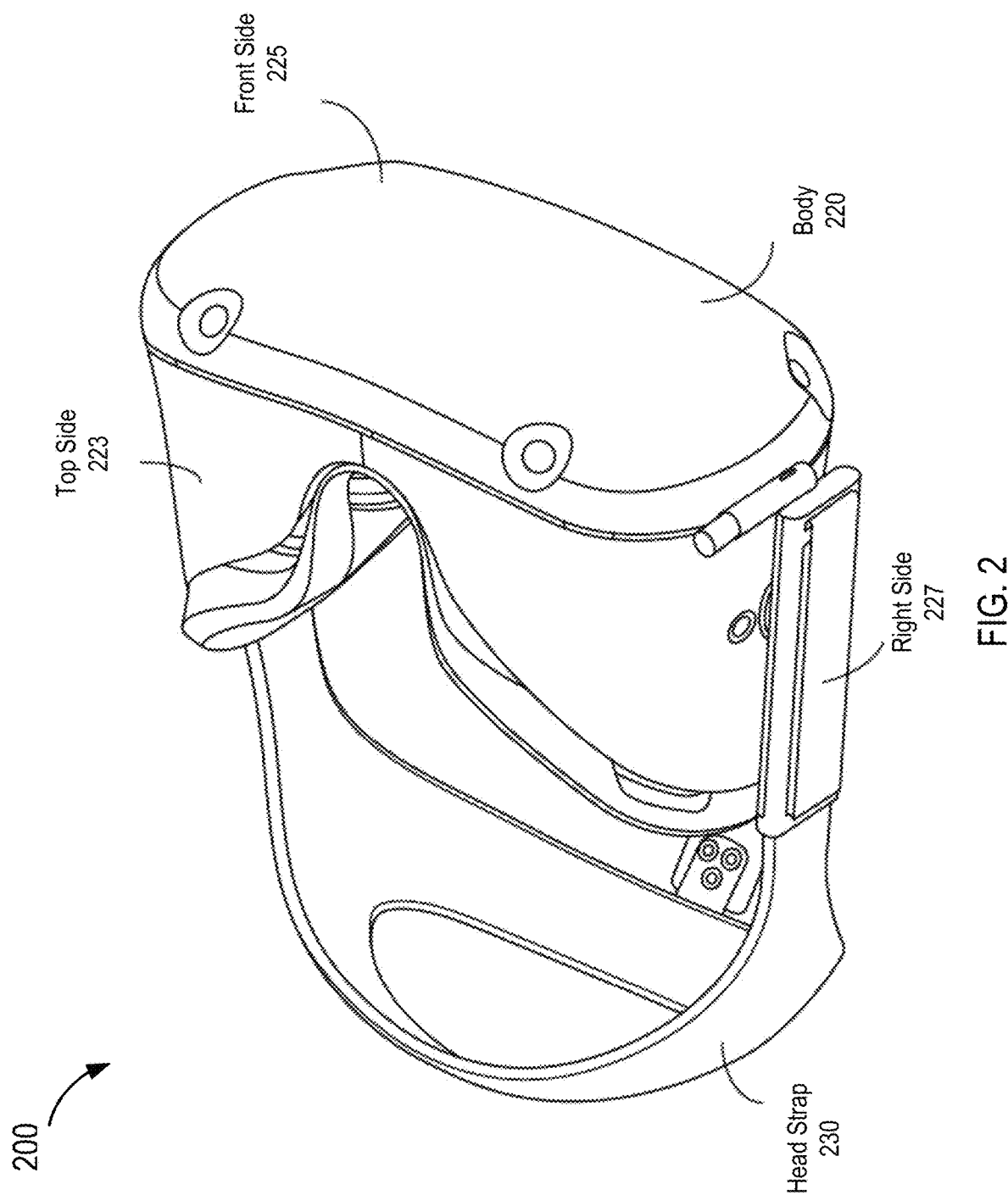
FIG. 2 is a perspective view of an example of a near-eye display system in the form of a head-mounted display (HMD) device for implementing some of the examples disclosed herein.

FIG. 2 is a perspective view of an example of a near-eye display in the form of an HMD device 200 for implementing some of the examples disclosed herein. HMD device 200 may be a part of, e.g., a VR system, an AR system, an MR system, or any combination thereof. HMD device 200 may include a body 220 and a head strap 230. FIG. 2 shows a top side 223, a front side 225, and a right side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 3 below, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audio, or any combination thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, an LCD, an OLED display, an ILED display, a µLED display, an AMOLED, a TOLED, some other display, or any combination thereof. HMD device 200 may include two eyebox regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or any combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
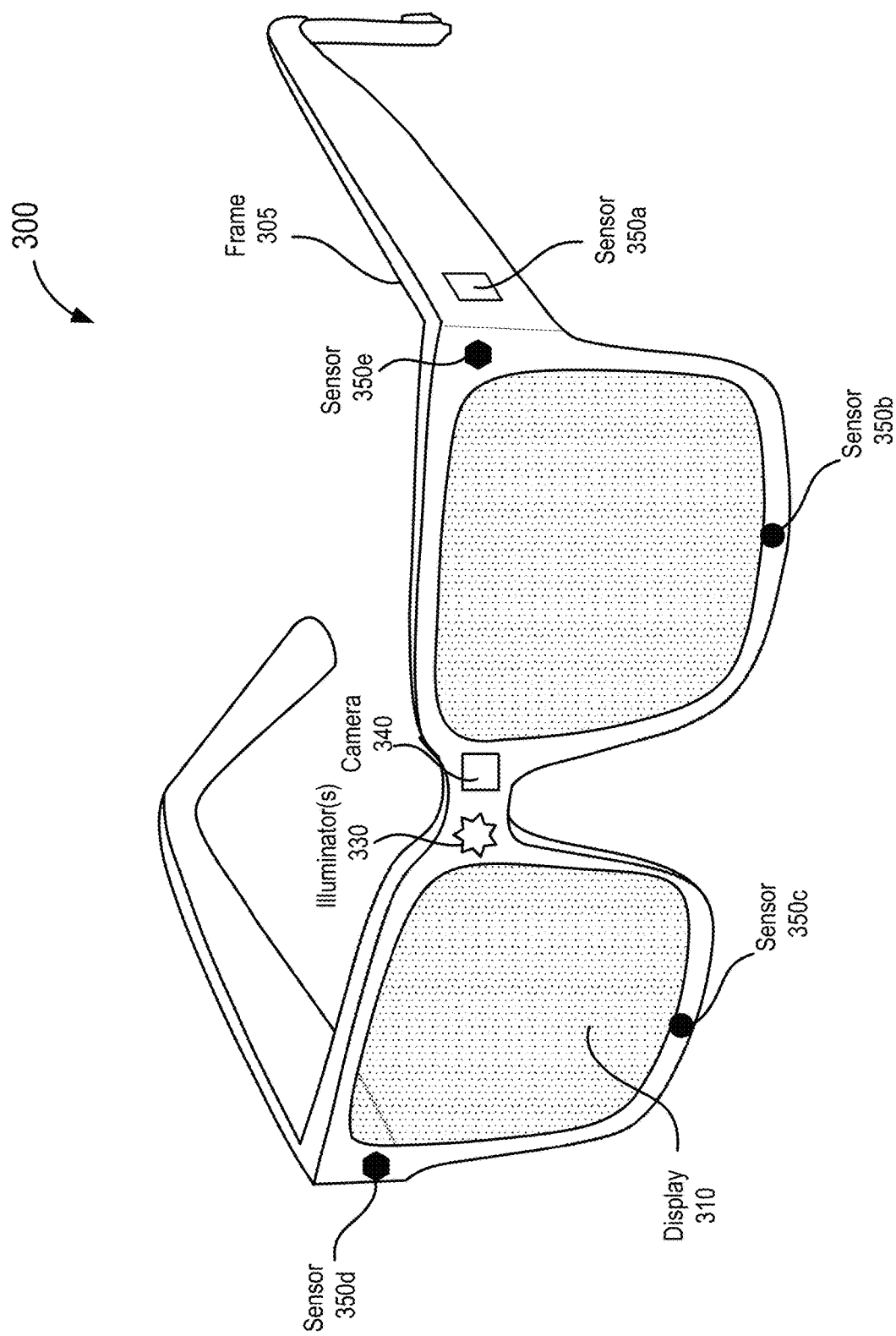
FIG. 3 is a perspective view of an example of a near-eye display system in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display 300, and/or to provide an interactive VR/AR/MR experience to a user of near-eye display 300. In some embodiments, sensors 350a-350e may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light pattern onto the objects within the environment. In some embodiments, illuminator(s) 330 may be used as locators, such as locators 126 described above with respect to FIG. 1.

In some embodiments, near-eye display 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
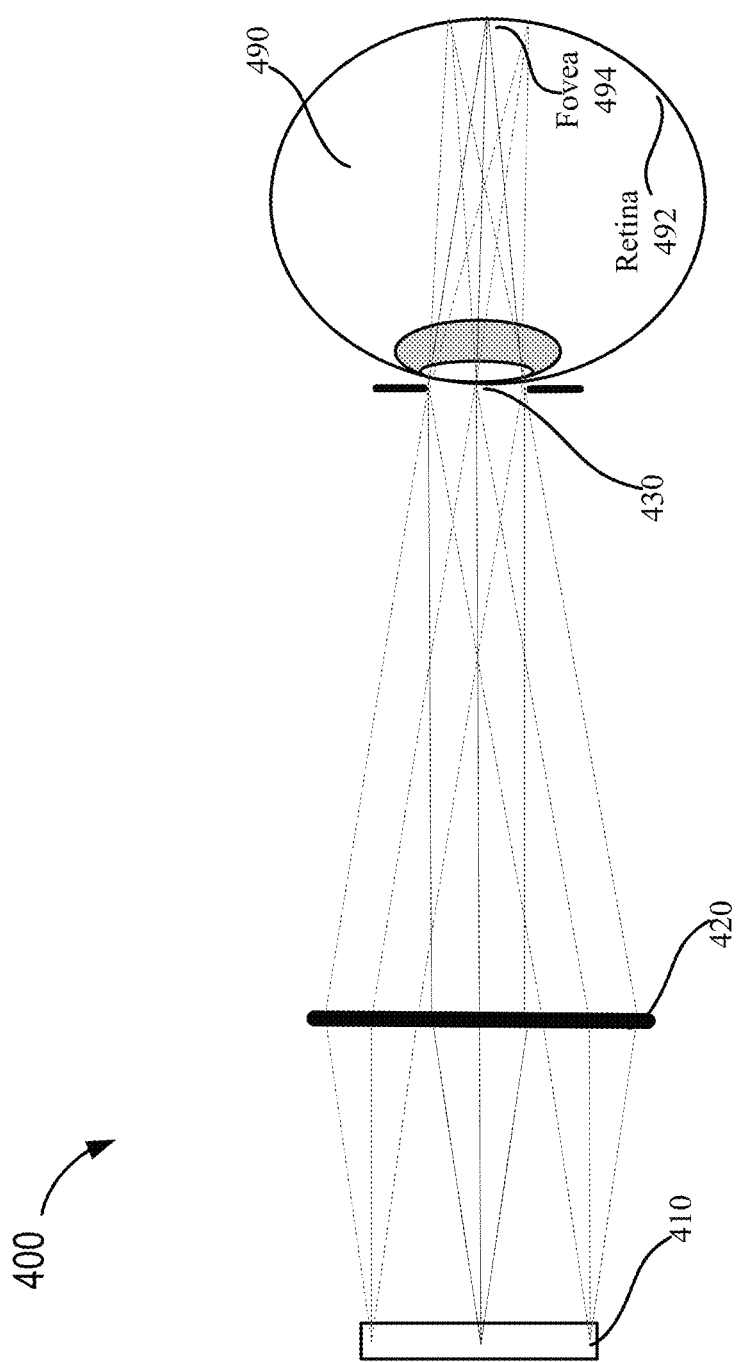
FIG. 4 is a simplified diagram illustrating an example of an optical system in a near-eye display system.

FIG. 4 is a simplified diagram illustrating an example of an optical system 400 in a near-eye display system. Optical system 400 may include an image source 410 and projector optics 420. In the example shown in FIG. 4, image source 410 is in front of projector optics 420. In various embodiments, image source 410 may be located outside of the field of view of user's eye 490. For example, one or more reflectors or directional couplers may be used to deflect light from an image source that is outside of the field of view of user's eye 490 to make the image source appear to be at the location of image source 410 shown in FIG. 4. Light from an area (e.g., a pixel or a light emitting device) on image source 410 may be collimated and directed to an exit pupil 430 by projector optics 420. Thus, objects at different spatial locations on image source 410 may appear to be objects far away from user's eye 490 in different viewing angles (FOVs). The collimated light from different viewing angles may then be focused by the lens of user's eye 490 onto different locations on retina 492 of user's eye 490. For example, at least some portions of the light may be focused on a fovea 494 on retina 492. Collimated light rays from an area on image source 410 and incident on user's eye 490 from a same direction may be focused onto a same location on retina 492. As such, a single image of image source 410 may be formed on retina 492.

The user experience of using an artificial reality system may depend on several characteristics of the optical system, including field of view (FOV), image quality (e.g., angular resolution), size of the eyebox (to accommodate for eye and head movements), and brightness of the light (or contrast) within the eyebox. Field of view describes the angular range of the image as seen by the user, usually measured in degrees as observed by one eye (for a monocular HMD) or both eyes (for either biocular or binocular HMDs). The human visual system may have a total binocular FOV of about 200° (horizontal) by 130° (vertical). To create a fully immersive visual environment, a large FOV is desirable because a large FOV (e.g., greater than about 60°) may provide a sense of "being in" an image, rather than merely viewing the image. Smaller fields of view may also preclude some important visual information. For example, an HMD system with a small FOV may use a gesture interface, but the users may not see their hands in the small FOV to be sure that they are using the correct motions. On the other hand, wider fields of view may require larger displays or optical systems, which may influence the size, weight, cost, and comfort of using the HMD.

Resolution may refer to the angular size of a displayed pixel or image element appearing to a user, or the ability for the user to view and correctly interpret an object as imaged by a pixel and/or other pixels. The resolution of an HMD may be specified as the number of pixels on the image source for a given FOV value, from which an angular resolution may be determined by dividing the FOV in one direction by the number of pixels in the same direction on the image source. For example, for a horizontal FOV of 40° and 1080 pixels in the horizontal direction on the image source, the corresponding angular resolution may be about 2.2 arcminutes, compared with the one-arc-minute resolution associated with Snellen 20/20 human visual acuity.

In some cases, the eyebox may be a two-dimensional box in front of the user's eye, from which the displayed image from the image source may be viewed. If the pupil of the user moves outside of the eyebox, the displayed image may not be seen by the user. For example, in a non-pupil-forming configuration, there exists a viewing eyebox within which there will be unvignetted viewing of the HMD image source, and the displayed image may vignette or may be clipped but may still be viewable when the pupil of user's eye is outside of the viewing eyebox. In a pupil-forming configuration, the image may not be viewable outside the exit pupil.

The fovea of a human eye, where the highest resolution may be achieved on the retina, may correspond to an FOV of about 2° to about 3°. This may require that the eye rotates in order to view off-axis objects with a highest resolution. The rotation of the eye to view the off-axis objects may introduce a translation of the pupil because the eye rotates around a point that is about 10 mm behind the pupil. In addition, a user may not always be able to accurately position the pupil (e.g., having a radius of about 2.5 mm) of the user's eye at an ideal location in the eyebox. Furthermore, the environment where the HMD is used may require the eyebox to be larger to allow for movement of the user's eye and/or head relative the HMD, for example, when the HMD is used in a moving vehicle or designed to be used while the user is moving on foot. The amount of movement in these situations may depend on how well the HMD is coupled to the user's head.

Thus, the optical system of the HMD may need to provide a sufficiently large exit pupil or viewing eyebox for viewing the full FOV with full resolution, in order to accommodate the movements of the user's pupil relative to the HMD. For example, in a pupil-forming configuration, a minimum size of 12 mm to 15 mm may be desired for the exit pupil. If the eyebox is too small, minor misalignments between the eye and the HMD may result in at least partial loss of the image, and the user experience may be substantially impaired. In general, the lateral extent of the eyebox is more critical than the vertical extent of the eyebox. This may be in part due to the significant variances in eye separation distance between users, and the fact that misalignments to eyewear tend to more frequently occur in the lateral dimension and users tend to more frequently adjust their gaze left and right, and with greater amplitude, than adjusting the gaze up and down. Thus, techniques that can increase the lateral dimension of the eyebox may substantially improve a user's experience with an HMD. On the other hand, the larger the eyebox, the larger the optics and the heavier and bulkier the near-eye display device may be.

In order to view the displayed image against a bright background, the image source of an AR HMD may need to be sufficiently bright, and the optical system may need to be efficient to provide a bright image to the user's eye such that the displayed image may be visible in a background including strong ambient light, such as sunlight. The optical system of an HMD may be designed to concentrate light in the eyebox. When the eyebox is large, an image source with high power may be used to provide a bright image viewable within the large eyebox. Thus, there may be trade-offs among the size of the eyebox, cost, brightness, optical complexity, image quality, and size and weight of the optical system.

Figure 5:
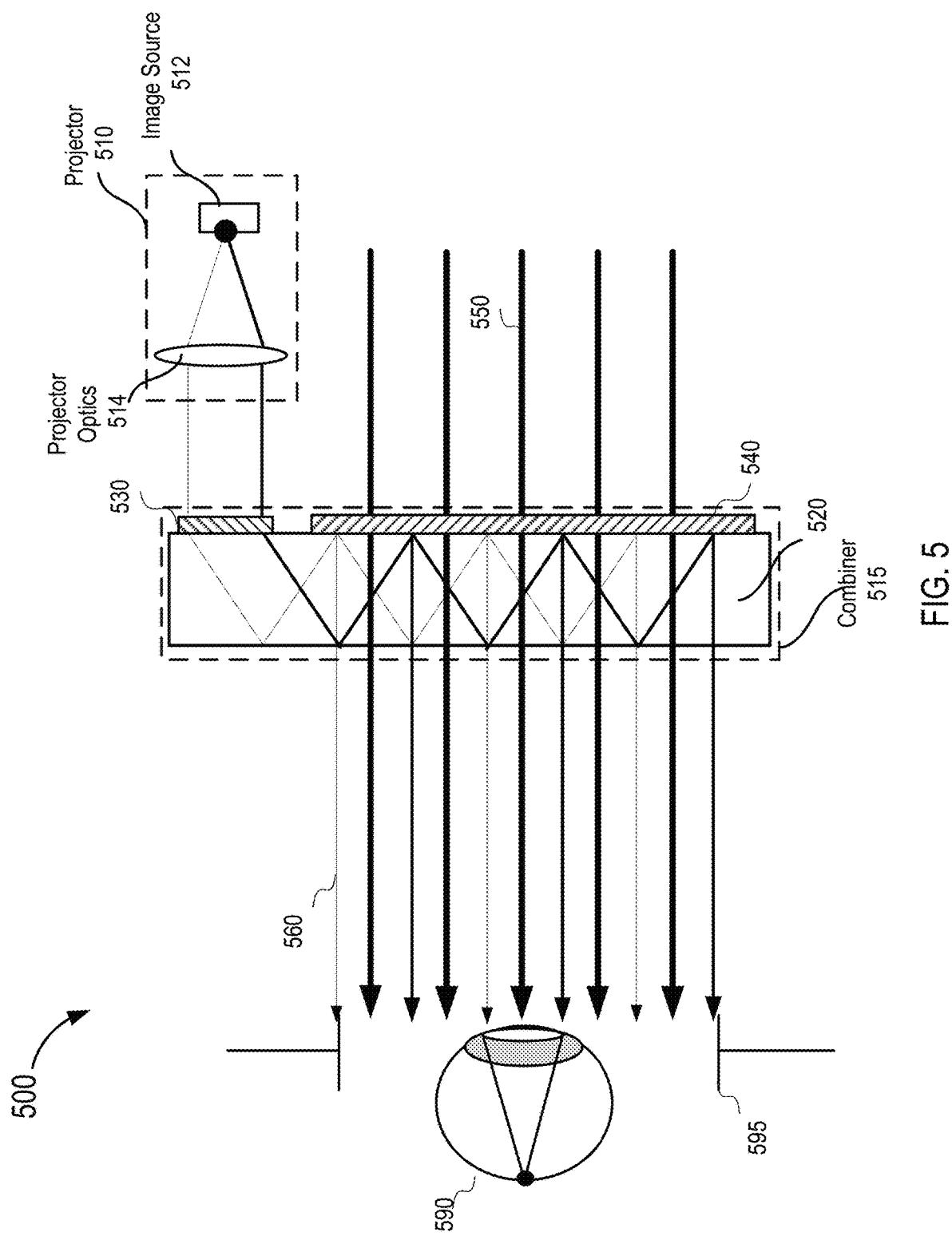
FIG. 5 illustrates an example of an optical see-through augmented reality system including a waveguide display for exit pupil expansion according to certain embodiments.

FIG. 5 illustrates an example of an optical see-through augmented reality system 500 including a waveguide display for exit pupil expansion according to certain embodiments. Augmented reality system 500 may include a projector 510 and a combiner 515. Projector 510 may include a light source or image source 512 and projector optics 514. In some embodiments, light source or image source 512 may include one or more micro-LED devices. In some embodiments, image source 512 may include a plurality of pixels that displays virtual objects, such as an LCD display panel or an LED display panel. In some embodiments, image source 512 may include a light source that generates coherent or partially coherent light. For example, image source 512 may include a laser diode, a vertical cavity surface emitting laser, an LED, a superluminescent LED (sLED), and/or a micro-LED described above. In some embodiments, image source 512 may include a plurality of light sources (e.g., an array of micro-LEDs described above) each emitting a monochromatic image light corresponding to a primary color (e.g., red, green, or blue). In some embodiments, image source 512 may include three two-dimensional arrays of micro-LEDs, where each two-dimensional array of micro-LEDs may include micro-LEDs configured to emit light of a primary color (e.g., red, green, or blue). In some embodiments, image source 512 may include an optical pattern generator, such as a spatial light modulator. Projector optics 514 may include one or more optical components that can condition the light from image source 512, such as expanding, collimating, scanning, or projecting light from image source 512 to combiner 515. The one or more optical components may include, for example, one or more lenses, liquid lenses, mirrors, free-form optics, apertures, and/or gratings. For example, in some embodiments, image source 512 may include one or more one-dimensional arrays or elongated two-dimensional arrays of micro-LEDs, and projector optics 514 may include one or more one-dimensional scanners (e.g., micro-mirrors or prisms) configured to scan the one-dimensional arrays or elongated two-dimensional arrays of micro-LEDs to generate image frames. In some embodiments, projector optics 514 may include a liquid lens (e.g., a liquid crystal lens) with a plurality of electrodes that allows scanning of the light from image source 512.

Combiner 515 may include an input coupler 530 for coupling light from projector 510 into a substrate 520 of combiner 515. Input coupler 530 may include a volume holographic grating or another diffractive optical element (DOE) (e.g., a surface-relief grating (SRG)), a slanted reflective surface of substrate 520, or a refractive coupler (e.g., a wedge or a prism). Input coupler 530 may have a coupling efficiency of greater than 30%, 50%, 75%, 90%, or higher for visible light. Visible light coupled into substrate 520 may propagate within substrate 520 through, for example, total internal reflection (TIR). Substrate 520 may be in the form of a lens of a pair of eyeglasses. Substrate 520 may have a flat or a curved surface, and may include one or more types of dielectric materials, such as glass, quartz, plastic, polymer, poly(methyl methacrylate) (PMMA), crystal, ceramic, or the like. A thickness of the substrate may range from, for example, less than about 1 mm to about 10 mm or more. Substrate 520 may be transparent to visible light.

Substrate 520 may include or may be coupled to a plurality of output couplers 540 each configured to extract at least a portion of the light guided by and propagating within substrate 520 from substrate 520, and direct extracted light 560 to an eyebox 595 where an eye 590 of the user of augmented reality system 500 may be located when augmented reality system 500 is in use. The plurality of output couplers 540 may replicate the exit pupil to increase the size of eyebox 595, such that the displayed image may be visible in a larger area. As input coupler 530, output couplers 540 may include grating couplers (e.g., volume holographic gratings or surface-relief gratings), other diffraction optical elements (DOEs), prisms, etc. Output couplers 540 may have different coupling (e.g., diffraction) efficiencies at different locations. Substrate 520 may also allow light 550 from the environment in front of combiner 515 to pass through with little or no loss. Output couplers 540 may also allow light 550 to pass through with little loss. For example, in some implementations, output couplers 540 may have a very low diffraction efficiency for light 550 such that light 550 may be refracted or otherwise pass through output couplers 540 with little loss, and thus may have a higher intensity than extracted light 560. As a result, the user may be able to view combined images of the environment in front of combiner 515 and images of virtual objects projected by projector 510. In some implementations, output couplers 540 may have a high diffraction efficiency for light 550 and may diffract light 550 to certain desired directions (e.g., diffraction angles) with little loss.

In some embodiments, projector 510, input coupler 530, and output coupler 540 may be on any side of substrate 520. Input coupler 530 and output coupler 540 may be reflection gratings (also referred to as reflection gratings) or transmission gratings (also referred to as transmission gratings) to couple display light into or out of substrate 520.

Figure 6:
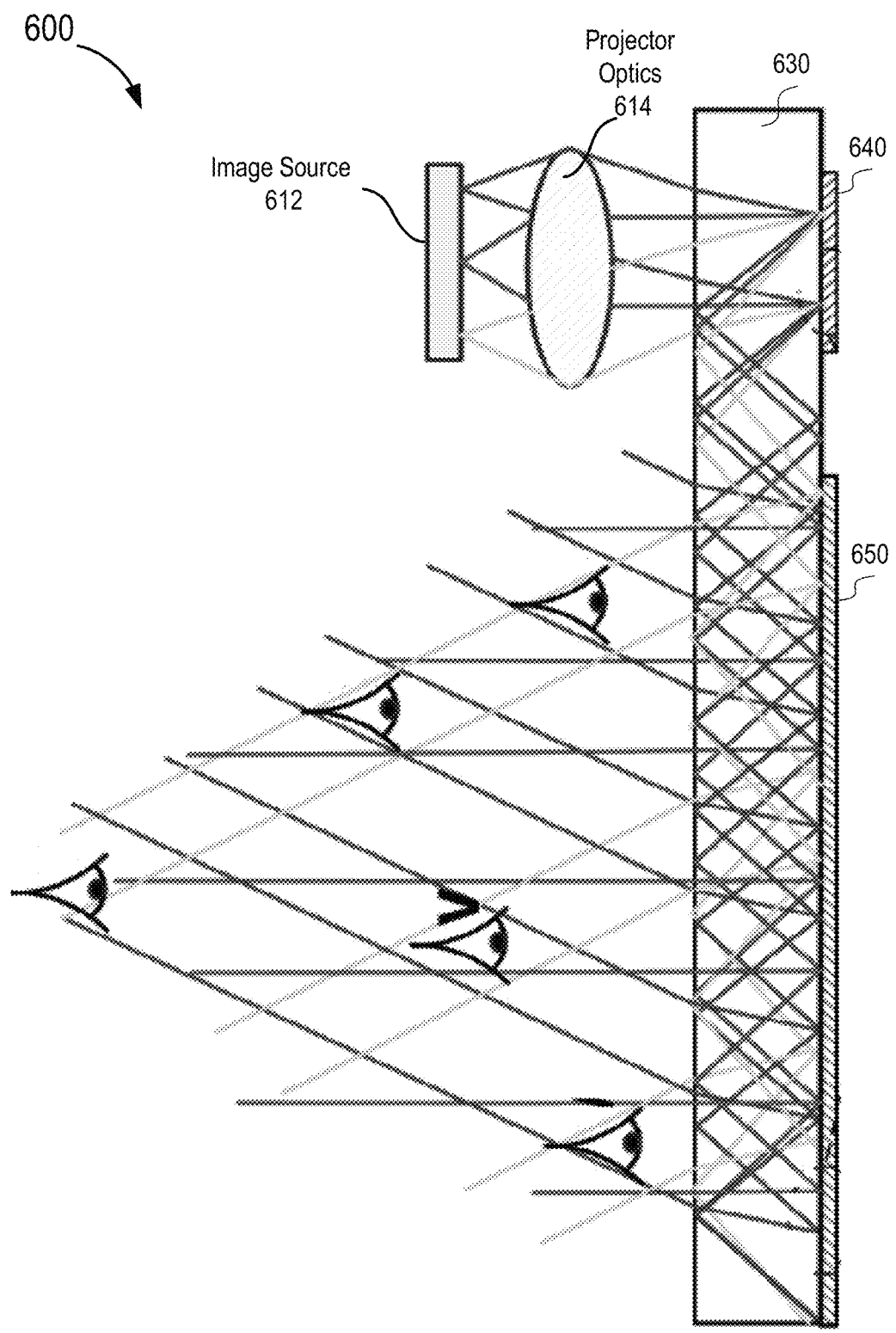
FIG. 6 illustrates an example of an optical see-through augmented reality system including a waveguide display for exit pupil expansion according to certain embodiments.

FIG. 6 illustrates an example of an optical see-through augmented reality system 600 including a waveguide display for exit pupil expansion according to certain embodiments. Augmented reality system 600 may be similar to augmented reality system 500, and may include the waveguide display and a projector that may include a light source or image source 612 and projector optics 614. The waveguide display may include a substrate 630, an input coupler 640, and a plurality of output couplers 650 as described above with respect to augmented reality system 500. While FIG. 5 only shows the propagation of light from a single field of view, FIG. 6 shows the propagation of light from multiple fields of view.

FIG. 6 shows that the exit pupil is replicated by output couplers 650 to form an aggregated exit pupil or eyebox, where different fields of view (e.g., different pixels on image source 612) may be associated with different respective propagation directions towards the eyebox, and light from a same field of view (e.g., a same pixel on image source 612) may have a same propagation direction for the different individual exit pupils. Thus, a single image of image source 612 may be formed by the user's eye located anywhere in the eyebox, where light from different individual exit pupils and propagating in the same direction may be from a same pixel on image source 612 and may be focused onto a same location on the retina of the user's eye. FIG. 6 shows that the image of the image source is visible by the user's eye even if the user's eye moves to different locations in the eyebox.

In many waveguide-based near-eye display systems, in order to expand the eyebox of the waveguide-based near-eye display in two dimensions, two or more output gratings may be used to expand the display light in two dimensions or along two axes (which may be referred to as dual-axis pupil expansion). The two gratings may have different grating parameters, such that one grating may be used to replicate the exit pupil in one direction and the other grating may be used to replicate the exit pupil in another direction.

As described above, the input and output grating couplers described above can be volume holographic gratings or surface-relief gratings, which may have very different Klein-Cook parameter Q:

$$Q = \frac{2\pi \lambda d}{n \Lambda^2},$$

where d is the thickness of the grating, λ is the wavelength of the incident light in free space, Λ is the grating period, and n is the refractive index of the recording medium. The Klein-Cook parameter Q may divide light diffraction by gratings into three regimes. When a grating is characterized by Q<<1, light diffraction by the grating may be referred to as Raman-Nath diffraction, where multiple diffraction orders may occur for normal and/or oblique incident light. When a grating is characterized by Q>>1 (e.g., Q≥10), light diffraction by the grating may be referred to as Bragg diffraction, where generally only the zeroth and the ±1 diffraction orders may occur for light incident on the grating at an angle satisfying the Bragg condition. When a grating is characterized by Q≈1, the diffraction by the grating may be between the Raman-Nath diffraction and the Bragg diffraction. To meet Bragg conditions, the thickness d of the grating may be higher than certain values to occupy a volume (rather than at a surface) of a medium, and thus may be referred to as a volume Bragg grating. VBGs may generally have relatively small refractive index modulations (e.g., Δn≤0.05) and high spectral and angular selectivity, while surface-relief gratings may generally have large refractive index modulations (e.g., Δn≥0.5) and wide spectral and angular bandwidths.

Figure 7A:
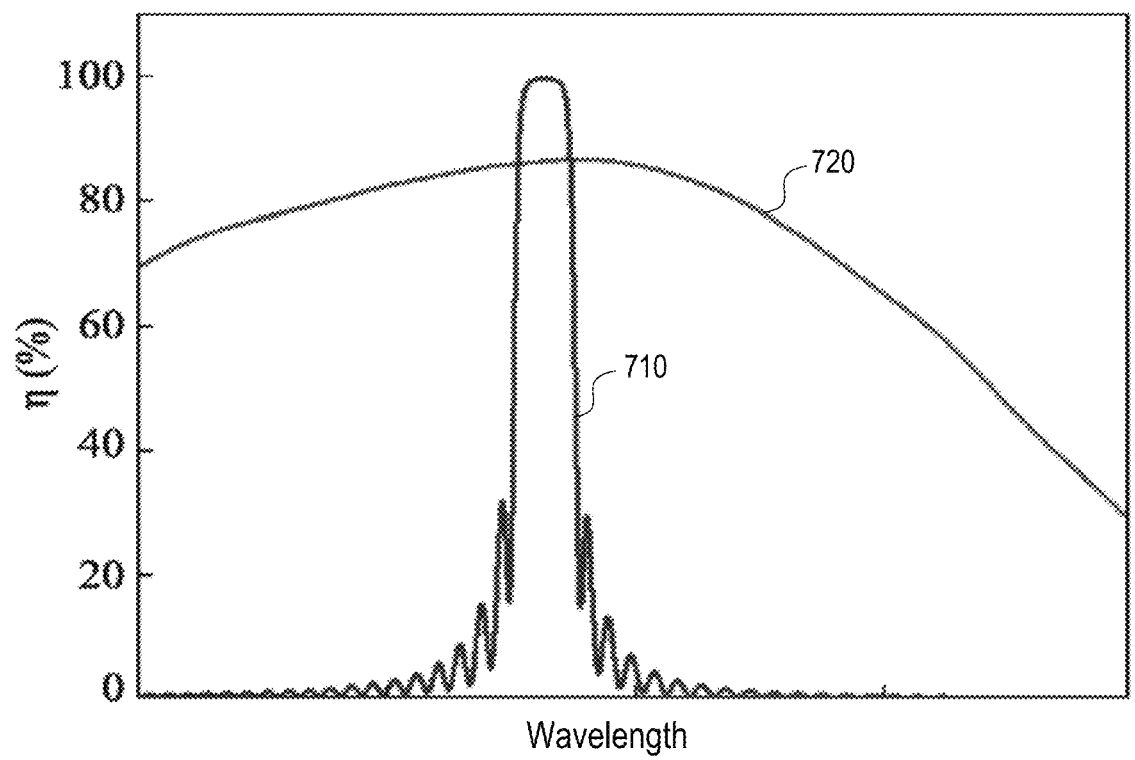
FIG. 7A illustrates the spectral bandwidth of an example of a reflective volume Bragg grating (VBG) and the spectral bandwidth of an example of a transmissive surface-relief grating (SRG).

FIG. 7A illustrates the spectral bandwidth of an example of a volume Bragg grating (e.g., a reflective VBG) and the spectral bandwidth of an example of a surface-relief grating (e.g., a transmissive SRG). The horizontal axis represents the wavelength of the incident visible light and the vertical axis corresponds to the diffraction efficiency. As shown by a curve 710, the diffraction efficiency of the reflective VBG is high in a narrow wavelength range, such as green light. In contrast, the diffraction efficiency of the transmissive SRG may be high in a very wide wavelength range, such as from blue to red light, as shown by a curve 720.

Figure 7B:
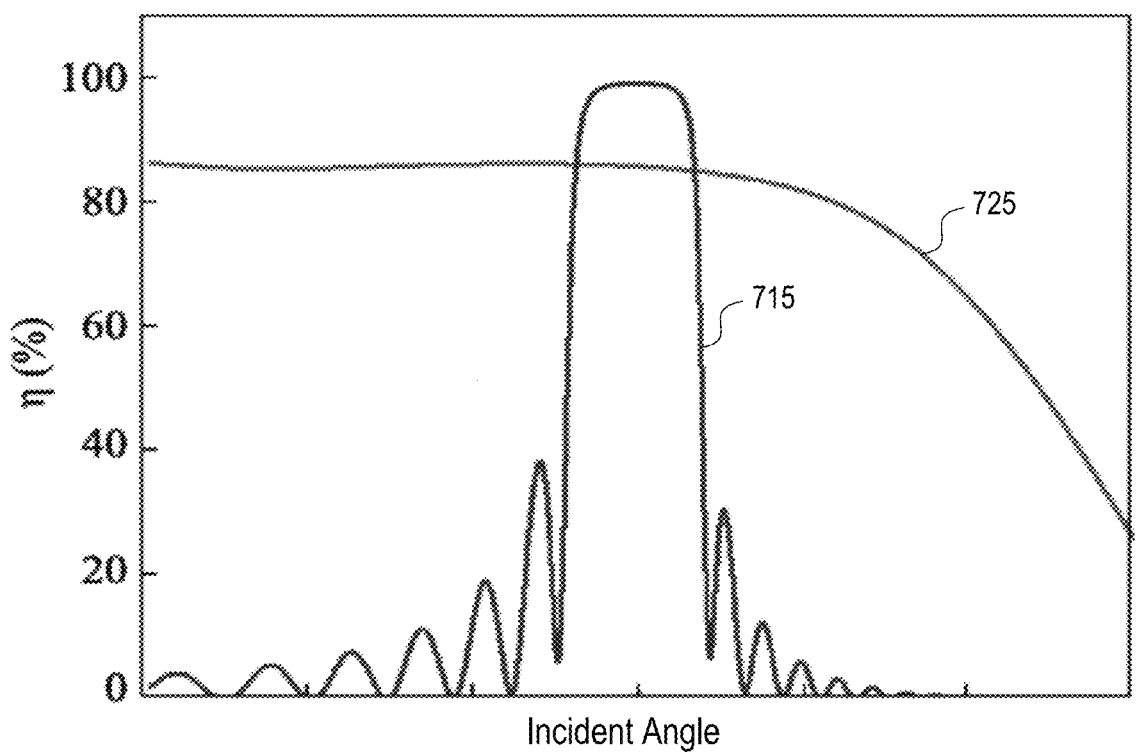
FIG. 7B illustrates the angular bandwidth of an example of a reflective VBG and the angular bandwidth of an example of a transmissive SRG.

FIG. 7B illustrates the angular bandwidth of an example of a volume Bragg grating (e.g., a reflective VBG) and the angular bandwidth of an example of a surface-relief grating (e.g., a transmissive SRG). The horizontal axis represents the incident angle of the visible light incident on the grating, and the vertical axis corresponds to the diffraction efficiency. As shown by a curve 715, the diffraction efficiency of the reflective VBG is high for light incident on the grating from a narrow angular range, such as about ±2.5° from the perfect Bragg condition. In contrast, the diffraction efficiency of the transmissive SRG is high in a very wide angular range, such as greater than about ±10° or wider, as shown by a curve 725.

Due to the high spectral selectivity at the Bragg condition, VBGs, such as reflective VBGs, may allow for single-waveguide design without crosstalk between primary colors, and may exhibit superior see-through quality. However, the spectral and angular selectivity may lead to lower efficiency because only a portion of the display light in the full FOV may be diffracted and reach user's eyes.

Figure 8B:
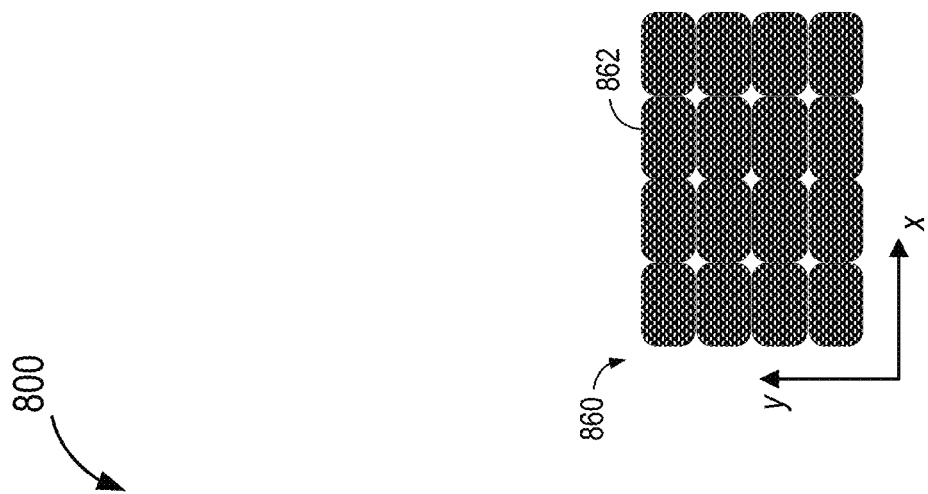
FIG. 8B illustrates an example of an eye box including two-dimensional replicated exit pupils according to certain embodiments.
Figure 8A:
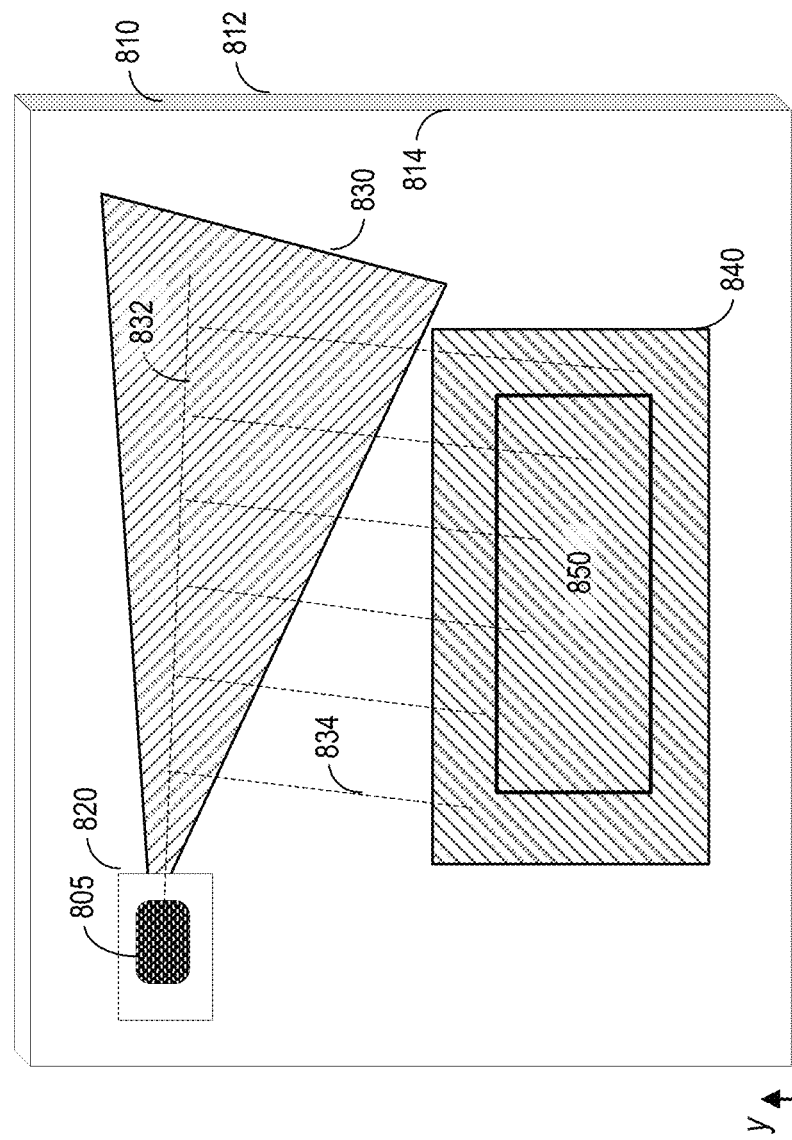
FIG. 8A illustrates an example of an optical see-through augmented reality system including a waveguide display and surface-relief gratings for exit pupil expansion according to certain embodiments.

FIG. 8A illustrates an example of an optical see-through augmented reality system including a waveguide display 800 and surface-relief gratings for exit pupil expansion according to certain embodiments. Waveguide display 800 may include a substrate 810 (e.g., a waveguide), which may be similar to substrate 520. Substrate 810 may be transparent to visible light and may include, for example, a glass, quartz, plastic, polymer, PMMA, ceramic, or crystal substrate. Substrate 810 may be a flat substrate or a curved substrate. Substrate 810 may include a first surface 812 and a second surface 814. Display light may be coupled into substrate 810 by an input coupler 820, and may be reflected by first surface 812 and second surface 814 through total internal reflection, such that the display light may propagate within substrate 810. As described above, input coupler 820 may include a grating, a refractive coupler (e.g., a wedge or a prism), or a reflective coupler (e.g., a reflective surface having a slant angle with respect to substrate 810). For example, in one embodiment, input coupler 820 may include a prism that may couple display light of different colors into substrate 810 at a same refraction angle. In another example, input coupler 820 may include a grating coupler that may diffract light of different colors into substrate 810 at different directions. Input coupler 820 may have a coupling efficiency of greater than 10%, 20%, 30%, 50%, 75%, 90%, or higher for visible light.

Waveguide display 800 may also include a first grating 830 and a second grating 840 positioned on one or two surfaces (e.g., first surface 812 and second surface 814) of substrate 810 for expanding incident display light beam in two dimensions in order to fill an eyebox (or output or exit pupil) with the display light. First grating 830 may be configured to expand at least a portion of the display light beam along one direction, such as approximately in the x direction. Display light coupled into substrate 810 may propagate in a direction shown by a line 832. While the display light propagates within substrate 810 along a direction shown by line 832, a portion of the display light may be diffracted by a portion of first grating 830 towards second grating 840 as shown by a line 834 each time the display light propagating within substrate 810 reaches first grating 830. Second grating 840 may then expand the display light from first grating 830 in a different direction (e.g., approximately in the y direction) by diffracting a portion of the display light to the eyebox each time the display light propagating within substrate 810 reaches second grating 840. On second grating 840, an exit region 850 represents the region where display light for the full FOV at one pupil location in the eyebox (e.g., at the center the eyebox) may be coupled out of waveguide display 800

FIG. 8B illustrates an example of an eye box including two-dimensional replicated exit pupils. FIG. 8B shows that a single input pupil 805 may be replicated by first grating 830 and second grating 840 to form an aggregated exit pupil 860 that includes a two-dimensional array of individual exit pupils 852. For example, the exit pupil may be replicated in approximately the x direction by first grating 830 and in approximately the y direction by second grating 840. As described above, output light from individual exit pupils 852 and propagating in a same direction may be focused onto a same location in the retina of the user's eye. Thus, a single image may be formed by the user's eye from the output light in the two-dimensional array of individual exit pupils 852.

Figure 9B:
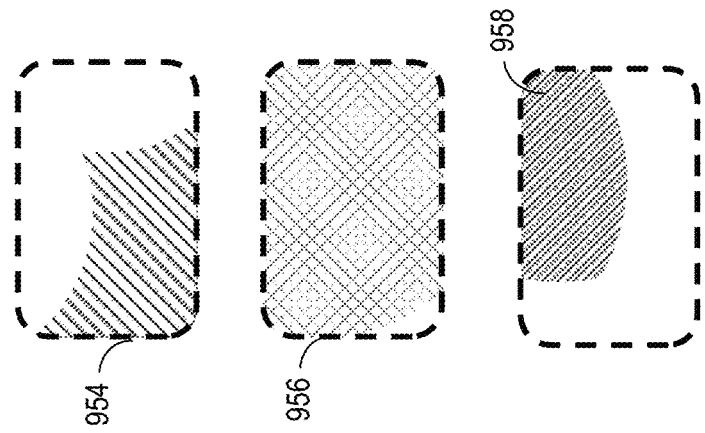
FIG. 9B illustrates the field-of-view clipping by the examples of surface-relief gratings for exit pupil expansion in the waveguide display.
Figure 9A:
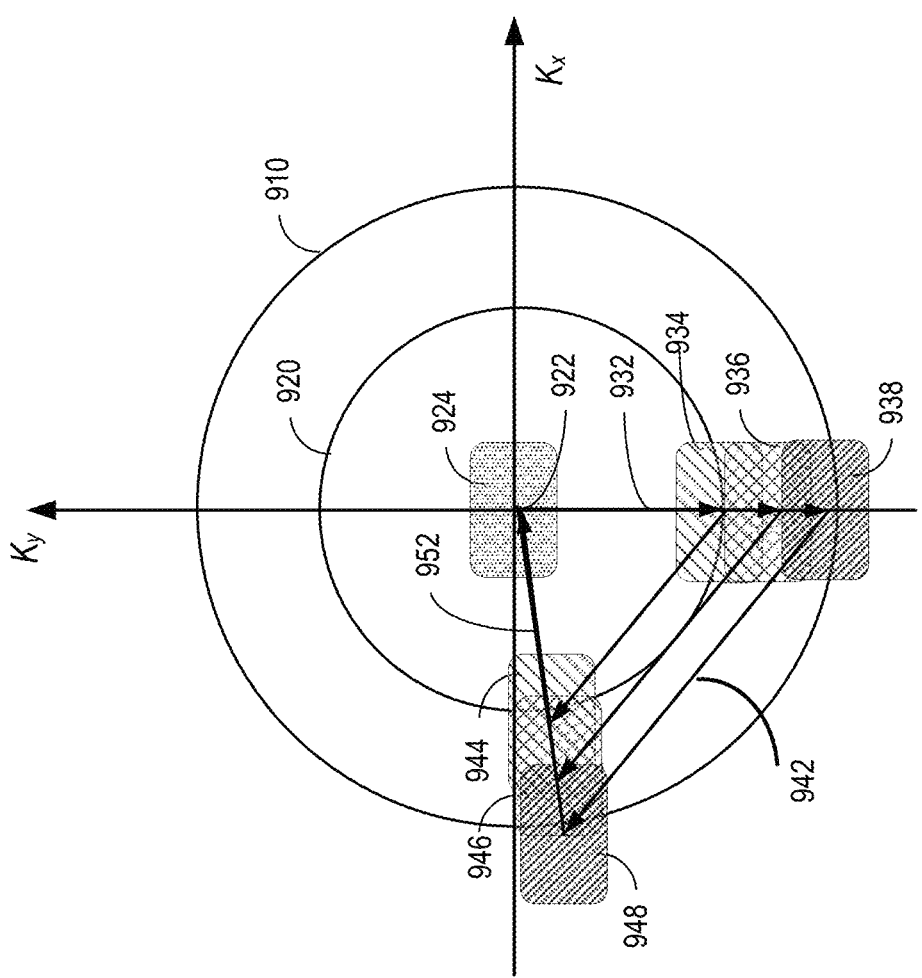
FIG. 9A illustrates wave vectors of light diffracted by examples of surface-relief gratings for exit pupil expansion in a waveguide display and exit pupils for multiple colors.

FIG. 9A illustrates wave vectors of light diffracted by examples of surface-relief gratings for exit pupil expansion in a waveguide display and exit pupils for multiple colors. A circle 910 may represent wave vectors of light that may be guided by the waveguide. For light with wave vectors outside of circle 910, the light may become evanescent. A circle 920 may represent wave vectors of light that may leak out of the waveguide because the total-internal-reflection condition is not met. Thus, the ring between circle 910 and circle 920 may represent the wave vectors of light that can be guided by the waveguide and can propagate within the waveguide through TIR. Wave vectors 932 show the light dispersion caused by the input grating, where light of different colors may have different wave vectors and different diffraction angles. Wave vectors 942 show the light dispersion caused by a front grating (e.g., first grating 830), where light of different colors may have different diffraction angles. Wave vectors 952 show the light dispersion caused by a back grating (e.g., second grating 840), where light of different colors may have different diffraction angles. The wave vectors for each color may form a respective closed triangle, and the triangles for different colors may share a common origin vertex 922. Thus, the overall dispersion by the three gratings may be close to zero.

Even though the overall dispersion by the three gratings may be zero, the dispersion by each grating may cause the reduction or clipping of the field of view of the waveguide display due to the conditions under which light may be guided by the waveguide as shown by the ring between circle 910 and circle 920. For example, for a FOV 924, the footprints of the FOV after the diffraction by the input grating may be different for different colors due to the dispersion by the input grating. In the example shown in FIG. 9A, a footprint 936 of the FOV for light of a first color may be located in the ring, while a portion of a footprint 934 of the FOV for light of a second color and a portion of a footprint 938 of the FOV for light of a third color may fall outside of the ring and thus may not be guided by the waveguide. In addition, the footprints of the FOV after the diffraction by the front grating may be further clipped or reduced. In the example shown in FIG. 9A, a small portion of a footprint 946 of the FOV for the light of the first color, a large portion of a footprint 944 of the FOV for the light of the second color, and a large portion of a footprint 948 of the FOV for the light of the third color may fall outside of the ring and thus may not be guided by the waveguide and diffracted by the back grating to reach the exit pupil.

FIG. 9B illustrates the field-of-view clipping by the examples of surface-relief gratings for exit pupil expansion in the waveguide display. For example, the FOV for the light of the first color after the diffraction by the back grating may be shown by a footprint 956, which may be close to the full FOV. For the light of the second color, a top portion of the FOV may be clipped after diffraction by the first grating and a right portion of the FOV may be clipped after diffraction by the front grating. Thus, the FOV for the light of the second color after the diffraction by the back grating may be shown by a footprint 954, which may be much smaller than the full FOV. Similarly, for the light of the third color, a bottom portion of the FOV may be clipped after diffraction by the first grating and a left portion of the FOV may be clipped after diffraction by the front grating. Thus, the FOV for the light of the third color after the diffraction by the back grating may be shown by a footprint 958, which may be much smaller than the full FOV. Thus, certain color components of the image may be missing for certain fields of view. As such, in order to achieve the full FOV for different colors, two or more waveguides and the corresponding gratings may be used. In addition, as described above, the wide bandwidth of SRGs may cause crosstalk between light of different primary colors and/or from different FOVs, and thus multiple waveguides may also be used to avoid the crosstalk.

Due to the high spectral selectivity at the Bragg condition, VBGs, such as reflective VBGs, may allow for single-waveguide design without crosstalk between primary colors in a volume Bragg grating and may achieve a superior see-through quality. Thus, input coupler 530 or 640 and output coupler 540 or 650 may include a volume Bragg grating, which may be a volume hologram recorded in a holographic recording material by exposing the holographic recording material to light patterns generated by the interference between two or more coherent light beams. In volume Bragg gratings, the incident angle and the wavelength of the incident light may need to satisfy the Bragg phase-matching condition in order for the incident light to be diffracted by the Bragg grating. When a single Bragg grating is used in a waveguide-based near-eye display, the spectral and angular selectivity of the volume Bragg gratings may lead to lower efficiency because only a portion of the display light may be diffracted and reach user's eyes, and the field of view and the working wavelength range of the waveguide-based near-eye display may be limited. In some embodiments, multiplexed VBGs may be used to improve the efficiency and increase the FOV.

Figure 10C:
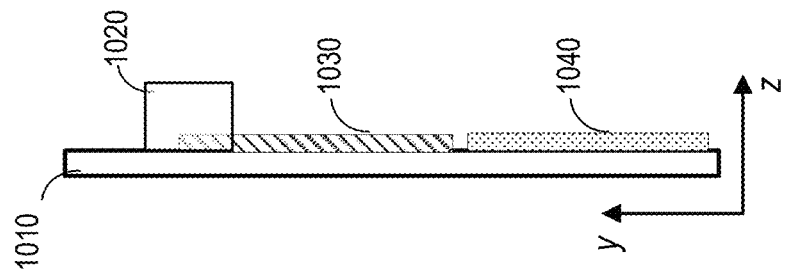
FIG. 10C illustrates a side view of the example of the volume Bragg grating-based waveguide display shown in FIG. 10A.
Figure 10A:
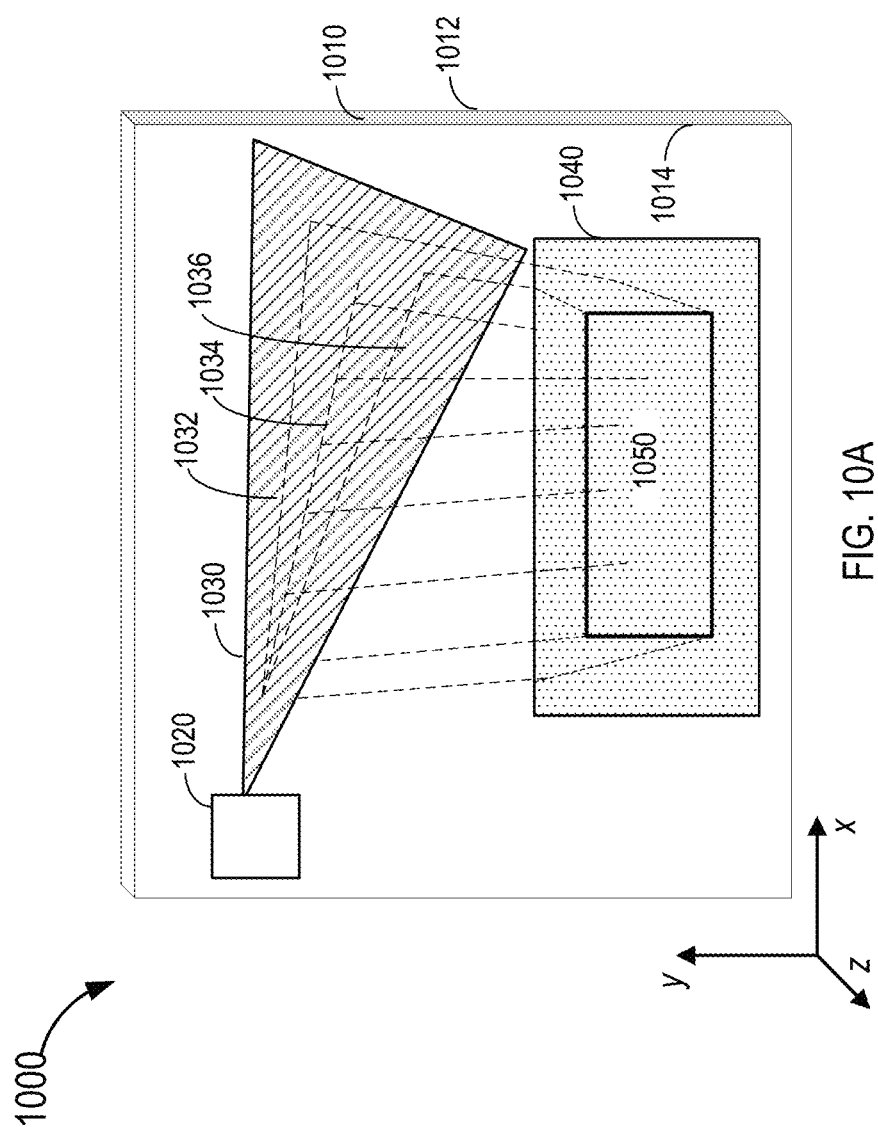
FIG. 10A illustrates an example of a volume Bragg grating-based waveguide display according to certain embodiments.

FIG. 10A illustrates the front view of an example of a volume Bragg grating-based waveguide display 1000 according to certain embodiments. Waveguide display 1000 may include a substrate 1010, which may be similar to substrate 520. Substrate 1010 may be transparent to visible light and may include, for example, a glass, quartz, plastic, polymer, PMMA, ceramic, or crystal substrate. Substrate 1010 may be a flat substrate or a curved substrate. Substrate 1010 may include a first surface 1012 and a second surface 1014. Display light may be coupled into substrate 1010 by an input coupler 1020, and may be reflected by first surface 1012 and second surface 1014 through total internal reflection, such that the display light may propagate within substrate 1010. As described above, input coupler 1020 may include a diffractive coupler (e.g., a volume holographic grating or a surface-relief grating), a refractive coupler (e.g., a wedge or a prism), or a reflective coupler (e.g., a reflective surface having a slant angle with respect to substrate 1010). For example, in one embodiment, input coupler 1020 may include a prism that may couple display light of different colors into substrate 1010 at a same refraction angle. In another example, the input coupler may include a grating coupler that may diffract light of different colors into substrate 1010 at different directions.

Waveguide display 1000 may also include a first grating 1030 and a second grating 1040 positioned on one or two surfaces (e.g., first surface 1012 and second surface 1014) of substrate 1010 for expanding incident display light beam in two dimensions in order to fill an eyebox with the display light. First grating 1030 may include one or more multi-plexed volume Bragg gratings each configured to expand at least a portion of the display light beam (e.g., light corresponding to a certain field of view and/or a wavelength range) along one direction, as shown by lines 1032, 1034, and 1036. For example, while the display light propagates within substrate 1010 along a direction shown by line 1032, 1034, or 1036, a portion of the display light may be diffracted by first grating 1030 to second grating 1040 each time the display light propagating within substrate 1010 reaches first grating 1030. Second grating 1040 may then expand the display light from first grating 1030 in a different direction by diffracting a portion of the display light to the eyebox each time the display light propagating within substrate 1010 reaches second grating 1040. On second grating 1040, an exit region 1050 represents the region where display light for the full FOV at one pupil location in the eyebox (e.g., at the center the eyebox) may be coupled out of waveguide display 1000.

As described above, first grating 1030 and second grating 1040 may each include a multiplexed VBG that includes multiple VBGs each designed for a specific FOV range and/or wavelength range. For example, first grating 1030 may include a few hundred or more VBGs (e.g., about 300 to about 1000 VBGs) recorded by a few hundred or more exposures, where each VBG may be recorded under a different condition. Second grating 1040 may also include tens or hundreds of VBGs (e.g., 50 or more VBGs) recorded by tens or hundreds of exposures. First grating 1030 and second grating 1040 may each be a transmission grating or a reflection grating.

Figure 10B:
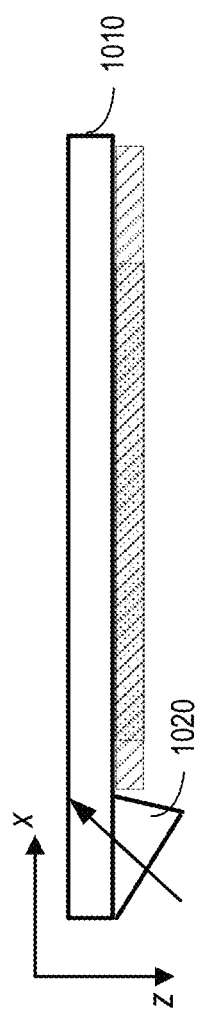
FIG. 10B illustrates a top view of the example of the volume Bragg grating-based waveguide display shown in FIG. 10A.

FIGS. 10B and 10C illustrate the top and side views of volume Bragg grating-based waveguide display 1000, respectively. Input coupler 1020 may include projector optics (not shown, e.g., a lens) and a prism. Display light may be collimated and projected onto the prism by the projector optics, and may be coupled into substrate 1010 by the prism. The prism may have a refractive index that matches the refractive index of substrate 1010 and may include a wedge having a certain angle such that light coupled into substrate 1010 may be incident on surface 1012 or 1014 of substrate 1010 at an incident angle greater than the critical angle for substrate 1010. As such, display light coupled into substrate 1010 may be guided by substrate 1010 through total internal reflection, and may be diffracted by multiple regions of first grating 1030 towards second grating 1040 as described above. Second grating 1040 may then diffract the display light out of substrate 1010 at multiple regions to replicate the exit pupil.

Figure 11:
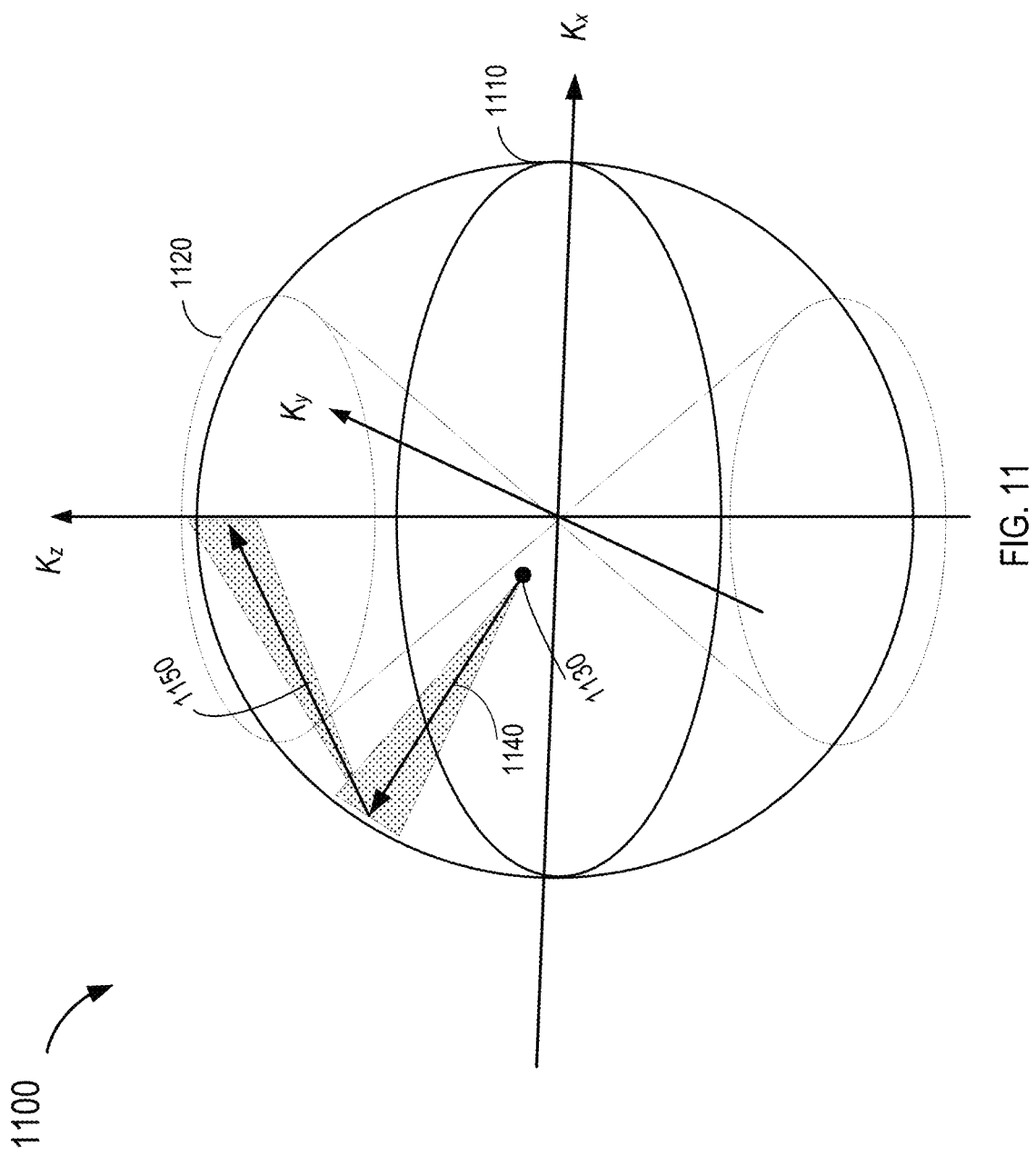
FIG. 11 illustrates light dispersion in an example of a volume Bragg grating-based waveguide display according to certain embodiments.

FIG. 11 illustrates light dispersion in an example of a volume Bragg grating-based waveguide display, such as waveguide display 1000, according to certain embodiments. As shown in the example, a sphere 1110 may represent wave vectors of light that may be guided by the waveguide. For light with wave vectors outside of sphere 1110, the light may become evanescent. A cone 1120 may represent wave vectors of light that may leak out of the waveguide because the total-internal-reflection condition is not met. Thus, the region of sphere 1110 outside of cone 1120 may represent the wave vectors of light that can be guided by the waveguide and can propagate within the waveguide through TIR. Point 1130 may represent the wave vector of the display light coupled into the waveguide by, for example, a prism. Wave vectors 1140 show the light dispersion caused by first grating 1030, where light of different colors may have different diffraction angles. Wave vectors 1150 show the light dispersion caused by second grating 1040, where light of different colors may have different diffraction angles. Thus, the light coupled out of the substrate may have some dispersion, such that the images of different colors may not perfectly overlap with each other to form one image. Therefore, the displayed image may be blurred and the resolution of the displayed image may be reduced.

Figures 12A, 12B:
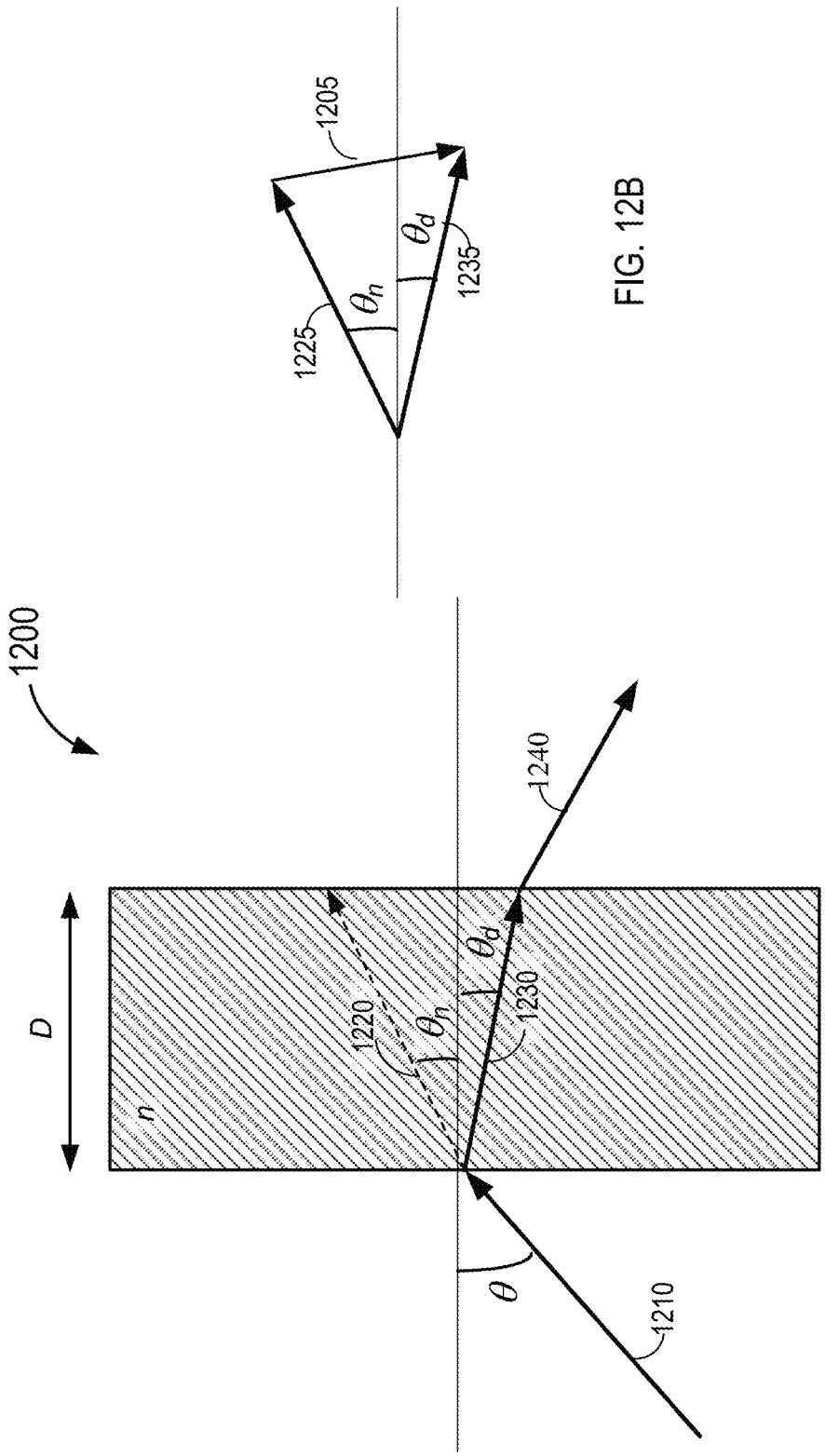
FIG. 12A illustrates an example of a volume Bragg grating (VBG).
FIG. 12B illustrates the Bragg condition for the volume Bragg grating shown in FIG. 12A.

FIG. 12A illustrates an example of a volume Bragg grating 1200. Volume Bragg grating 1200 shown in FIG. 12A may include a transmission holographic grating that has a thickness D. The refractive index n of volume Bragg grating 1200 may be modulated at an amplitude $\Delta n$, and the grating period of volume Bragg grating 1200 may be $\Lambda$. Incident light 1210 having a wavelength $\lambda$ may be incident on volume Bragg grating 1200 at an incident angle $\theta$, and may be refracted into volume Bragg grating 1200 as incident light 1220 that propagates at an angle $\theta_n$ in volume Bragg grating 1200. Incident light 1220 may be diffracted by volume Bragg grating 1200 into diffraction light 1230, which may propagate at a diffraction angle $\theta_d$ in volume Bragg grating 1200 and may be refracted out of volume Bragg grating 1200 as diffraction light 1240.

FIG. 12B illustrates the Bragg condition for volume Bragg grating 1200 shown in FIG. 12A. Volume Bragg grating 1200 may be a transmission grating. A vector 1205 may represent the grating vector $\vec{G}$, where $|\vec{G}|=2\pi/\Lambda$. A vector 1225 may represent the incident wave vector $\vec{k_l}$, and a vector 1235 may represent the diffract wave vector $\vec{k_d}$, where $|\vec{k_l}|=|\vec{k_d}|=2\pi n/\lambda$. Under the Bragg phase-matching condition, $\vec{k_l}-\vec{k_d}=\vec{G}$. Thus, for a given wavelength $\lambda$, there may only be one pair of incident angle $\theta$ (or $\theta_n$) and diffraction angle $\theta_d$ that meets the Bragg condition perfectly. Similarly, for a given incident angle $\theta$, there may be one wavelength $\lambda$ that meets the Bragg condition perfectly. As such, the diffraction may occur for a small wavelength range and in a small incident angular range around a perfect Bragg condition. The diffraction efficiency, the wavelength selectivity, and the angular selectivity of volume Bragg grating 1200 may be functions of thickness D of volume Bragg grating 1200. For example, the full-width-half-magnitude (FWHM) wavelength range and the FWHM angular range of volume Bragg grating 1200 around the Bragg condition may be inversely proportional to thickness D of volume Bragg grating 1200, while the maximum diffraction efficiency at the Bragg condition may be a function of $\sin^2(a \times \Delta n \times D)$, where a is a coefficient. For a reflective volume Bragg grating, the maximum diffraction efficiency at the Bragg condition may be a function of $\tan h^2 (a \times \Delta n \times D)$.

As described above, in some designs, in order to achieve a large FOV (e.g., larger than) ±30° and diffract light of different colors, multiple polymer layers each including a Bragg grating for a different color (e.g., R, G, or B) and/or a different FOV may be arranged in a stack for coupling the display light to the user's eyes. In some designs, a multiplexed Bragg grating may be used, where each part of the multiplexed Bragg grating may be used to diffract light in a different FOV range and/or within a different wavelength range. Thus, in some designs, in order to achieve a desired diffraction efficiency and a large FOV for the full visible spectrum (e.g., from about 400 nm to about 700 nm, or from about 450 nm to about 650 nm), one or more thick volume Bragg gratings each including a large number of gratings (or holograms) recorded by a large number of exposures (e.g., holographic recordings), such as a few hundred or more than 1000, may be used.

VBGs or other holographic optical elements described above may be recorded in a holographic material (e.g., photopolymer) layer. In some embodiments, the VBGs can be recorded first and then laminated on a substrate in a near-eye display system. In some embodiments, a holographic material layer may be coated or laminated on the substrate and the VBGs may then be recorded in the holographic material layer.

In general, to record a holographic optical element in a photosensitive material layer, two coherent beams may interfere with each other at certain angles to generate a unique interference pattern in the photosensitive material layer, which may in turn generate a unique refractive index modulation pattern in the photosensitive material layer, where the refractive index modulation pattern may correspond to the light intensity pattern of the interference pattern. The photosensitive material layer may include, for example, silver halide emulsion, dichromated gelatin, photopolymers including photo-polymerizable monomers suspended in a polymer matrix, photorefractive crystals, and the like. One example of the photosensitive material layer for holographic recording is two-stage photopolymers that may include matrix precursors that can be pre-cured to form polymeric binders before holographic recording and writing monomers for holographic recording.

In one example, the photosensitive material layer may include polymeric binders, monomers (e.g., acrylic monomers), and initiating agents, such as initiators, chain transfer agents, or photosensitizing dyes. The polymeric binders may act as the support matrix. The monomers may be dispersed in the support matrix and may serve as refractive index modulators. The photosensitizing dyes may absorb light and interact with the initiators to polymerize the monomers. Thus, in each exposure (recording), the interference pattern may cause the polymerization and diffusion of the monomers to bright fringes, thus generating concentration and density gradients that may result in refractive index modulation. For example, areas with a higher concentration of monomers and polymerization may have a higher refractive index. As the exposure and polymerization proceed, fewer monomers may be available for polymerization, and the diffusion may be suppressed. After all or substantially all monomers have been polymerized, no more new gratings may be recorded in the photosensitive material layer. In a thick VBG that includes a large number of gratings recorded in a large number of exposures, display haze may be significant.

As described above, in some waveguide-based near-eye display systems, in order to expand the eyebox of the waveguide-based near-eye display, two output gratings (or two grating layers or two portions of a multiplexed grating) may generally be used to expand the display light in two dimensions or along two axes for dual-axis pupil expansion. Spatially separating the two output gratings and reducing the total number of exposures for each output grating may help to reduce the display haze because the see-through region (e.g., the middle) of the waveguide-based near-eye display may only include one output grating. For example, in some embodiments, the first output grating may be recorded with more exposures (e.g., >500 or >1000 times) and may be positioned outside of the see-through region of the waveguide-based near-eye display. The second output grating may be recorded with fewer exposures (e.g., <100 or <50 times) and may be positioned in the see-through region of the waveguide-based near-eye display. Thus, the display haze in the see-through region may be significantly reduced. However, because of the spatial separation of the two output gratings, the overall size of the waveguide-based near-eye display can be very large.

The grating couplers described above may include transmissive VBGs or reflective VBGs, which may have some similar and some different characteristics. For example, as described above, the FWHM wavelength range and the FWHM angular range of a transmissive or reflective volume Bragg grating near the Bragg condition may be inversely proportional to thickness D of the transmissive or reflective volume Bragg grating. The maximum diffraction efficiency at the Bragg condition for a transmissive VBG may be a function of $\sin^2 (a \times \Delta n \times D)$, where a is a coefficient and $\Delta n$ is the refractive index modulation, while the maximum diffraction efficiency at the Bragg condition for a reflective VBG may be a function of $\tan h^2 (a \times \Delta n \times D)$. In addition, the parameters (e.g., the grating tilt angles) of the transmissive and reflective volume Bragg gratings may be different in order to couple the display light into the waveguide at certain angles such that the coupled display light can be guided by the waveguide through TIR. Because of the different grating parameters, the dispersion characteristics of transmission gratings and reflection gratings may be different.

Figure 13A:
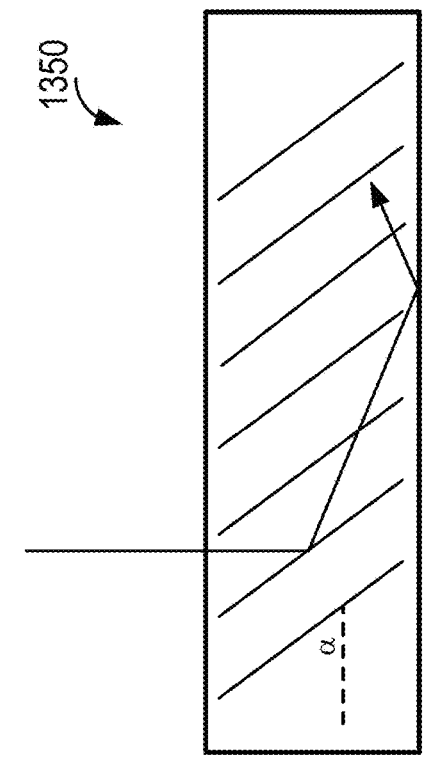
FIG. 13A illustrates an example of a reflective volume Bragg grating in a waveguide display according to certain embodiments.

FIG. 13A illustrates an example of a reflective volume Bragg grating 1300 in a waveguide display according to certain embodiments. The grating tilt angle α of reflective VBG 1300 may need to be within a certain range to reflectively diffract the display light. If the grating tilt angle α of reflective VBG 1300 is greater than a certain value, reflective VBG 1300 may become a transmissive VBG, the distance between two consecutive locations where the display light may reach the grating may be too large (and thus the exit pupil may be sparsely replicated in the eyebox), or the display light may become evanescent. In one example, the grating tilt angle α of reflective VBG 1300 may be about 30°.

Figure 13C:
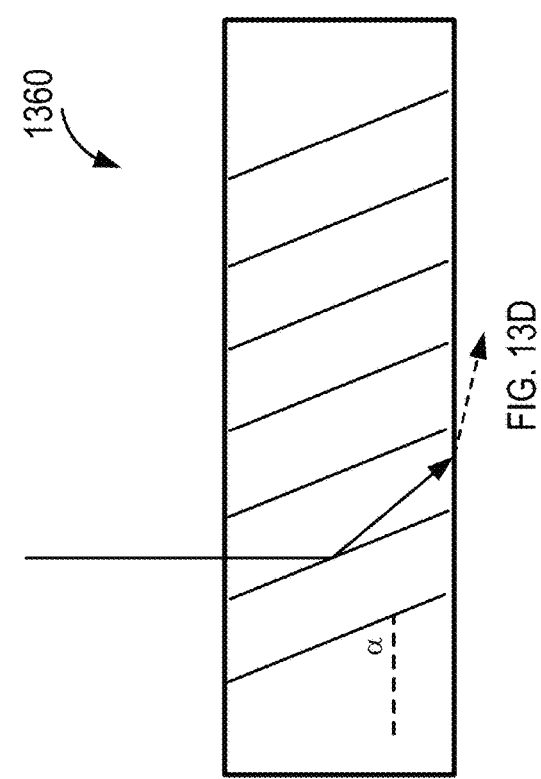
FIG. 13C illustrates an example of a transmissive volume Bragg grating in a waveguide display according to certain embodiments.
Figure 13B:
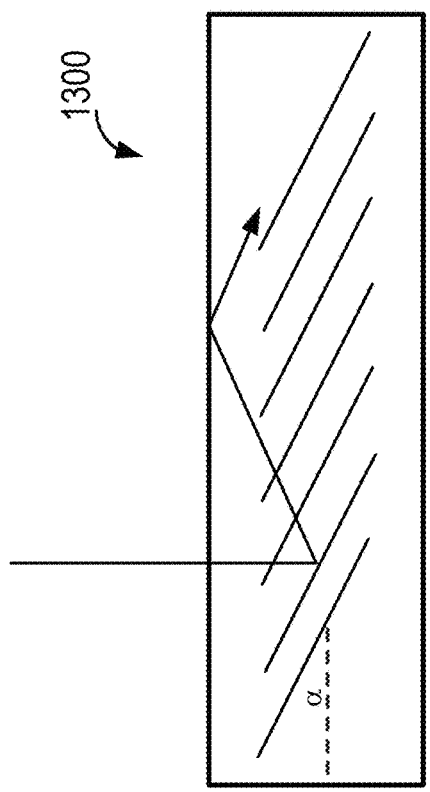
FIG. 13B illustrates an example of a reflective VBG in a waveguide display where light diffracted by the reflective VBG is not totally reflected and guided in the waveguide.

FIG. 13B illustrates an example of a reflective VBG 1310 in a waveguide display where light diffracted by the reflective VBG is not totally reflected and guided in the waveguide. The grating tilt angle α of reflective VBG 1310 shown in FIG. 13B may be less than a certain value. As such, light coupled into the waveguide may be incident on the surface of the waveguide at an incident angle less than the critical angle, and thus may not be totally reflected and guided in the waveguide. The grating tilt angle α of reflective VBG 1310 may be less than about 30°. Thus, the grating tilt angle α of a reflective VBG may need to be within a certain range to reflectively diffract the display light into the waveguide such that the diffracted light may be guided by the waveguide through total internal reflection.

FIG. 13C illustrates an example of a transmissive volume Bragg grating 1350 in a waveguide display according to certain embodiments. The grating tilt angle α of transmissive VBG 1350 may also need to be within a certain range. For example, if the grating tilt angle α of transmissive VBG 1350 is lower than a certain value, transmissive VBG 1350 may become a reflective VBG, the distance between two consecutive locations where the display light may reach the grating may be too large (and thus the exit pupil may be sparsely replicated in the eyebox), or the display light may become evanescent.

Figure 13D:
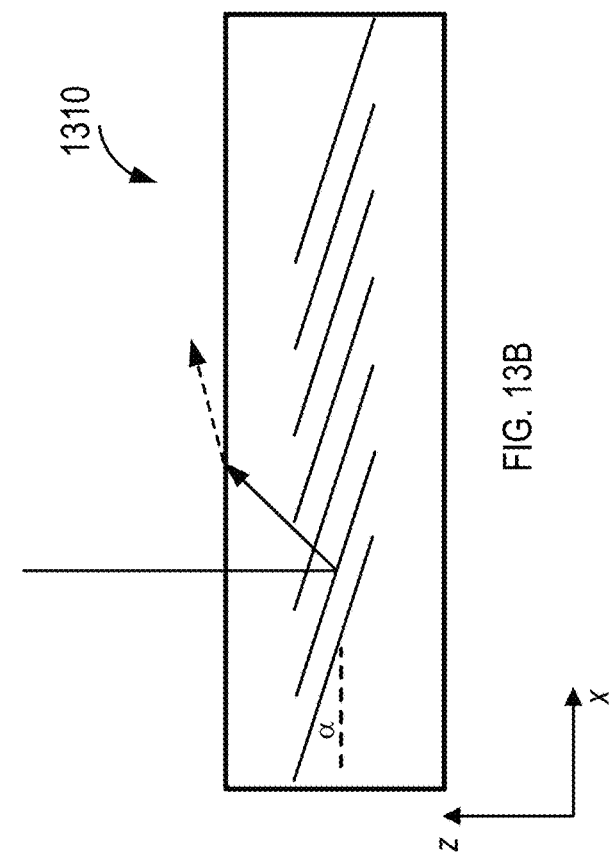
FIG. 13D illustrates an example of a transmissive VBG in a waveguide display where light diffracted by the transmissive VBG is not totally reflected and guided in the waveguide.

FIG. 13D illustrates an example of a transmissive VBG 1360 in a waveguide display where light diffracted by the transmissive VBG is not totally reflected and guided in the waveguide. The grating tilt angle α of transmissive VBG 1360 may be greater than a certain value, such as greater than about 60°. As such, light coupled into the waveguide may be incident on the surface of the waveguide at an incident angle less than the critical angle, and thus may not be totally reflected and guided in the waveguide. Thus, the grating tilt angle α of a transmissive VBG may need to be within a certain range to transmissively diffract the display light into the waveguide such that the diffracted light may be guided by the waveguide through total internal reflection. FIGS. 13A-13D show that the grating tilt angle α may be smaller for reflection gratings than for transmission gratings.

Figure 14B:
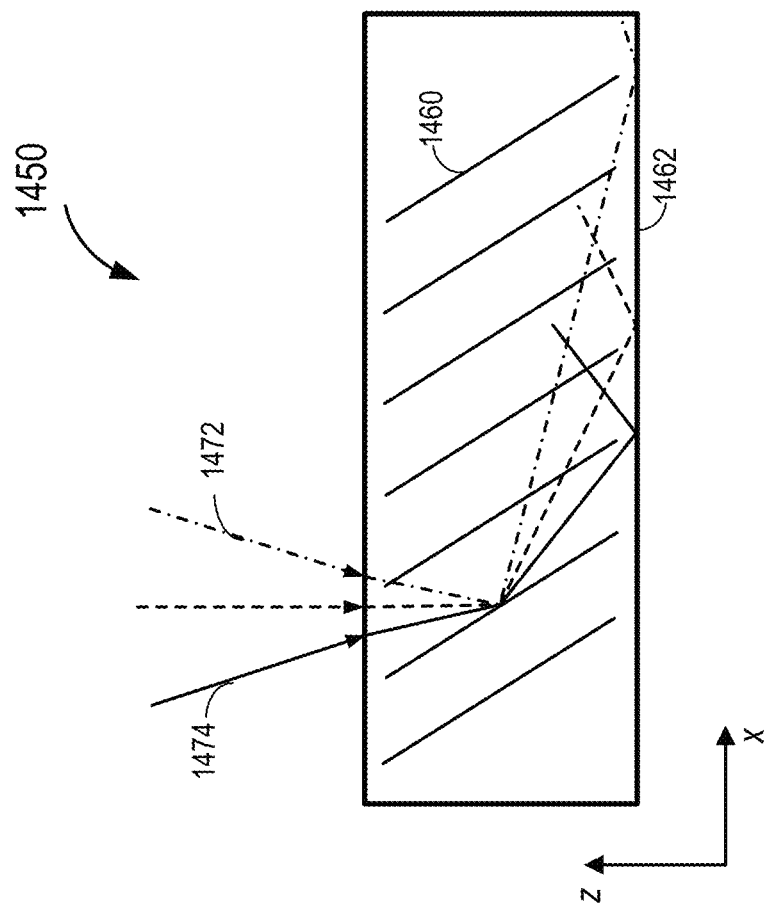
FIG. 14B illustrates the light dispersion by an example of a transmissive volume Bragg grating in a waveguide display according to certain embodiments.
Figure 14A:
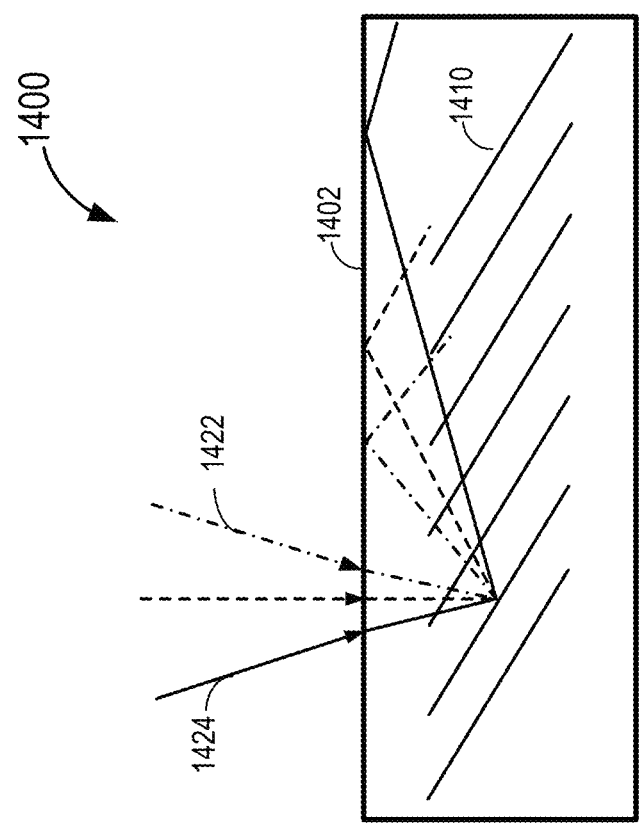
FIG. 14A illustrates the light dispersion by an example of a reflective volume Bragg grating in a waveguide display according to certain embodiments.

FIG. 14A illustrates the light dispersion by an example of a reflective volume Bragg grating 1400 in a waveguide display according to certain embodiments. Reflective VBG 1400 may be characterized by a grating vector $k_g$, a thickness d, and an average refractive index n. The surface normal direction of reflective VBG 1400 is N. The amount of light dispersion by reflective VBG 1400 may be determined by:

$$\Delta\theta = \frac{\lambda_0 |k_g \times N|}{n \times d |k_g \cdot k_{out}|},$$

where $\lambda_0$ is the wavelength of the light that perfectly meets the Bragg condition, and $k_{out}$ is the wave vector of the light diffracted by reflective VBG 1400. When the grating tilt angle α of reflective VBG 1400 is about 30°, the amount of light dispersion by reflective VBG 1400 may be approximately:

$$\Delta\theta \propto \frac{\sin 30°}{d \times \cos 30°} = \frac{0.58}{d}.$$

Thus, to achieve an angular resolution about 2 arcminutes, the thickness d of reflective VBG 1400 may be at least about 0.5 mm.

FIG. 14B illustrates the light dispersion by an example of a transmissive volume Bragg grating 1450 in a waveguide display according to certain embodiments. Transmissive VBG 1450 may similarly be characterized by a grating vector $k_g$, a thickness d, and an average refractive index n. The surface normal direction of transmissive VBG 1450 is N. The amount of light dispersion by transmissive VBG 1450 may be determined by:

$$\Delta\theta = \frac{\lambda_0 |k_g \times N|}{n \times d |k_g \cdot k_{out}|},$$

where $\lambda_0$ is the wavelength of the light that perfectly meets the Bragg condition, and $k_{out}$ is the wave vector of the light diffracted by transmissive VBG 1450. When the grating tilt angle α of transmissive VBG 1450 is about 60°, the amount of light dispersion by transmissive VBG 1450 may be approximately:

$$\Delta\theta \propto \frac{\sin 60°}{d \times \cos 60°} = \frac{1.73}{d}.$$

Thus, to achieve an angular resolution about 2 arcminutes, the thickness d of transmissive VBG 1450 may be at least about 1.5 mm, which is about three times of the thickness of a reflective VBG with the same angular resolution and may be difficult to achieve or may cause significant display haze.

In order to reduce the thickness of the VBGs and display haze and achieve the desired resolution, dispersion compensation may be desired in a VBG-based waveguide display. According to certain embodiments, one or more pairs of gratings having matching grating vectors and operating in opposite diffraction conditions (e.g., +1 order diffraction versus −1 order diffraction) may be used to compensate for the dispersion caused by each other.

FIG. 15A is a front view of an example of a volume Bragg grating-based waveguide display 1500 with exit pupil expansion and including two image projectors 1520 and 1550 according to certain embodiments. FIG. 15B is a side view of the example of volume Bragg grating-based waveguide display 1500 with exit pupil expansion and including two image projectors 1520 and 1550 according to certain embodiments. Waveguide display 1500 may be similar to waveguide display 1000, and may include a first input coupler 1522 and a second input coupler 1552 at different locations compared with input coupler 1020.

Waveguide display 1500 may include a waveguide 1510 including one or more waveguide plates (e.g., a first waveguide plate 1512 and/or a second waveguide plate 1514), and a first top grating 1530, a second top grating 1560, a first bottom grating 1540, and a second bottom grating on waveguide 1510. As with input coupler 1020, first input coupler 1522 and second input coupler 1552 may include, for example, a prism 1524. Display light from first image projector 1520 and second projector 1550 may be projected by projector optics 1523 (e.g., a lens), coupled into waveguide 1510 by first input coupler 1522 and second input coupler 1552, and guided by waveguide 1510.

The display light from first image projector 1520 may reach a first portion 1532 of first top grating 1530 and may be diffracted by first portion 1532 of first top grating 1530 to change the propagation direction and reach other portions of first top grating 1530, which may each diffract the display light towards first bottom grating 1540. First bottom grating 1540 may diffract the display light from first image projector 1520 out of waveguide 1510 at different locations to form multiple exit pupils as described above.

Similarly, the display light (not shown in FIG. 15A) from second projector 1550 may reach a first portion 1562 of second top grating 1560 and may be diffracted by first portion 1562 of second top grating 1560 to change the propagation direction and reach other portions of second top grating 1560, which may each diffract the display light towards second bottom grating 1570. Second bottom grating 1570 may diffract the display light from second projector 1550 out of waveguide 1510 at different locations to form multiple exit pupils as described above.

In some embodiments, the display light from first image projector 1520 and second projector 1550 may be coupled into different waveguide plates of waveguide 1510, for example, into first waveguide plate 1512 and second waveguide plate 1514, respectively, where first top grating 1530, second top grating 1560, first bottom grating 1540, and second bottom grating 1570 may each be on one or more waveguide plates.

In some embodiments, first bottom grating 1540 and second bottom grating 1570 may be a same grating. In some embodiments, first bottom grating 1540 and second bottom grating 1570 may be on different grating layers but may have the same grating vectors. Using a same bottom grating or bottom gratings with the same grating vector may help to reduce or avoid undesired diffraction of display light for a first field of view by a grating for a second field of view, and thus may reduce certain optical artifacts, such as ghost images.

FIG. 16A is a front view of an example of a volume Bragg grating-based waveguide display 1600 including two image projectors 1620 and 1650 according to certain embodiments. FIG. 16B is a side view of the example of volume Bragg grating-based waveguide display 1600 including two image projectors 1620 and 1650 according to certain embodiments. Image projector 1620, a first input grating 1622, a first top grating 1630, and a bottom grating 1640 may be used to provide a portion (e.g., the left half) of the full FOV of waveguide display 1600. Display light may be collimated and projected onto a first input grating 1622, which may couple the display light into a waveguide 1610 by diffraction as described above with respect to, for example, FIGS. 5-6. The display light may reach a first portion 1632 of first top grating 1630 and may be diffracted by the first portion 1632 of first top grating 1630 to change the propagation direction and reach other portions of first top grating 1630, which may each diffract the display light towards bottom grating 1640. Bottom grating 1640 may diffract the display light out of waveguide 1610 at different locations to form multiple exit pupils as described above. First portion 1632 of first top grating 1630 and each of other portions of first top grating 1630 may have similar grating parameters (but may be recorded in different exposure durations to achieve different diffraction efficiencies). Therefore, they may compensate the dispersion of display light caused by each other to reduce the overall dispersion, due to the opposite Bragg conditions (e.g., +1 order and −1 order diffractions) for the diffractions at first portion 1632 of first top grating 1630 and each of other portions of first top grating 1630.

In addition, first input grating 1622 (and a second input grating 1652) and bottom grating 1640 may have similar grating parameters or similar grating vectors at least in the x-y plane (but may be recorded in different exposure durations to achieve different diffraction efficiencies), where first input grating 1622 (and second input grating 1652) may couple the display light into waveguide 1610, while bottom grating 1640 may couple the display light out of waveguide 1610. Therefore, first input grating 1622 and bottom grating 1640, and second input grating 1652 and bottom grating 1640 may respectively compensate the dispersion of display light caused by each other to reduce the overall dispersion, due to the opposite diffraction directions and opposite Bragg conditions (e.g., +1 order and −1 order diffractions) for the respective diffractions. In this way, the dispersion by first portion 1632 of first top grating 1630 and each of other portions of first top grating 1630 may be canceled out, and the dispersion by first input grating 1622 and bottom grating 1640 may also be canceled out.

Similarly, image projector 1650, second input grating 1652, a second top grating 1660, and bottom grating 1640 (or a different bottom grating) may be used to provide another portion (e.g., the right half) of the full FOV of waveguide display 1600. As described above with respect to FIG. 15B, bottom grating 1640 may be used for both portions of the field of view, or may include two gratings each for a portion of the field of view. The dispersion by a first portion 1662 and each of other portions of second top grating 1660 may be canceled out, and the dispersion by second input grating 1652 and bottom grating 1640 may also be canceled out. Therefore, the overall dispersion of the display light by waveguide display 1600 can be minimized in any direction. As such, a higher resolution of the displayed image may be achieved even if the polymer layers are thin and transmissive VBGs are recorded in the thin polymer layers.

In addition, as with waveguide display 1000 or 1500, waveguide display 1600 may include multiple polymer layers on one or more waveguide plates, for example, a first waveguide plate 1612 and a second waveguide plate 1614, where input gratings 1622 and 1652, top gratings 1630 and 1660, and bottom grating 1640 may each be split into multiple gratings recorded in the multiple polymer layers, where the gratings on each polymer layer may cover different respective FOVs and light spectra and the combination of the multiple polymer layers may provide the full FOV and spectral coverage. In this way, each polymer layer can be thin (e.g., about 20 μm to about 100 μm) and can be exposed for fewer times (e.g., less than about 100) to record fewer gratings to reduce haziness, and the overall efficiency of the multiple polymer layers can still be high for the full FOV and visible light spectrum.

Figure 17:
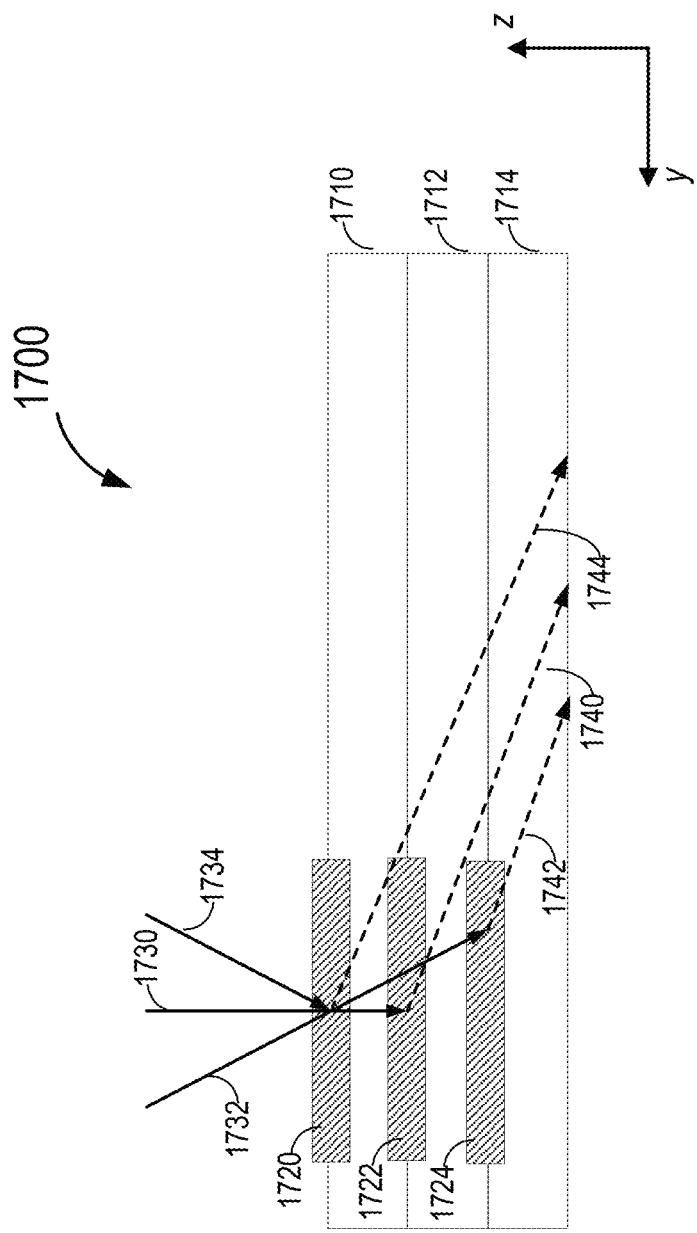
FIG. 17 illustrates an example of a volume Bragg grating-based waveguide display including multiple grating layers for different fields of view and/or light wavelengths according to certain embodiments.

FIG. 17 illustrates an example of a volume Bragg grating-based waveguide display 1700 including multiple grating layers for different fields of view and/or light wavelengths according to certain embodiments. In waveguide display 1700, gratings may be spatially multiplexed along the z direction. For example, waveguide display 1700 may include multiple substrates, such as substrates 1710, 1712, 1714, and the like. The substrates may include a same material or materials having similar refractive indexes. One or more VBGs (e.g., VBGs 1720, 1722, 1724, etc.) may be made on each substrate, such as recorded in a holographic material layer formed on the substrate. The VBGs may be reflection gratings or transmission gratings. The substrates with the VBGs may be arranged in a substrate stack along the z direction for spatial multiplexing. Each VBG may be a multiplexed VBG that includes multiple gratings designed for different Bragg conditions to couple display light in different wavelength ranges and/or different FOVs into or out of the waveguide.

In the example shown in FIG. 17, VBG 1720 may couple light 1734 from the positive field of view into the waveguide as shown by light 1744 within the waveguide. VBG 1722 may couple light 1730 from around 0° field of view into the waveguide as shown by light 1740 within the waveguide. VBG 1724 may couple light 1732 from the negative field of view into the waveguide as shown by light 1742 within the waveguide. As described above, each of VBGs 1720, 1722, and 1724 may be a multiplexed VBG with many exposures, and thus may couple light from different FOV ranges into or out of the waveguide.

Figure 18:
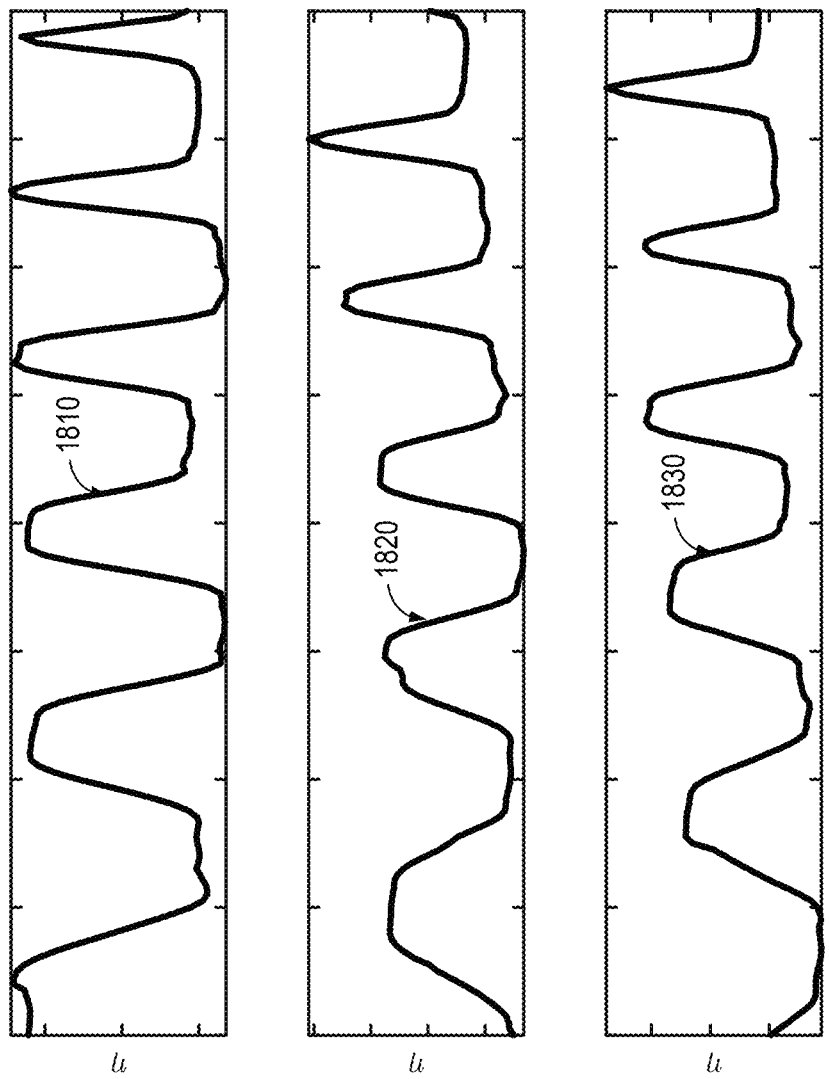
FIG. 18 illustrates the fields of view of multiple gratings in an example of a volume Bragg grating-based waveguide display according to certain embodiments.

FIG. 18 illustrates the fields of view of multiple gratings in an example of a volume Bragg grating-based waveguide display according to certain embodiments. In some embodiments, each of the gratings may be in a respective grating layer or on a respective waveguide plate. Each of the gratings may be a multiplexed grating including many exposures, and may be used to couple display light from multiple FOV ranges into or out of the waveguide at high efficiencies. For example, a curve 1810 may show the diffraction efficiency of a first VBG (e.g., VBG 1722 of FIG. 17) for light from different fields of view. A curve 1820 may show the diffraction efficiency of a second VBG (e.g., VBG 1720 of FIG. 17) for light from different fields of view. A curve 1830 may show the diffraction efficiency of a third VBG (e.g., VBG 1724 of FIG. 17) for light from different fields of view. The first, second, and third VBGs, when arranged in a stack, may more uniformly diffract light in the full field of view (e.g., from about −20° to about 20°) at high efficiencies. In some embodiments, the first VBG, the second VBG, and the second VBG may be used to couple display light of the same color. Different sets of VBGS may be used to cover the full field of view for display light of different colors.

As described above, the VBGs can be reflection VBGs or transmission VBGs. Reflection VBGs and transmission VBGs can have different diffraction properties. For example, as described above with respect to FIGS. 14A and 14B, reflection gratings may have relatively lower dispersion than transmission gratings of similar thicknesses. Transmission gratings used as output gratings may allow for the overlapping of the gratings for two-dimensional exit pupil replication to reduce the physical size of the waveguide display, while reflection gratings may not as described below with respect to FIG. 19. The FWHM wavelength range and the FWHM angular range of the grating near the Bragg condition, and the peak diffraction efficiency of the grating as a function of the refractive index modulation may also be different for transmission gratings compared with reflection gratings. Therefore, transmission gratings and reflection gratings may be selected based on the design considerations, such as the form factor, efficiency, image quality, and the like.

Figure 19:
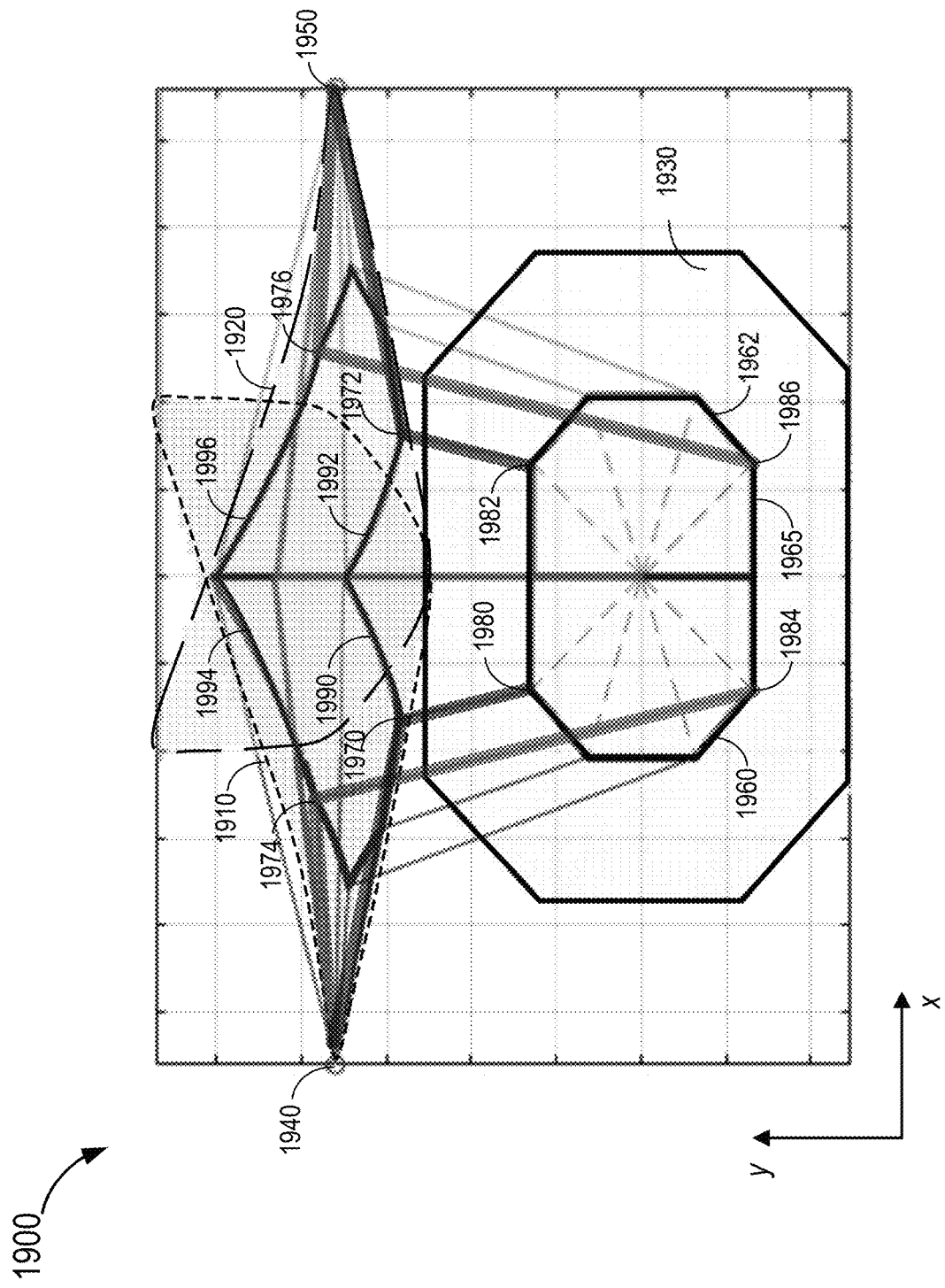
FIG. 19 illustrates an example of a reflection volume Bragg grating-based waveguide display including two image projectors according to certain embodiments.

FIG. 19 illustrates an example of a reflection volume Bragg grating-based waveguide display 1900 including two image projectors 1940 and 1950 according to certain embodiments. Waveguide display 1900 may include a first top grating 1910, a second top grating 1920, and one or more bottom gratings 1930. First top grating 1910, second top grating 1920, and bottom gratings 1930 may all be reflection VBGs. On bottom gratings 1930, an exit region 1965 represents the region where display light for the full FOV at one pupil location in the eyebox (e.g., at the center the eyebox) may be coupled out of waveguide display 1900. Image projector 1940, first top grating 1910, and a bottom grating 1930 (or a portion of bottom grating 1930) may be used to cover about one-half (e.g., the left half 1960) of the total field of view of waveguide display 1900, while projector 1950, second top grating 1920, and a bottom grating 1930 (or a portion of bottom grating 1930) may be used to cover about another one-half (e.g., the right half 1962) of the total field of view of waveguide display 1900. In some embodiments, more than two projectors may be used to cover the full field of view of the waveguide display. Waveguide display 1900 may have a higher diffraction efficiency and a better resolution because reflection VBGs are used.

As shown in FIG. 19, the top FOV of the total field of view covered by exit region 1965 (e.g., the combined left half 1960 and right half 1962) is represented by a line between vertices 1980 and 1982 and may map to a first top curve 1990 on first top grating 1910 and a second top curve 1992 on second top grating 1920, where vertices 1980 and 1982 may map to location 1970 on first top grating 1910 and location 1972 on second top grating 1920, respectively. The bottom FOV of the total field of view covered by exit region 1965 is represented by a line between vertices 1984 and 1986 and may map to a first bottom curve 1994 on first top grating 1910 and a second bottom curve 1996 on second top grating 1920, where vertices 1984 and 1986 may map to a location 1974 on first top grating 1910 and location 1976 on second top grating 1920, respectively. In embodiments where first top grating 1910, second top grating 1920, and bottom gratings 1930 are reflection VBGs, there may be some FOV clipping if first top curve 1990 and second top curve 1992 are below the line connecting vertices 1980 and 1982. To avoid FOV clipping, waveguide display 1900 may be designed such that first top grating 1910 and second top grating 1920 may not overlap with bottom gratings or may overlap with bottom gratings 1930 only to the extent such that the total FOV is not affected by clipping. As described above, grating selection may be based on form factor considerations to permit full FOV output without clipping, and/or other considerations, such as efficiency, image quality, and the like.

Figure 20B:
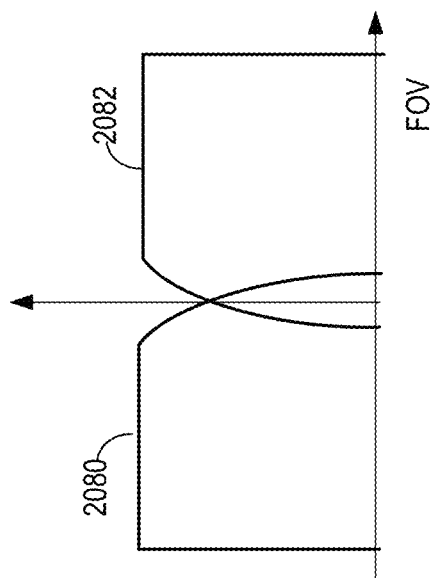
FIG. 20B illustrates an example of a method of stitching the field of view of a waveguide display that includes two or more projectors.
Figure 20A:
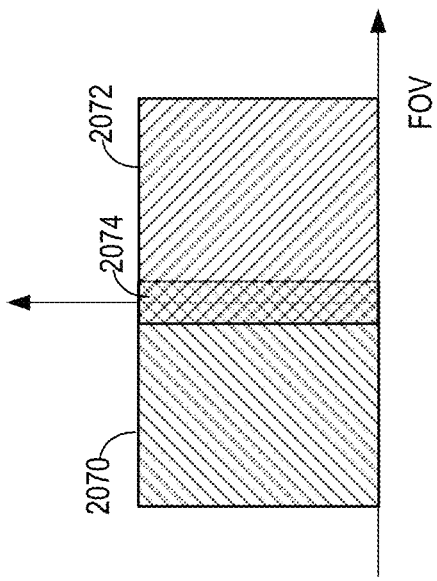
FIG. 20A illustrates an example of a misaligned field of view of a waveguide display that includes two or more projectors.

FIG. 20A illustrates an example of misaligned field of view of a waveguide display that includes two or more projectors. The field of view misalignment may be caused by VBG design or manufacture errors. In the example shown in FIG. 20A, the left portion 2070 of the FOV (e.g., corresponding to left half 1960 of FIG. 19) provided by the left projector (e.g., image projector 1940), the left top grating (e.g., first top grating 1910 of FIG. 19), and the bottom grating (e.g., bottom grating 1930 of FIG. 19) may include, for example, about −30° to about +2°, while the right portion 2072 of the FOV (e.g., corresponding to right half 1962 of FIG. 19) provided by the right projector (e.g., projector 1950 of FIG. 19), the right top grating (e.g., second top grating 1920 of FIG. 19), and the bottom grating (e.g., bottom grating 1930 of FIG. 19) may include, for example, about −2° to about 30°. Thus, the FOV from −2° to 2° may be included in both left portion 2020 and right portion 2072 of the FOV, and thus may be transmitted to user's eyes with a higher intensity, creating a bright center FOV 2074 in the waveguide display. In some embodiments, the field of view misalignment may cause the center FOV to have a very low intensity. For example, a left portion of the FOV supported by a first set of gratings may include, for example, about −30° to about −2°, while a right portion of the FOV supported by a second set of gratings may include, for example, about 2° to about 30°, such that the FOV from −2° to 2° may not be supported by the waveguide display.

FIG. 20B illustrates an example of a method of stitching the field of view of a waveguide display that includes two or more projectors. In the example shown in FIG. 20B, the left portion 2080 of the FOV (e.g., corresponding to left half 1960 of FIG. 19) provided by the left projector (e.g., image projector 1940 of FIG. 19), the left top grating (e.g., first top grating 1910 of FIG. 19), and the bottom grating (e.g., bottom grating 1930 of FIG. 19) may include, for example, about −30° to about 2°, where the light intensity may gradually taper in, for example, the FOV from about −2° to about 2°. The right portion 2082 of the FOV (e.g., corresponding to right half 1962 of FIG. 19) provided by the right projector (e.g., projector 1950 of FIG. 19), the right top grating (e.g., second top grating 1920 of FIG. 19), and the bottom grating (e.g., bottom grating 1930 of FIG. 19) may include, for example, about −2° to about 30°, where the light intensity may gradually taper in, for example, the FOV from about 2° to about −2°. Thus, even if there is a misalignment of the FOV caused by some manufacture errors, the full FOV can be supported by the waveguide grating. At the same time, the overall light intensity near the 0° FOV may not be too high.

In some VBG-based waveguide display, ghost effects may be caused by the undesired diffraction of display light by a grating for a different field of view or a different color. For example, ghost images may exist if the display light for the left half of the FOV is diffracted by the right top grating or if the display light for the right half of the FOV is diffracted by the left top grating. Several techniques disclosed herein may be used to reduce the ghost effects. For example, in some embodiments, the two top gratings (e.g., first top grating 1910 and second top grating 1920 of FIG. 19) may be offset in the y direction, which may also increase the diffraction efficiency as described in more detail in reference to FIG. 24. In some embodiments, the bottom grating for the different FOVs may be a single grating to reduce ghost effects. In some embodiments, the two top gratings may be designed such that the display light diffracted by the wrong grating may not reach the eyebox and thus may not be observed by the user.

Figures 21A, 21B:
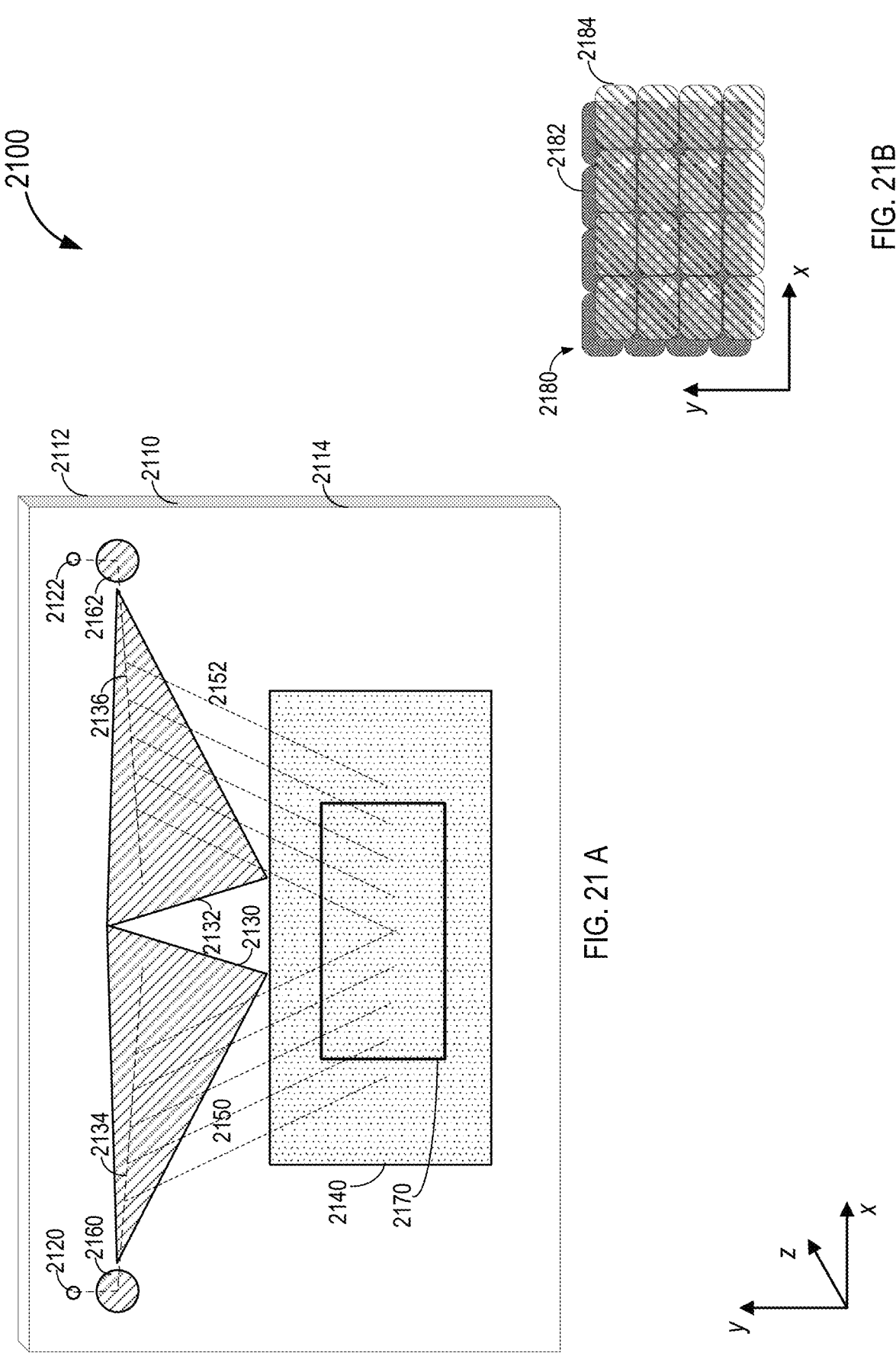
FIG. 21A illustrates an example of a volume Bragg grating-based waveguide display with exit pupil expansion and field of view stitching according to certain embodiments.
FIG. 21B illustrates examples of replicated exit pupils at an eyebox of the volume Bragg grating-based waveguide display shown in FIG. 21A.

FIG. 21A illustrates an example of a volume Bragg grating-based waveguide display 2100 with exit pupil expansion and field of view stitching according to certain embodiments. Waveguide display 2100 may include a substrate 2110 that includes a first surface 2112 and a second surface 2114, which may be similar to substrate 1010. Substrate 2110 may be transparent to visible light and may include, for example, a glass, quartz, plastic, polymer, PMMA, ceramic, or crystal substrate. Substrate 2110 may be a flat substrate or a curved substrate. As described in reference to FIG. 19, a total FOV of waveguide display 2100 may be provided by combined display light from two or more projectors. A first set of diffractive optical elements may cover a first half of the total FOV, while a second set of diffractive optical elements may cover the second half. Referring to FIG. 21A, display light from a first projector may be coupled into the substrate 2110 by a first input coupler 2120 and may be reflected by first surface 2112 and second surface 2114 through total internal reflection, such that the display light from the first projector may propagate within substrate 2110. As described above, first input coupler 2120 may include a diffractive coupler (e.g., a volume holographic grating or a surface-relief grating), a refractive coupler (e.g., a wedge or a prism), or a reflective coupler (e.g., a reflective surface having a slant angle with respect to substrate 2110). For example, in one embodiment, first input coupler 2120 may include a prism that may couple display light of different colors into substrate 2110 at a same refraction angle. In another example, the input coupler may include a grating coupler that may diffract light of different colors into substrate 2110 at different directions. Similarly, display light from a second projector may be coupled into the substrate in a similar fashion by a second input coupler 2122, as described in reference to first input coupler 2120.

As waveguide display 1000 described above, waveguide display 2100 may also include a first top grating 2130 and a bottom grating 2140 formed on first surface 2112 and/or second surface 2114. For example, first top grating 2130 and bottom grating 2140 may be formed on a same surface or two different surfaces of substrate 2110. Bottom grating 2140 may be formed in the see-through region of the waveguide display and may overlap with an eyebox 2170 (or output pupil) when viewed in the z direction. First top grating 2130 and bottom grating 2140 may be used for dual-axis pupil expansion to expand the incident display light beam from the first projector in two dimensions to fill eyebox 2170 with the display light corresponding to a first portion of the total FOV of waveguide display 2100. First top grating 2130 may be a transmission grating or a reflection grating. Bottom grating 2140 may generally include a transmission grating in order to reduce the form factor of waveguide display 2100 as described below in reference to FIG. 23. Similarly, waveguide display 2100 may also include a second top grating 2132, which may be used with bottom grating 2140 for dual-axis pupil expansion to expand the incident display light beam from the second projector in two dimensions to fill eyebox 2170 with the display light corresponding to a second portion of the total FOV of waveguide display 2100.

In some embodiments, waveguide display 2100 may include a third top grating 2160 and a fourth top grating 2162 formed on first surface 2112 or second surface 2114. In some embodiments, third top grating 2160 and fourth top grating 2162 may be on a same surface of substrate 2110 as first top grating 2130 and second top grating 2132, respectively. In some embodiments, third top grating 2160 and first top grating 2130 may be on different surfaces of substrate 2110, and fourth top grating 2162 and second top grating 2132 may be on different surfaces of substrate 2110. In some embodiments, third top grating 2160 and fourth top grating 2162 may be in different regions of a same grating or a same grating material layer (e.g., waveguide plates 1512 and 1514 of FIG. 15) as first top grating 2130 and second top grating 2132, respectively. In some embodiments, third top grating 2160 and fourth top grating 2162 may be spatially separate from first top grating 2130 and second top grating 2132. In some embodiments, third top grating 2160 and fourth top grating 2162 may be recorded in a same number of exposures and under same recording conditions (but may be recorded for different exposure durations to achieve different diffraction efficiencies) as first top grating 2130 and second top grating 2132, respectively, such that each VBG in third top grating 2160 may match a respective VBG in first top grating 2130, and each VBG in fourth top grating 2162 may match a respective VBG in second top grating 2132. For example, a VBG in third top grating 2160 and a corresponding VBG in first top grating 2130 may have the same grating period and the same grating slant angle (and thus the same grating vector), and the same thickness. In some embodiments where first top grating 2130 and third top grating 2160 may be on different surfaces of substrate 2110, a VBG in third top grating 2160 and a corresponding VBG in first top grating 2130 may have the same grating vector in the x-y plane, but may have opposite grating vectors in the z direction. In one embodiment, third top grating 2160 and first top grating 2130 may have a thickness about 20 μm and may each include about 40 or more VBGs recorded through about 40 or more exposures. In some embodiments, bottom grating 2140 may have a thickness about 20 μm or higher, and may include about 50 or more VBGs recorded through about 50 or more exposures.

First input coupler 2120 and second input coupler 2122 may couple the display light from different portions of the total FOV of waveguide display 2100 from their respective light sources into substrate 2110. The display light from first input coupler 2120 may reach third top grating 2160 directly or may be reflected by first surface 2112 and/or second surface 2114 to third top grating 2160, where the size of the display light beam may be larger than that at first input coupler 2120. Each VBG in third top grating 2160 may diffract a portion of the display light within a FOV range and a wavelength range that approximately satisfies the Bragg condition of the VBG to first top grating 2130. While the display light diffracted by a VBG in third top grating 2160 propagates within substrate 2110 (e.g., along a direction shown by a line 2134) through total internal reflection, a portion of the display light may be diffracted by the corresponding VBG in first top grating 2130 to bottom grating 2140 each time the display light propagating within substrate 2110 reaches first top grating 2130. Bottom grating 2140 may then expand the display light from first top grating 2130 in a different direction by diffracting a portion of the display light to eyebox 2170 each time the display light propagating within substrate 2110 reaches bottom grating 2140. Similarly, display light from second input coupler 2122 may reach fourth top grating 2162 directly or may be reflected within substrate 2110, as described in reference to first top grating 2130 and third top grating 2160, and may be diffracted similarly toward bottom grating 2040, and thence toward eyebox 2170 to provide a portion of the total FOV of waveguide display 2100.

Because third top grating 2160 and first top grating 2130 may be thin (e.g., about 20 μm), they may cause some dispersion, but the dispersion may not be as high as the dispersion of a grating having a thickness of, for example, 1 μm or thinner. Therefore, the fields of view for different colors may not be significantly affected by the dispersion. In addition, as described above, each VBG in third top grating 2160 matches a respective VBG in first top grating 2130 (i.e., having the same grating vector at least in the x-y plane), and the two matching VBGs work under opposite Bragg conditions (e.g., +1 order diffraction versus −1 order diffraction) due to the opposite propagation directions of the display light at the two matching VBGs. For example, as shown in FIG. 21A, the VBG in third top grating 2160 may change the propagation direction of the incident light from a downward direction to a rightward direction, while the VBG in first top grating 2130 may change the propagation direction of the incident light from a rightward direction to a downward direction. Thus, the dispersion caused by first top grating 2130 may be opposite to the dispersion caused by third top grating 2160 to reduce or minimize the overall dispersion. Similarly, second top grating 2132 and fourth top grating 2162 may be formed in substrate 2110 as described for first top grating 2130 and third top grating 2160, such that each VBG in fourth top grating 2162 matches a respective VBG in second top grating 2132, and may work under opposite Bragg conditions to minimize dispersion introduced through diffraction of the display light.

Because first top grating 2130 and bottom grating 2140 may only have a small number (e.g., no greater than 50) of VBGs and exposures, first top grating 2130 may also be placed in the see-through region to overlap with bottom grating 2140, thus reducing the size of the waveguide display. The total number of VBGs and exposures in a given see-through region may be less than, for example, 100 or fewer (e.g., no more than 40 in first top grating 2130 and no more than 50 in bottom grating 2140). Thus, the display haze may be reduced significantly compared with the case where 500 or more VBGs are recorded in the see-through region. Similarly, second top grating 2132 may be placed in the see through region to overlap with first top grating 2130 and/or bottom grating 2140.

FIG. 21B illustrates examples of replicated exit pupils at an eyebox 2180 (e.g., eyebox 2170) of volume Bragg grating-based waveguide display 2100. The exit pupils may include a first set of exit pupils 2182 replicated by gratings 2160, 2130, and 2140, and a second set of exit pupils 2184 replicated by gratings 2162, 2132, and 2140. In embodiments where gratings 2160 and gratings 2162 have different grating vectors, the first set of exit pupils 2182 and the second set of exit pupils 2184 may correspond to different FOV ranges. The first set of exit pupils 2182 and the second set of exit pupils 2184 may overlap or partially overlap. In some embodiments, first top grating 2130 and bottom grating 2140 may at least partially overlap to reduce the form factor of waveguide display 2100 as described above.

Figure 22:
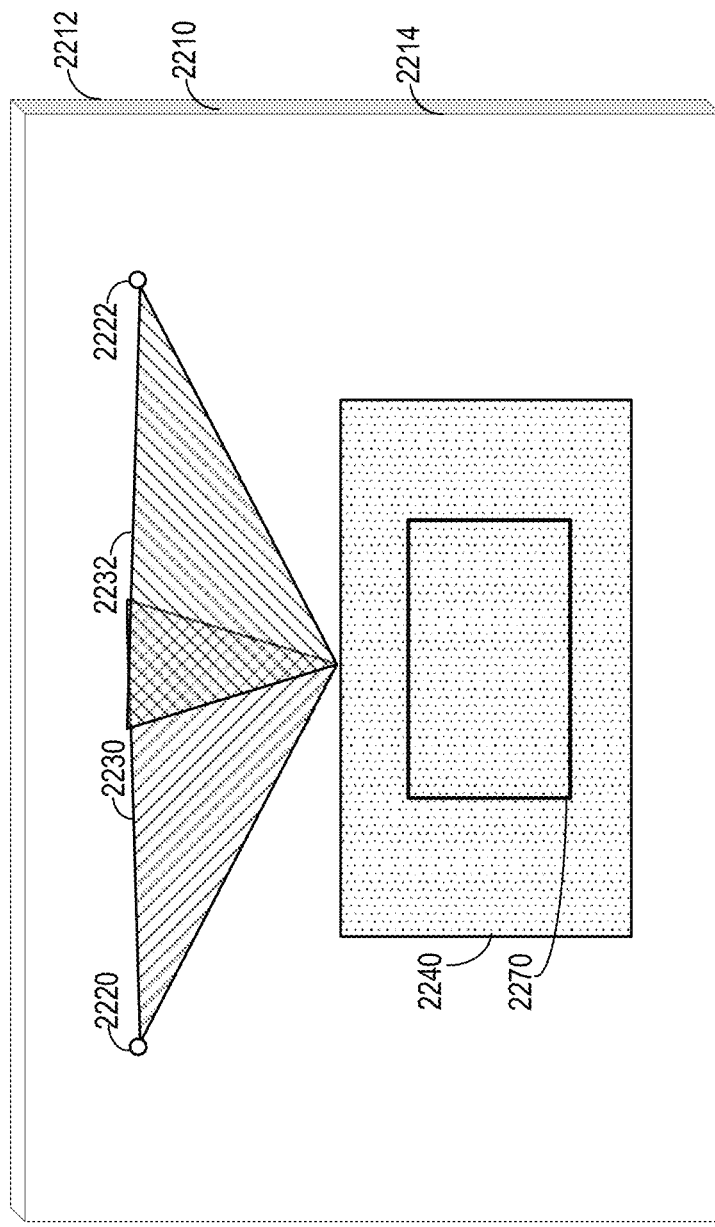
FIG. 22 illustrates an example of a volume Bragg grating-based waveguide display with exit pupil expansion, field of view stitching, and form-factor reduction according to certain embodiments.

FIG. 22 illustrates an example of a volume Bragg grating-based waveguide display 2200 with exit pupil expansion, field of view stitching, and form-factor reduction according to certain embodiments. Waveguide display 2200 may include a substrate 2210, which may be similar to substrate 2110 but may be much smaller than substrate 2110. Substrate 2210 may include a first surface 2212 and a second surface 2214. Display light from a first light source or image source (e.g., arrays of LEDs) may be coupled into substrate 2210 by a first input coupler 2220, and may be reflected by first surface 2212 and second surface 2214 through total internal reflection, such that the display light may propagate within substrate 2210. First input coupler 2220 may include a diffractive coupler (e.g., a multiplexed volume holographic grating) and may couple display light of different colors from different fields of view into substrate 2210. Similarly, display light from a second light source or image source may be coupled into substrate 2210 by a second input coupler 2222.

As waveguide display 2100, waveguide display 2200 may also include a first top grating 2230, a second top grating 2232, and a bottom grating 2240 formed on first surface 2212 and/or second surface 2214. For example, first top grating 2230, second top grating 2232, and bottom grating 2240 may be formed on a same surface or two different surfaces of substrate 2210. Bottom grating 2240 may be formed in the see-through region of the waveguide display and may overlap with an eyebox 2270 when viewed in the z direction (e.g., at a distance about 18 mm from bottom grating 2240 in +z or −z direction). First top grating 2230, second top grating 2232, and bottom grating 2240 may be used for dual-axis pupil expansion to expand the incident display light from the first and second light sources in two dimensions to fill eyebox 2270 with the display light. First top grating 2230 and second top grating 2232 may be a transmission grating or a reflection grating. In some embodiments, first top grating 2230 and second top grating 2232 may partially overlap in the x-y plane, such that the first top grating 2230 and second top grating 2232 provide a reduced form factor for waveguide display 2200 relative to waveguide display 2100. In some embodiments, first top grating 2230 and second top grating 2232 may be formed in different layers and/or regions of substrate 2210, such that they are separated by a distance in the z-direction in substrate 2210, while overlapping in the x-y plane.

Figure 23:
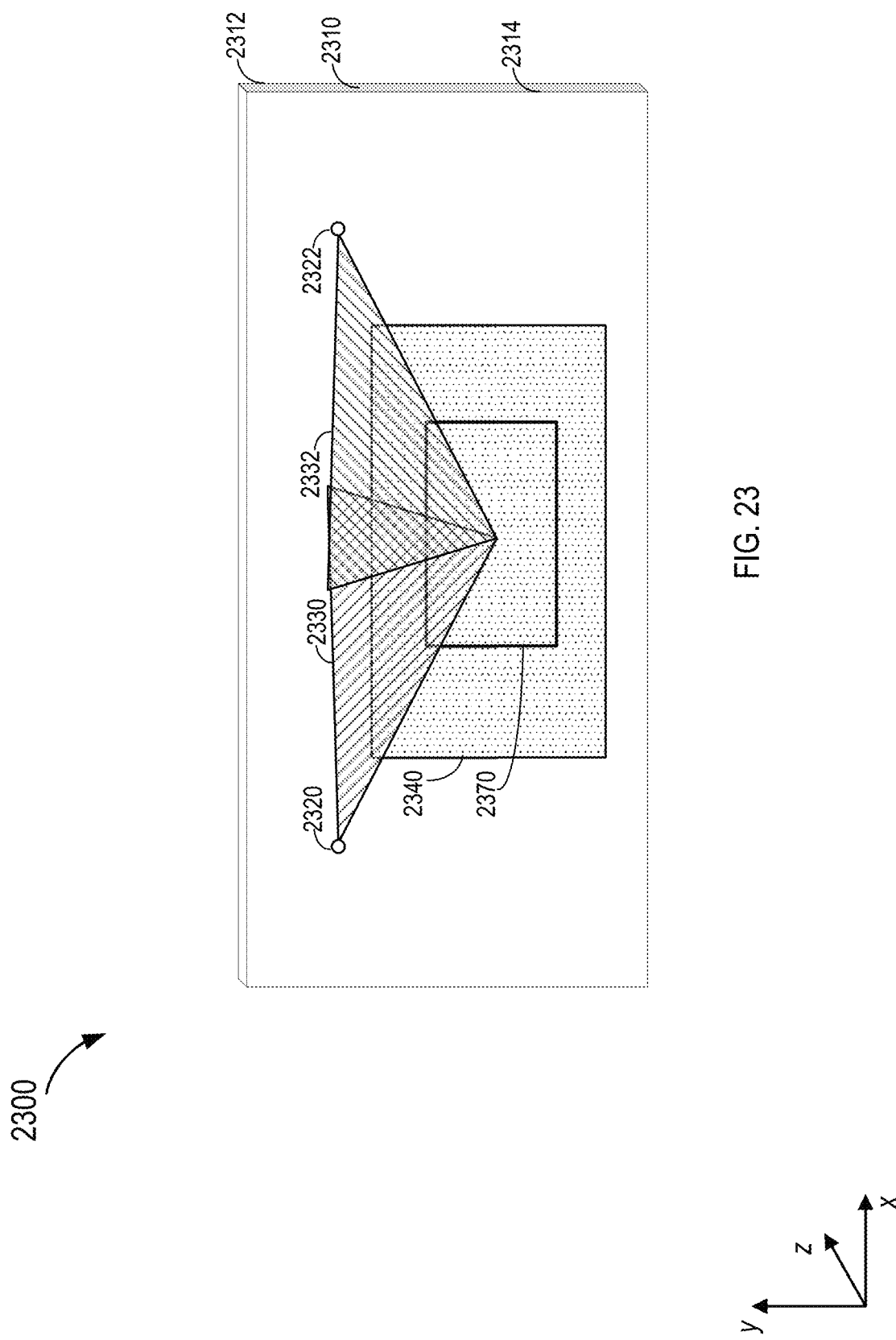
FIG. 23 illustrates another example of a volume Bragg grating-based waveguide display with exit pupil expansion, field of view stitching, and form-factor reduction according to certain embodiments.

FIG. 23 illustrates an example of a volume Bragg grating-based waveguide display 2300 with exit pupil expansion, field of view stitching, and form-factor reduction according to certain embodiments. As described in reference to FIGS. 21-22, waveguide display 2300 may include a first top grating 2330, a second top grating 2332, and a bottom grating 2340 formed on first surface 2312 and/or second surface 2314 of a substrate 2310 to diffract display light from a first input coupler 2320 and a second input coupler 2322 to cover a total FOV of waveguide display 2300. In some embodiments, first top grating 2330, second top grating 2332, and bottom grating 2340 may include transmission gratings and may at least partially overlap to reduce the form factor of waveguide display 2300 as shown in FIG. 23. As described in reference to FIG. 19, in some embodiments, first top grating 2330 and second top grating 2332 may include reflective VBGs, where the overlap with bottom grating 2340 may be limited to avoid clipping FOV of output display light. In some embodiments, waveguide display 2300 includes only transmission VBGs, such that the first top grating 2330 and second top grating 2332 may overlap with bottom grating 2340 and eyebox 2370 in the z direction.

Figure 24:
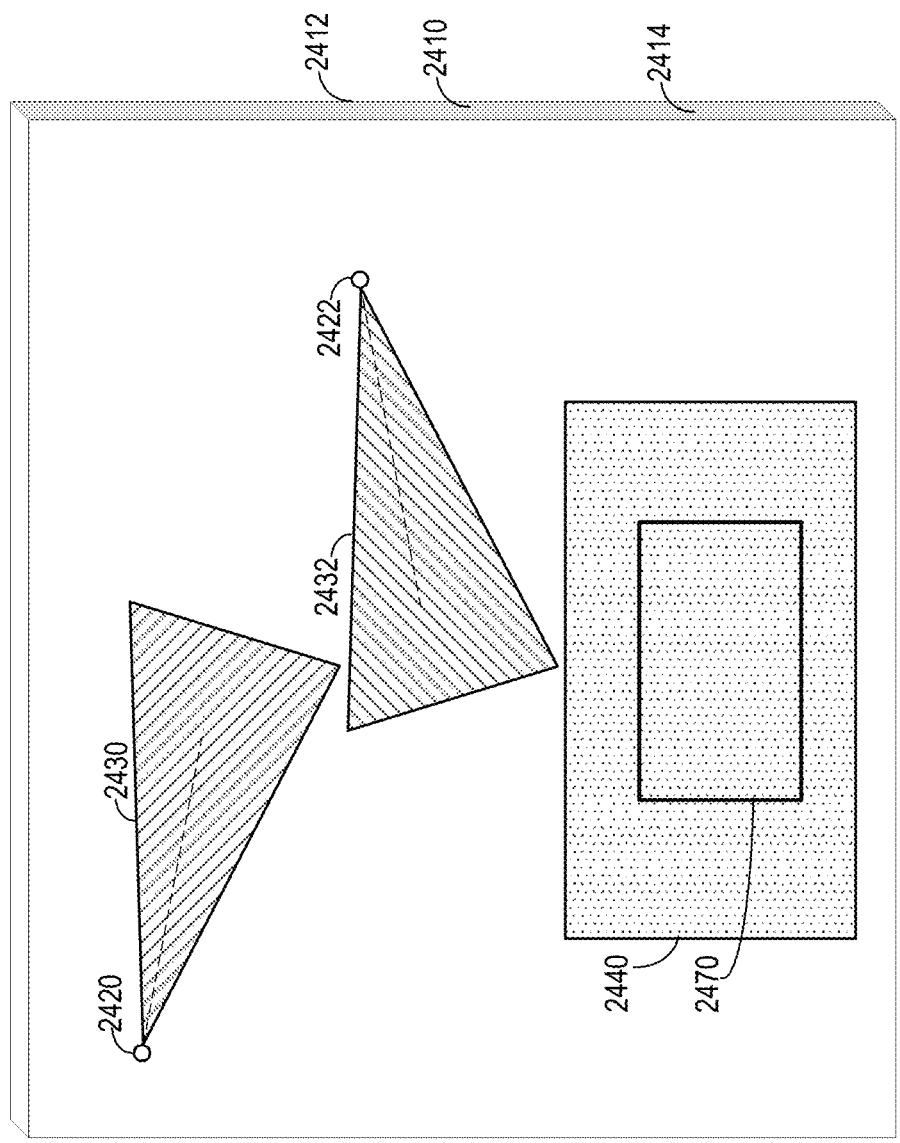
FIG. 24 illustrates another example of a volume Bragg grating-based waveguide display with exit pupil expansion, field of view stitching, and form-factor reduction, according to certain embodiments.

FIG. 24 illustrates another example of a volume Bragg grating-based waveguide display 2400 with exit pupil expansion, field of view stitching, and form-factor reduction, according to certain embodiments. As with waveguide display 2100, waveguide display 2400 may include a substrate 2410 having a first surface 2412 and a second surface 2414. As described in reference to FIGS. 21-22, waveguide display 2400 may include a first top grating 2430, a second top grating 2432, and a bottom grating 2440 formed on first surface 2412 and/or second surface 2414 of substrate 2410 to diffract display light from a first input coupler 2420 and a second input coupler 2422 to cover a total FOV of waveguide display 2400. As described in reference to FIG. 23, first top grating 2430, second top grating 2432, and bottom grating 2440 may include transmission gratings and thus may at least partially overlap to reduce the form factor of waveguide display 2400. In some embodiments, to reduce cross-talk between first top grating 2430 and second top grating 2432, an offset in a direction (e.g., approximately in the y-direction) may be included between first top grating 2430 and second top grating 2432, such that first top grating 2430 and second top grating 2432 may overlap in the x-direction while occupying separate regions of substrate 2410 in roughly the y-direction. In some embodiments, the offset may improve performance of waveguide display 2400 by reducing ghost-images caused by diffraction of display light from the first input coupler 2420 by the second top grating 2432, and vice versa. The offset reduces cross-talk at least in part by separating the gratings in space such that interaction of display light with improper gratings is minimized.

As described above, in some embodiments, the two top gratings may be designed such that the undesired diffraction of light for a first field of view by a grating for a second field of view may have a diffraction angle such that it may not reach the eyebox and thus may not be observed by the user. For example, in embodiments where a first top grating may be designed to diffract light for the left half of the FOV and a second top grating may be designed to diffract light for the right half of the FOV, even if a portion of the light for the left half of the FOV is diffracted by the second top grating, the portion of the light may propagate in a direction such that it may not be diffracted by the bottom grating or may be diffracted in a direction such that it may not reach the eyebox.

FIG. 25 illustrates another example of a volume Bragg grating-based waveguide display 2500 with exit pupil expansion, field of view stitching, and form-factor reduction according to certain embodiments. As waveguide display 2100, waveguide display 2500 may include a substrate 2510, which may be similar to substrate 2110. Substrate 2510 may include a first surface 2512 and a second surface 2514. Display light from two light sources (e.g., LEDs) may be coupled into substrate 2510 by a first input coupler 2520 and a second input coupler 2522, and may be reflected by first surface 2512 and second surface 2514 through total internal reflection, such that the display light may propagate within substrate 2510. As described above, first input coupler 2520 and second input coupler 2522 may each include a diffractive coupler, such as a VBG. Waveguide display 2500 may also include a first vertical expansion grating 2530, a second vertical expansion grating 2532, and a horizontal expansion grating 2540 formed on first surface 2512 and/or second surface 2514. In the example shown in FIG. 25, first vertical expansion grating 2530, second vertical expansion grating 2532, and horizontal expansion grating 2540 may be at different locations in the x direction, and may overlap in at least a portion of the see-through region of waveguide display 2500. First vertical expansion grating 2530, second vertical expansion grating 2532, and horizontal expansion grating 2540 may be used for dual-axis pupil expansion to expand the two incident display light beams in two dimensions to fill an eyebox 2550 (e.g., at a distance about 18 mm from horizontal expansion grating 2540 in +z or −z direction) with the display light. For example, first vertical expansion grating 2530 may expand the display light beam in approximately the y direction, while horizontal expansion grating 2540 may expand the display light beam in approximately the x direction.

In some embodiments, waveguide display 2500 may include a first top grating 2560 formed on first surface 2512 and/or second surface 2514. In some embodiments, first top grating 2560 and first vertical expansion grating 2530 may be arranged at different locations in the y direction on a same surface of substrate 2510. In some embodiments, first top grating 2560 and first vertical expansion grating 2530 may be in different regions of a same grating or a same grating material layer. In some embodiments, first top grating 2560 may be spatially separate from first vertical expansion grating 2530. In some embodiments, first top grating 2560 and first vertical expansion grating 2530 may be recorded in a same number of exposures and under similar recording conditions (but may be recorded for different exposure durations to achieve different diffraction efficiencies), such that each VBG in first top grating 2560 may match a respective VBG in first vertical expansion grating 2530 (e.g., having the same grating vector in the x-y plane and having the same and/or opposite grating vectors in the z direction). Similarly, waveguide display 2500 may include second top grating 2562 formed on first surface 2512 and/or second surface 2514, and formed in a fashion such that display light coupled into substrate 2510 by second input coupler 2322 is diffracted toward second vertical expansion grating 2532 by second top grating 2562.

First input coupler 2520 may couple the display light from the first light source into substrate 2510. The display light may propagate approximately along the x direction within substrate 2510, and may reach first top grating 2560 directly or may be reflected by first surface 2512 and/or second surface 2514 to first top grating 2560. Each VBG in first top grating 2560 may diffract a portion of the display light within a FOV range and a wavelength range that approximately satisfies the Bragg condition of the VBG downward to first vertical expansion grating 2530. While the display light diffracted by a VBG in first top grating 2560 propagates within substrate 2510 along a direction (e.g., approximately in the y direction shown by a line 2534) through total internal reflection, a portion of the display light may be diffracted by the corresponding VBG in first vertical expansion grating 2530 to horizontal expansion grating 2540 each time the display light propagating within substrate 2510 reaches first vertical expansion grating 2530. Horizontal expansion grating 2540 may then expand the display light from first vertical expansion grating 2530 in a different direction (e.g., approximately in the x direction) by diffracting a portion of the display light to eyebox 2550 each time the display light propagating within substrate 2510 reaches horizontal expansion grating 2540. Similarly, display light coupled into substrate 2510 by second input coupler 2522 may be diffracted from second top grating 2562 toward second vertical expansion grating 2532 along a second direction (e.g., approximately in the y direction shown by a line 2536) through total internal reflection. Also similarly, a portion of the display light may be diffracted from second vertical expansion grating 2532 to horizontal expansion grating 2540 each time the display light propagating within substrate 2510 reaches second vertical expansion grating 2532.

In some embodiments, first input coupler 2520, second input coupler 2522, and horizontal expansion grating 2540 may include matching VBGs (e.g., VBGs with same grating vectors in the x-y plane and the same or opposite grating vectors in the z direction) to reduce the overall dispersion caused by first input coupler 2520 and horizontal expansion grating 2540, and by second input coupler 2522 and horizontal expansion grating 2540. Similarly, gratings 2530 and 2560 may include matching VBGs (e.g., VBGs with same grating vectors in the x-y plane and having the same and/or opposite grating vectors in the z direction) to reduce the overall dispersion caused by gratings 2530 and 2560, and 2532 and 2562 may include matching VBGs to reduce the overall dispersion caused by gratings 2532 and 2562. Thus, the overall dispersion by the gratings in waveguide display 2500 may be reduced or minimized.

Each of first vertical expansion grating 2530, second vertical expansion grating 2532, and horizontal expansion grating 2540 may have a thickness less than, for example, about 100 µm (e.g., about 20 µm), and may include, for example, fewer than 50 VBGs. Thus, any area in the optical see-through region of waveguide display 2500 may include fewer than 100 VBGs. As such, the display haze may not be significant. In addition, first vertical expansion grating 2530, second vertical expansion grating 2532, and horizontal expansion grating 2540 may at least partially overlap to reduce the form factor of waveguide display 2500, and thus the physical dimensions of waveguide display 2500 may be similar to the physical dimensions of a lens in a regular pair of eye glasses.

Figure 26:
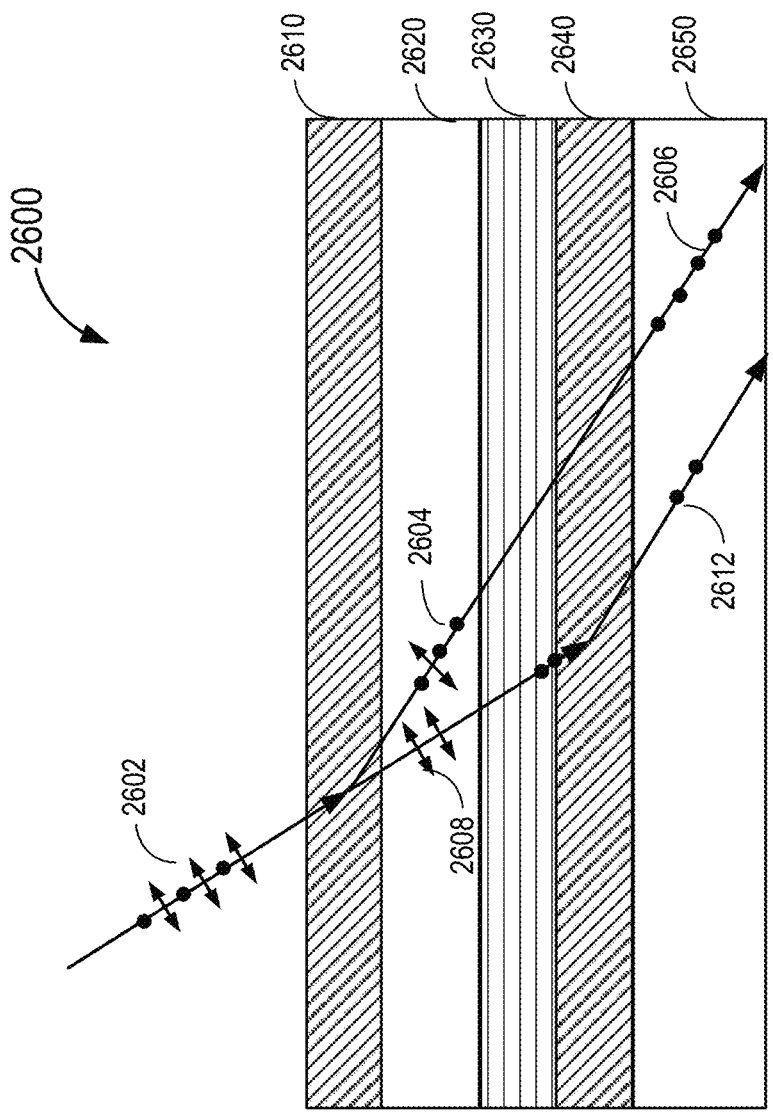
FIG. 26 illustrates an example of a waveguide display including two multiplexed volume Bragg gratings and a polarization convertor between the two multiplexed volume Bragg gratings according to certain embodiments.

FIG. 26 illustrates an example of a waveguide display 2600 including two multiplexed volume Bragg gratings 2610 and 2640 and a polarization convertor 2630 between the two multiplexed volume Bragg gratings 2610 and 2640 according to certain embodiments. In some embodiments, because the diffraction efficiency of a transmission grating may be polarization sensitive and the incoming display light may be unpolarized, some components of the display light may not be diffracted by the grating and thus the efficiency of the waveguide display may be reduced. To improve the efficiency for unpolarized light or light in a certain polarization state, a polarization convertor and two spatially multiplexed gratings may be used to couple the display light into or out of the waveguide. A first VBG 2610 may be formed on a substrate 2620 or on a surface of polarization convertor 2630. A second VBG 2640 may be formed on a substrate 2650 or on another surface of polarization convertor 2630.

Unpolarized light 2602 may include s-polarized light and p-polarized light. First VBG 2610 may diffract a majority of the s-polarized light and a portion of the p-polarized light as shown by diffracted light 2604. Diffracted light 2604 may be partially converted by polarization convertor 2630 and pass through second VBG 2640 without being diffracted by second VBG 2640 as shown by transmitted light 2606 because the Bragg condition is not satisfied. The portion 2608 of the p-polarized light that is not diffracted by first VBG 2610 may pass through polarization convertor 2630 and may be converted into s-polarized light and may be diffracted by second VBG 2640, where the diffracted light 2612 may have the same propagation direction as transmitted light 2606. In this way, unpolarized light 2602 may be more efficiently diffracted by waveguide display 2600.

External light (e.g., from an external light source, such as a lamp or the sun) may be reflected at a surface of a grating coupler and back to the grating coupler, where the reflected light may be diffracted by the grating coupler to generate rainbow images. In some waveguide display, ambient light with a large incident angle outside of the see-through field of view of the waveguide display may also be diffracted by the grating couplers to generate rainbow images. According to some embodiments, additional structures, such as a reflective coating layer (e.g., for light from a large see-through FOV) and/or an antireflective coating layer (e.g., for light from a small see-through FOV), may be used in the waveguide display to reduce optical artifacts, such as rainbow effects. For example, an angular-selective transmissive layer may be placed in front of (or behind) the waveguide and the grating coupler of a waveguide display to reduce the artifacts caused by external light source. The angular-selective transmissive layer may be configured to reflect, diffract, or absorb ambient light with an incident angle greater than one half of the see-through field of view of the waveguide display, while allowing ambient light within the see-through field of view of the near-eye display to pass through and reach user's eyes with little or no loss. The angular-selective transmissive layer may include, for example, coating that may include one or more dielectric layers, diffractive elements such as gratings (e.g., meta-gratings), nanostructures (e.g., nanowires, nano-pillars, nano-prisms, nano-pyramids), and the like.

Figure 27:
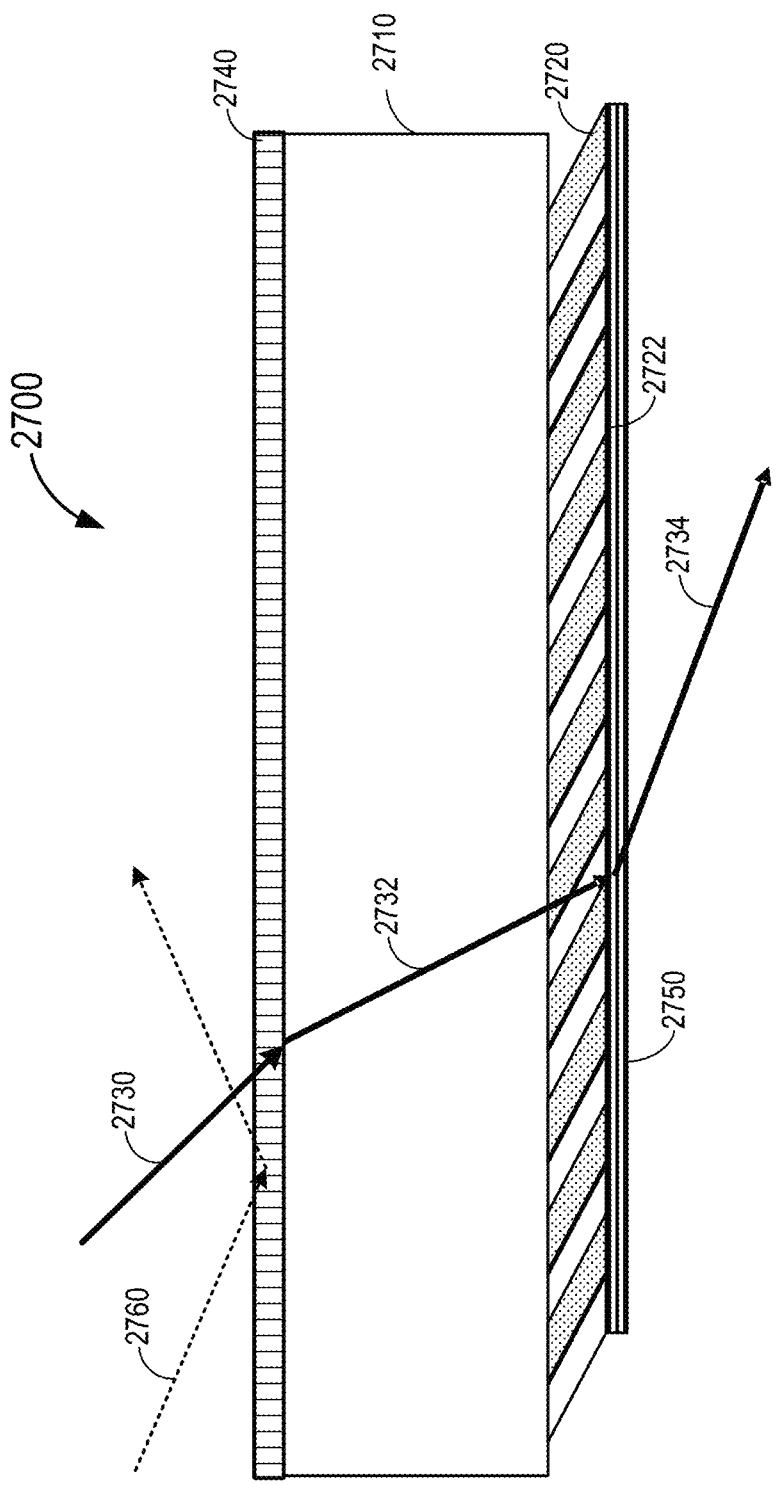
FIG. 27 illustrates an example of a waveguide display including an anti-reflection layer and an angular-selective transmissive layer according to certain embodiments.

FIG. 27 illustrates an example of a waveguide display 2700 including an anti-reflection layer 2750 and an angular-selective transmissive layer 2740 according to certain embodiments. Waveguide display 2700 may include a waveguide 2710 and a grating coupler 2720 at the bottom surface of waveguide 2710. Grating coupler 2720 may be similar to the grating couplers described above. External light 2730 incident on waveguide 2710 may be refracted into waveguide 2710 as external light 2732 and may then be diffracted by grating coupler 2720. The diffracted light may include a $0^{th}$ order diffraction 2734 (e.g., refractive diffraction) and a −1st order diffraction (not shown). The height, period, and/or slant angle of grating coupler 2720 may be configured such that the −1st order diffraction may be reduced or minimized for the external light.

Waveguide display 2700 may include anti-reflection layer 2750 on bottom surface 2722 of grating coupler 2720. Anti-reflection layer 2750 may include, for example, one or more dielectric thin film layers or other anti-reflection layers coated on bottom surface 2722, and may be used to reduce the reflection of the external light at bottom surface 2722.

Thus, little or no external light may be reflected at bottom surface 2722 of grating coupler 2720 back to grating coupler 2720, and therefore the rainbow ghost that might otherwise be formed due to the diffraction of external light reflected at bottom surface 2722 by grating coupler 2720 may be reduced or minimized. Some portions of the display light may be diffracted by grating coupler 2720 and may be coupled out of waveguide 2710 towards user's eyes (e.g., due to $-1^{st}$ order diffraction). Anti-reflection layer 2750 may also help to reduce the reflection of the portions of the display light that are coupled out of waveguide 2710 by grating coupler 2720.

Angular-selective transmissive layer 2740 may be coated on the top surface of waveguide 2710 or grating coupler 2720. Angular-selective transmissive layer 2740 may have a high reflectivity, high diffraction efficiency, or high absorption for incident light with an incident angle greater than a certain threshold value, and may have a low loss for incident light with an incident angle lower than the threshold value. The threshold value may be determined based on the see-through field of view of waveguide display 2700. For example, incident light 2760 with an incident angle greater than the see-through field of view may be mostly reflected, diffracted, or absorbed by angular-selective transmissive layer 2740, and thus may not reach waveguide 2710. External light 2730 with an incident angle within the see-through field of view may mostly pass through angular-selective transmissive layer and waveguide 2710, and may be refracted or diffracted by grating coupler 2720.

The angular-selective transmissive layer 2740 described above may be implemented in various ways. In some embodiments, the angular-selective transmissive layer may include one or more dielectric layers (or air gap). Each dielectric layer may have a respective refractive index, and adjacent dielectric layers may have different refractive indexes. In some embodiments, the angular-selective transmissive layer may include, for example, micro mirrors or prisms, grating, meta-gratings, nanowires, nano-pillars, or other micro- or nano-structures. In some examples, the angular-selective transmissive layer may include gratings (e.g., surface-relief gratings or holographic gratings) with small grating periods formed on a substrate. The gratings may only diffract light with large incidence angles (e.g., about 75° to about 90°) and the diffracted light may propagate in directions such that the diffracted light may not reach the eyebox. The grating period may be, for example, less than 280 nm (e.g., about 200 nm) such that the angular-selective transmissive layer may not affect light within the see-through field of view. In some examples, the angular-selective transmissive layer may include micro-scale or nano-scale anisotropic structures that may reflect, diffract, or absorb incident light with large incident angles. The anisotropic structures may include, for example, large-aspect-ratio nanoparticles aligned and immersed in transparent media, nanowire arrays, certain liquid crystal materials, and the like.

Embodiments of the invention may be used to implement components of an artificial reality system or may be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 28:
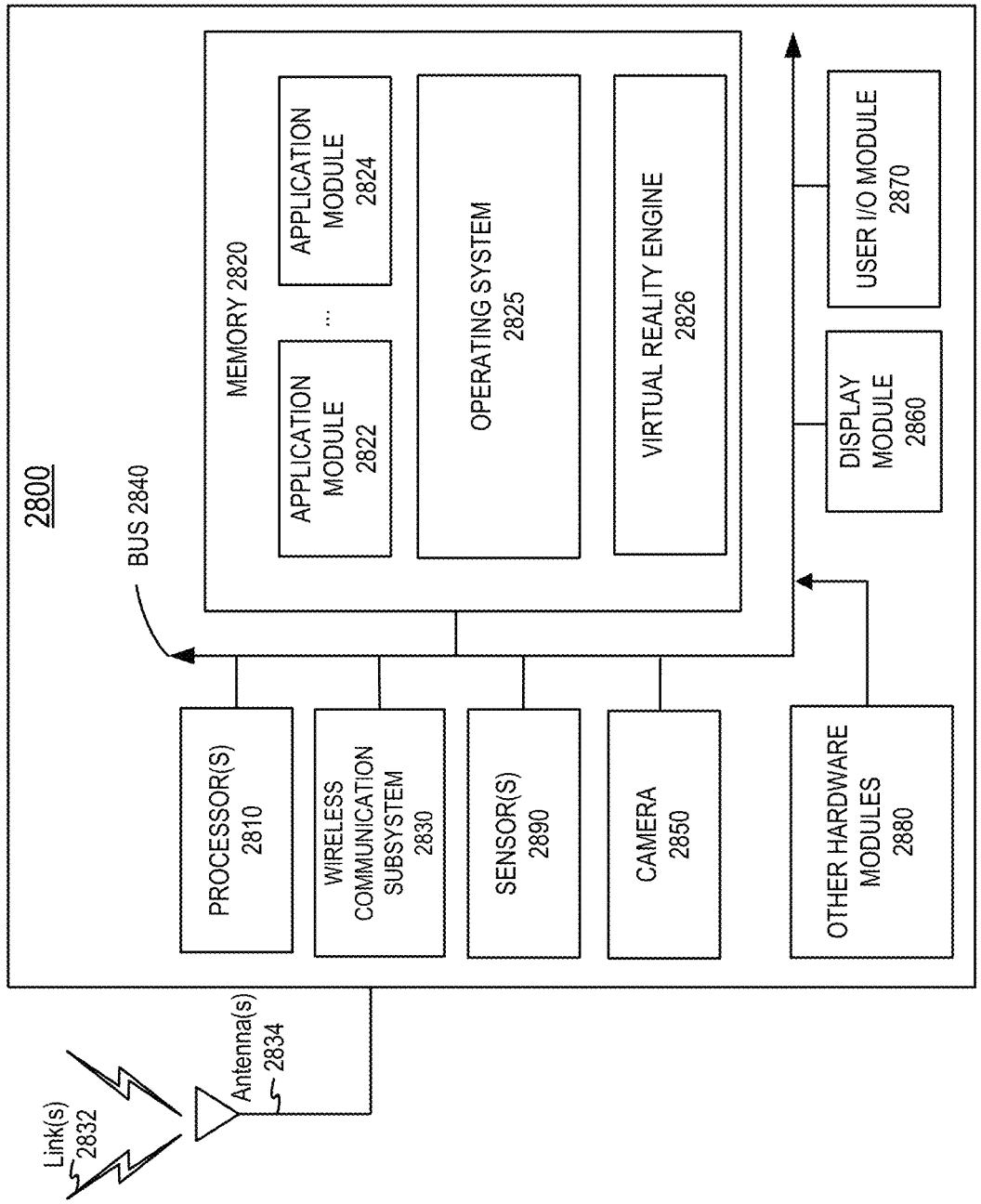
FIG. 28 is a simplified block diagram of an example electronic system of an example near-eye display according to certain embodiments.

FIG. 28 is a simplified block diagram of an example electronic system 2800 of an example near-eye display (e.g., HMD device) for implementing some of the examples disclosed herein. Electronic system 2800 may be used as the electronic system of an HMD device or other near-eye displays described above. In this example, electronic system 2800 may include one or more processor(s) 2810 and a memory 2820. Processor(s) 2810 may be configured to execute instructions for performing operations at a number of components, and can be, for example, a general-purpose processor or microprocessor suitable for implementation within a portable electronic device. Processor(s) 2810 may be communicatively coupled with a plurality of components within electronic system 2800. To realize this communicative coupling, processor(s) 2810 may communicate with the other illustrated components across a bus 2840. Bus 2840 may be any subsystem adapted to transfer data within electronic system 2800. Bus 2840 may include a plurality of computer buses and additional circuitry to transfer data.

Memory 2820 may be coupled to processor(s) 2810. In some embodiments, memory 2820 may offer both short-term and long-term storage and may be divided into several units. Memory 2820 may be volatile, such as static random access memory (SRAM) and/or dynamic random access memory (DRAM) and/or non-volatile, such as read-only memory (ROM), flash memory, and the like. Furthermore, memory 2820 may include removable storage devices, such as secure digital (SD) cards. Memory 2820 may provide storage of computer-readable instructions, data structures, program modules, and other data for electronic system 2800. In some embodiments, memory 2820 may be distributed into different hardware modules. A set of instructions and/or code might be stored on memory 2820. The instructions might take the form of executable code that may be executable by electronic system 2800, and/or might take the form of source and/or installable code, which, upon compilation and/or installation on electronic system 2800 (e.g., using any of a variety of generally available compilers, installation programs, compression/decompression utilities, etc.), may take the form of executable code.

In some embodiments, memory 2820 may store a plurality of application modules 2822 through 2824, which may include any number of applications. Examples of applications may include gaming applications, conferencing applications, video playback applications, or other suitable applications. The applications may include a depth sensing function or eye tracking function. Application modules 2822-2824 may include particular instructions to be executed by processor(s) 2810. In some embodiments, certain applications or parts of application modules 2822-2824 may be executable by other hardware modules 2880. In certain embodiments, memory 2820 may additionally include secure memory, which may include additional security controls to prevent copying or other unauthorized access to secure information.

In some embodiments, memory 2820 may include an operating system 2825 loaded therein. Operating system 2825 may be operable to initiate the execution of the instructions provided by application modules 2822-2824 and/or manage other hardware modules 2880 as well as interfaces with a wireless communication subsystem 2830 which may include one or more wireless transceivers. Operating system 2825 may be adapted to perform other operations across the components of electronic system 2800 including threading, resource management, data storage control and other similar functionality.

Wireless communication subsystem 2830 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 2800 may include one or more antennas 2834 for wireless communication as part of wireless communication subsystem 2830 or as a separate component coupled to any portion of the system. Depending on desired functionality, wireless communication subsystem 2830 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 2830 may permit data to be exchanged with a network, other computer systems, and/or any other devices described herein. Wireless communication subsystem 2830 may include a means for transmitting or receiving data, such as identifiers of HMD devices, position data, a geographic map, a heat map, photos, or videos, using antenna(s) 2834 and wireless link(s) 2832. Wireless communication subsystem 2830, processor(s) 2810, and memory 2820 may together comprise at least a part of one or more of a means for performing some functions disclosed herein.

Embodiments of electronic system 2800 may also include one or more sensors 2890. Sensor(s) 2890 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 2890 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 2800 may include a display module 2860. Display module 2860 may be a near-eye display, and may graphically present information, such as images, videos, and various instructions, from electronic system 2800 to a user. Such information may be derived from one or more application modules 2822-2824, virtual reality engine 2826, one or more other hardware modules 2880, a combination thereof, or any other suitable means for resolving graphical content for the user (e.g., by operating system 2825). Display module 2860 may use liquid crystal display (LCD) technology, light-emitting diode (LED) technology (including, for example, OLED, ILED, μLED, AMOLED, TOLED, etc.), light emitting polymer display (LPD) technology, or some other display technology.

Electronic system 2800 may include a user input/output module 2870. User input/output module 2870 may allow a user to send action requests to electronic system 2800. An action request may be a request to perform a particular action. For example, an action request may be to start or end an application or to perform a particular action within the application. User input/output module 2870 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 2800. In some embodiments, user input/output module 2870 may provide haptic feedback to the user in accordance with instructions received from electronic system 2800. For example, the haptic feedback may be provided when an action request is received or has been performed.

Electronic system 2800 may include a camera 2850 that may be used to take photos or videos of a user, for example, for tracking the user's eye position. Camera 2850 may also be used to take photos or videos of the environment, for example, for VR, AR, or MR applications. Camera 2850 may include, for example, a complementary metal-oxide-semiconductor (CMOS) image sensor with a few millions or tens of millions of pixels. In some implementations, camera 2850 may include two or more cameras that may be used to capture 3-D images.

In some embodiments, electronic system 2800 may include a plurality of other hardware modules 2880. Each of other hardware modules 2880 may be a physical module within electronic system 2800. While each of other hardware modules 2880 may be permanently configured as a structure, some of other hardware modules 2880 may be temporarily configured to perform specific functions or temporarily activated. Examples of other hardware modules 2880 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 2880 may be implemented in software.

In some embodiments, memory 2820 of electronic system 2800 may also store a virtual reality engine 2826. Virtual reality engine 2826 may execute applications within electronic system 2800 and receive position information, acceleration information, velocity information, predicted future positions, or some combination thereof of the HMD device from the various sensors. In some embodiments, the information received by virtual reality engine 2826 may be used for producing a signal (e.g., display instructions) to display module 2860. For example, if the received information indicates that the user has looked to the left, virtual reality engine 2826 may generate content for the HMD device that mirrors the user's movement in a virtual environment. Additionally, virtual reality engine 2826 may perform an action within an application in response to an action request received from user input/output module 2870 and provide feedback to the user. The provided feedback may be visual, audible, or haptic feedback. In some implementations, processor(s) 2810 may include one or more GPUs that may execute virtual reality engine 2826.

In various implementations, the above-described hardware and modules may be implemented on a single device or on multiple devices that can communicate with one another using wired or wireless connections. For example, in some implementations, some components or modules, such as GPUs, virtual reality engine 2826, and applications (e.g., tracking application), may be implemented on a console separate from the head-mounted display device. In some implementations, one console may be connected to or support more than one HMD.

In alternative configurations, different and/or additional components may be included in electronic system 2800. Similarly, functionality of one or more of the components can be distributed among the components in a manner different from the manner described above. For example, in some embodiments, electronic system 2800 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A waveguide display comprising:
   a substrate transparent to visible light;
   a first projector configured to generate display light from a first field of view (FOV) of a display image;
   a first input coupler configured to couple the display light from the first FOV into the substrate;
   a first set of gratings configured to couple the display light from the first FOV out of the substrate at a first two-dimensional array of locations of the substrate, wherein the first set of gratings includes:
      a first grating configured to:
         diffract, at a first region of the first grating, the display light from the first FOV to a first direction toward two or more regions of the first grating; and
         diffract, at the two or more regions of the first grating along the first direction, the display light from the first FOV to a second direction; and
      a second grating configured to couple, at two or more regions of the second grating along the second direction, the display light from each of the two or more regions of the first grating out of the substrate;
   a second projector configured to generate display light from a second FOV of the display image different from the first FOV;
   a second input coupler configured to couple the display light from the second FOV into the substrate; and
   a second set of gratings configured to couple the display light from the second FOV out of the substrate at a second two-dimensional array of locations of the substrate.

2. The waveguide display of claim 1, wherein the first FOV and the second FOV in combination include a full field of view of the display image.

3. The waveguide display of claim 1, wherein the first FOV and the second FOV include an overlapped FOV.

4. The waveguide display of claim 3, wherein the overlapped FOV is greater than 4°.

5. The waveguide display of claim 3, wherein the first set of gratings has a first diffraction efficiency for display light in the overlapped FOV lower than a second diffraction efficiency for display light in other portions of the first FOV.

6. The waveguide display of claim 1, wherein:
   the first FOV includes a left FOV of the display image; and
   the second FOV includes a right FOV of the display image.

7. The waveguide display of claim 1, wherein:
   the first FOV includes a top FOV of the display image; and
   the second FOV includes a bottom FOV of the display image.

8. The waveguide display of claim 1, wherein:
   the first input coupler includes a first input grating coupler; and
   the first input grating coupler and the second grating have a same grating vector in a plane perpendicular to a surface normal direction of the substrate.

9. The waveguide display of claim 8, wherein at least one of the first input grating coupler, the first grating, or the second grating includes a multiplexed volume Bragg grating.

10. The waveguide display of claim 1, wherein the first grating and the second grating each include a reflective diffraction grating or a transmissive diffraction grating.

11. The waveguide display of claim 1, wherein the second set of gratings includes:
    a third grating configured to diffract the display light from the second FOV at two or more regions of the third grating along a third direction to a fourth direction; and
    a fourth grating configured to couple the display light from each of the two or more regions of the third grating out of the substrate at two or more regions of the fourth grating along the fourth direction.

12. The waveguide display of claim 11, wherein the second grating and the fourth grating at least partially overlap.

13. The waveguide display of claim 11, wherein the second grating and the fourth grating are a same grating.

14. The waveguide display of claim 11, wherein the first grating and the third grating are spaced apart in at least one of the first direction or the second direction.

15. The waveguide display of claim 11, wherein at least one of the first grating, the second grating, the third grating, or the fourth grating includes VBGs recorded in two or more holographic material layers.

16. The waveguide display of claim 15, wherein the two or more holographic material layers are on two or more surfaces of one or more substrates or on two or more substrates.

17. The waveguide display of claim 15, wherein the first grating and the third grating are in different holographic material layers.

18. The waveguide display of claim 11, wherein a thickness of each of the first grating, the second grating, the third grating, and the fourth grating is between 20 μm and 100 μm.

* * * * *